United States Patent
Clark

(10) Patent No.: US 11,325,215 B1
(45) Date of Patent: May 10, 2022

(54) GUIDED CIRCULAR SAW SYSTEM AND METHOD

(71) Applicant: Kreg Enterprises, Inc., Huxley, IA (US)

(72) Inventor: Scott L. Clark, Boone, IA (US)

(73) Assignee: KREG ENTERPRISES, INC., Ankeny, IA (US)

( * ) Notice: Subject to any disclaimer, the term of this patent is extended or adjusted under 35 U.S.C. 154(b) by 70 days.

(21) Appl. No.: 16/745,602

(22) Filed: Jan. 17, 2020

Related U.S. Application Data

(62) Division of application No. 15/787,989, filed on Oct. 19, 2017, now abandoned.

(60) Provisional application No. 62/410,780, filed on Oct. 20, 2016.

(51) Int. Cl.
  *B23Q 9/02* (2006.01)
  *B23Q 9/00* (2006.01)
  *B27B 9/04* (2006.01)
  *B27G 19/04* (2006.01)

(52) U.S. Cl.
  CPC ......... *B23Q 9/0042* (2013.01); *B23Q 9/0007* (2013.01); *B27B 9/04* (2013.01); *B27G 19/04* (2013.01)

(58) Field of Classification Search
  CPC ......... B23D 47/02; B25F 5/02; B23Q 9/0042; Y10T 83/68
  See application file for complete search history.

(56) References Cited

U.S. PATENT DOCUMENTS

| | | | | |
|---|---|---|---|---|
| 3,586,077 A | * | 6/1971 | Pease | B23Q 9/005 30/376 |
| 5,365,822 A | * | 11/1994 | Stapleton | B23Q 9/0042 83/520 |
| 8,616,108 B2 | * | 12/2013 | Lukas | B27B 9/04 83/821 |
| 2009/0308218 A1 | * | 12/2009 | Raff | B23Q 9/0042 83/745 |
| 2011/0083540 A1 | * | 4/2011 | Xing | B23Q 9/0014 83/821 |
| 2012/0079931 A1 | * | 4/2012 | Hansen | B27B 9/04 83/508.2 |
| 2013/0247738 A1 | * | 9/2013 | Stoffel | B23Q 9/0042 83/821 |

* cited by examiner

*Primary Examiner* — Stephen Choi
(74) *Attorney, Agent, or Firm* — Christopher A. Proskey; BrownWinick Law Firm

(57) ABSTRACT

A guided circular saw system having a track and a ramp that is connected to a benchtop by a pair of hinge members. Hinge members are formed of a top section, a middle section and a bottom section and facilitate raising and lowering of the track in a quick and easy manner without tools. The track is raised to facilitate placing a workpiece under the track and then the track is lowered in place thereby engaging and holding the workpiece in place. A sled attached to a cutting device and the sled and cutting device slides along the track thereby cutting the workpiece. The track includes sacrificial grip strips that extend along the sides of the track and include an upper layer of material that is rigid and a lower layer of material that is compressible and has a high coefficient of friction and thereby holds the workpiece in place.

25 Claims, 81 Drawing Sheets

168

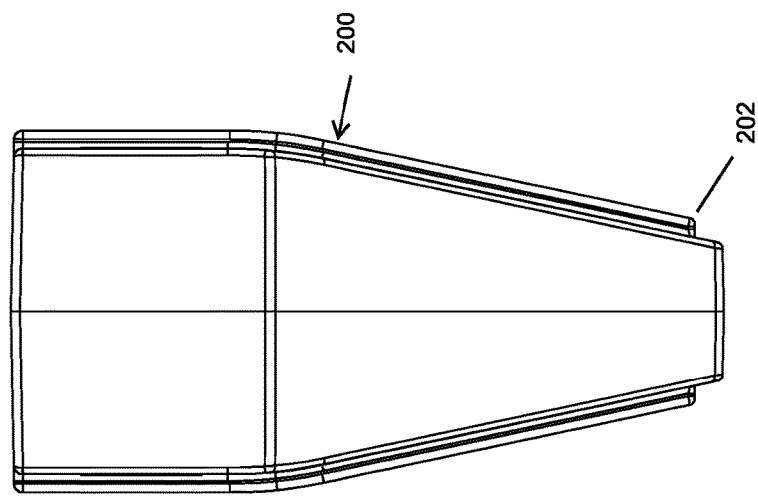
Fig. 34

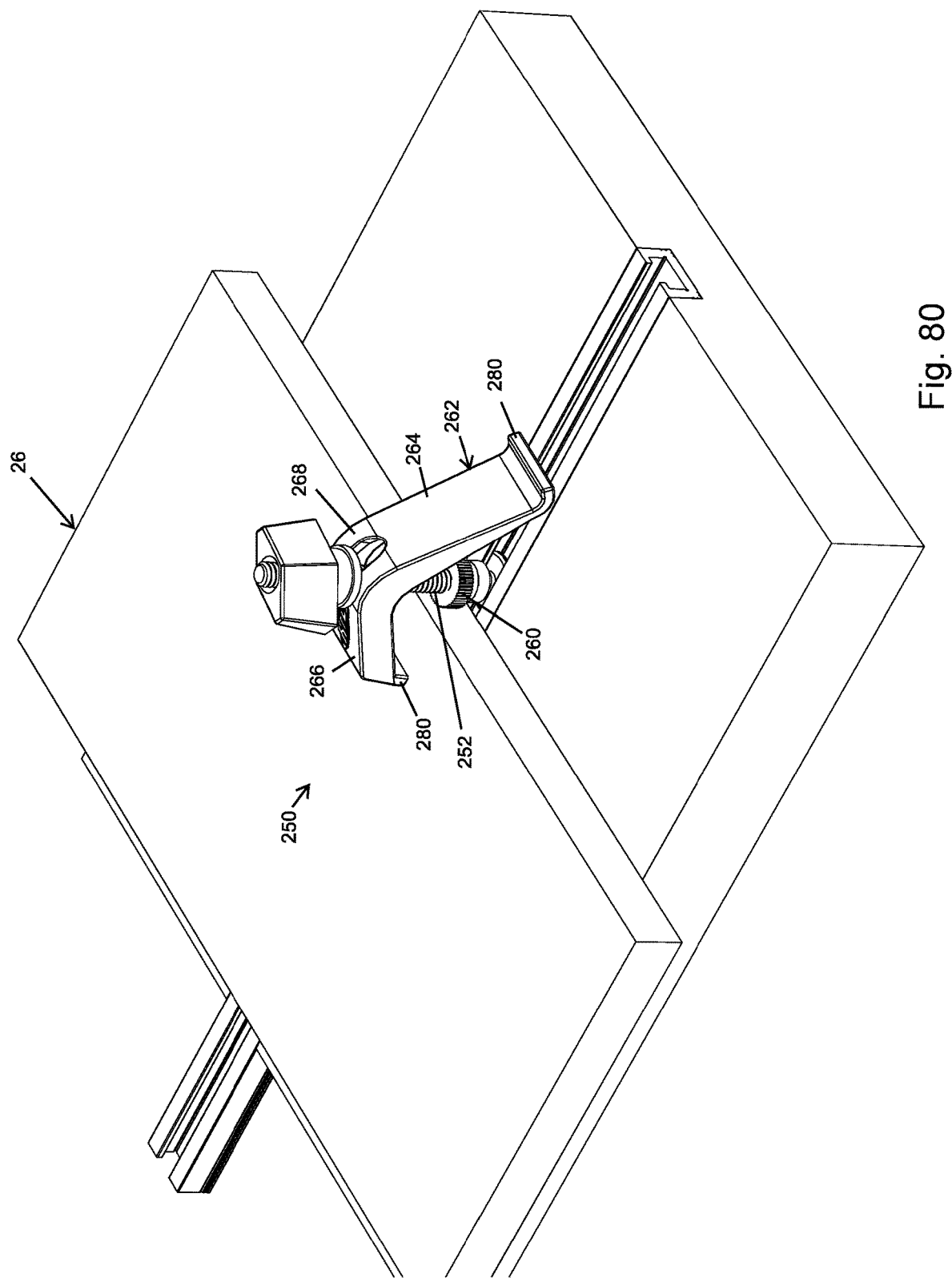

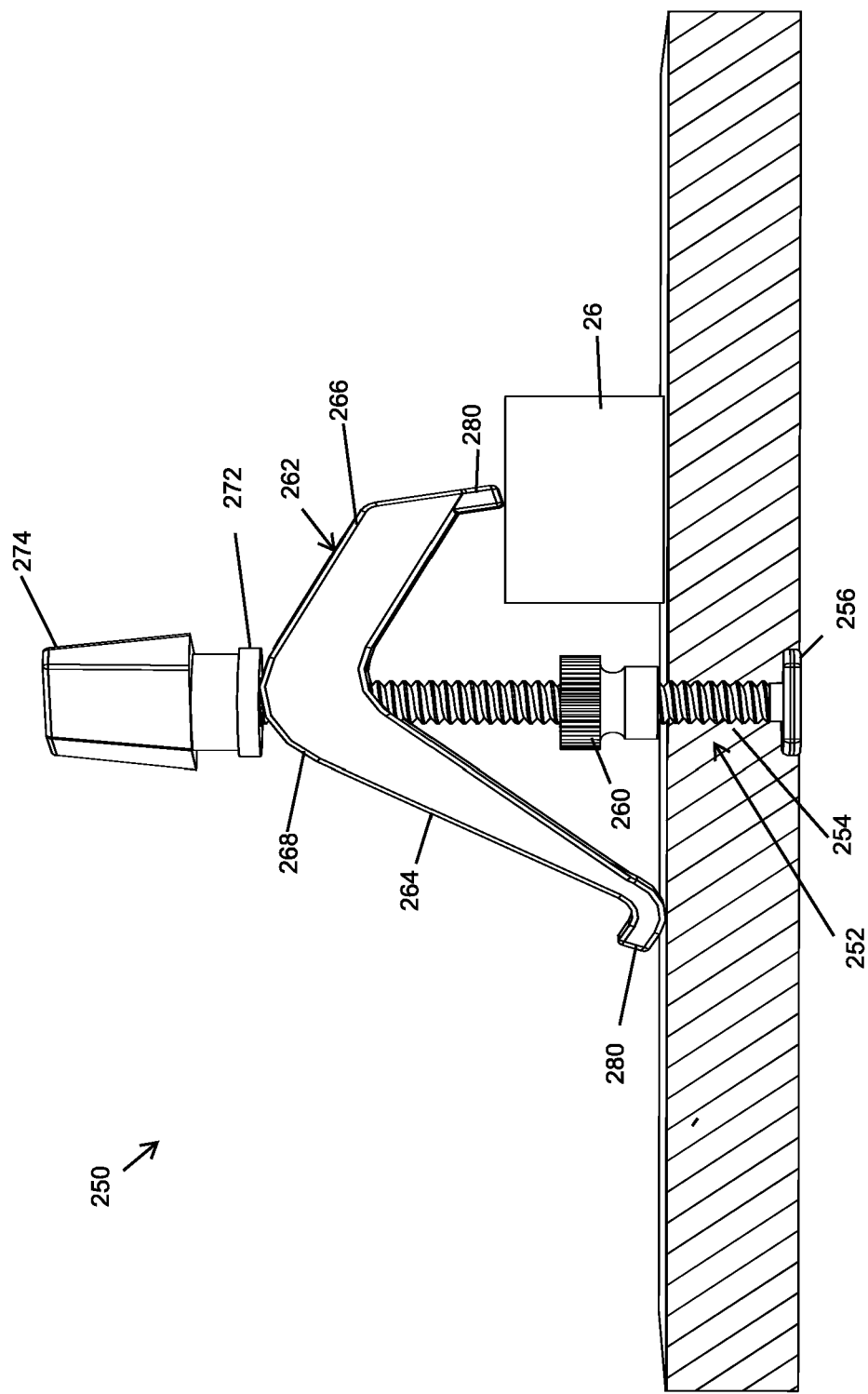

GUIDED CIRCULAR SAW SYSTEM AND METHOD

CROSS REFERENCE TO RELATED PATENT APPLICATIONS

This is a continuation of U.S. patent application Ser. No. 15/787,989 which was filed with the US Patent and Trademark Office on Oct. 19, 2017, the entire contents of which are herein incorporated by reference. This utility patent application also claims priority to U.S. Provisional Patent Application No. 62/410,780 filed on Oct. 21, 2016 entitled Guided Circular Saw System and Method, this provisional patent application is hereby fully incorporated by reference herein.

FIELD OF THE INVENTION

This invention relates to a cutting device. More specifically and without limitation, this invention relates to a device that assists with cutting wood and other materials.

BACKGROUND OF THE INVENTION

A number of systems and devices have been developed for cutting wood and other materials. Common types of cutting systems include: band saws, circular saws and table saws. Each of these saw configurations have their own unique benefits as well as their own unique disadvantages and drawbacks.

Band saws are formed of a rotating saw blade that is formed in the shape of a band. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop. In addition, band saw blades are generally expensive. Also, band saws generally have a slow through-put. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction, it is true that the exposed blade is very dangerous, especially when used by the novice user. Another disadvantage of table saws is that due to the fact that the blade protrudes from a table-top-like surface, table saws are relatively large, heavy, complicated and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop. Yet another disadvantage of table saws is that they have a tendency to kick-back material during cutting.

A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously this can be a very dangerous situation, not to mention a very scary one.

Another disadvantage of table saws is that they can be very difficult to use when cutting large sheets of material because the entire piece of material must be moved, not to mention moved in a manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively in expensive, and unlike table saws, circular saws generally have a blade cover that at least tries to protect the user from the blade when not in use. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately cut small pieces of material with a circular saw. In addition, it is difficult to make a long and straight cut with circular saws. Another disadvantage to circular saws is that the blade guide often gets into the way when a user is attempting to make a cut, which can cause the cutting operation to be less-safe and can cause the cutting operation to be in accurate. Another disadvantage is because the blade rotates upward through the workpiece circular saws tend to cause a great amount of tear out on the upper-positioned surface of the workpiece that is cut.

As such, the prior art cutting systems suffer from many substantial disadvantages including being: unsafe, inaccurate, large, expensive, hard to use, inaccurate, hard to guide, cause tear out, among many other disadvantages.

Therefore, for all the reasons stated above, and the reasons stated below, there is a need in the art for an improved guided circular saw system and method.

Thus, it is a primary object of the invention to provide a guided circular saw system and method that improves upon the state of the art.

Another object of the invention is to provide a guided circular saw system and method that is safe to use.

Yet another object of the invention is to provide a guided circular saw system and method that is efficient to use.

Another object of the invention is to provide a guided circular saw system and method that is relatively inexpensive.

Yet another object of the invention is to provide a guided circular saw system and method that is capable of making long straight cuts.

Another object of the invention is to provide a guided circular saw system and method that can be used to cut both large and small pieces easily and accurately.

Yet another object of the invention is to provide a guided circular saw system and method that is accurate.

Another object of the invention is to provide a guided circular saw system and method that is efficient.

Yet another object of the invention is to provide a guided circular saw system and method that can be used with practically any circular saw.

Another object of the invention is to provide a guided circular saw system and method that can be used with workpieces with a wide range of thicknesses.

Yet another object of the invention is to provide a guided circular saw system and method that is easy to learn how to use.

Another object of the invention is to provide a guided circular saw system and method that is relatively small in size and shape.

Yet another object of the invention is to provide a guided circular saw system and method that provides the benefits of a circular saw and a table saw in a single device.

Another object of the invention is to provide a guided circular saw system and method that holds workpieces in a firm and rigid manner.

Yet another object of the invention is to provide a guided circular saw system and method that is easy to set up.

Another object of the invention is to provide a guided circular saw system and method that is easy to take down.

Yet another object of the invention is to provide a guided circular saw system and method that is formed of a minimum number of parts.

Another object of the invention is to provide a guided circular saw system and method that is simple to use.

Yet another object of the invention is to provide a guided circular saw system and method that is easier to use than prior art systems.

Another object of the invention is to provide a guided circular saw system and method that is unique.

Yet another object of the invention is to provide a guided circular saw system and method that provides new capabilities to existing tools.

Another object of the invention is to provide a guided circular saw system and method that can be used with practically any benchtop.

Yet another object of the invention is to provide a guided circular saw system and method that is high quality.

Another object of the invention is to provide a guided circular saw system and method that has a robust design.

Yet another object of the invention is to provide a guided circular saw system and method that has a long useful life.

Another object of the invention is to provide a guided circular saw system and method that provides accurate and clean cuts.

Yet another object of the invention is to provide a guided circular saw system and method that helps prevent chip tear-out.

Another object of the invention is to provide a guided circular saw system and method that is durable.

Yet another object of the invention is to provide a guided circular saw system and method that saves time.

Another object of the invention is to provide a guided circular saw system and method that is fun to use.

Yet another object of the invention is to provide a guided circular saw system and method that can be used with workpieces of practically any material.

Another object of the invention is to provide a guided circular saw system and method that is easily portable and can be used on a job site.

These and other objects, features, or advantages of the invention will become apparent from the specification, figures and claims.

SUMMARY OF THE INVENTION

A guided circular saw system is presented having a track and a ramp that is connected to a benchtop by a pair of hinge members. Hinge members are formed of a top section, a middle section and a bottom section and facilitate raising and lowering of the track in a quick and easy manner without any tools. The track is raised to facilitate placing a workpiece under the track and then the track is lowered in place thereby engaging and holding the workpiece in place. A sled is attached to a cutting device and the sled and cutting device slides along the track thereby cutting the workpiece. The track includes sacrificial grip strips that extend along the sides of the track and include an upper layer of material that is rigid and a lower layer of material that is compressible and has a high coefficient of friction and thereby holds the workpiece in place during a cutting operation.

BRIEF DESCRIPTION OF THE DRAWINGS

FIG. 34 is an elevation view of an indicator clip or cursor used in association with the sled shown in FIG. 1, the view showing the end of the indicator clip or cursor;

FIG. 80 is a perspective view of the benchtop having a track therein with a clamp having a clamp arm with a rearward section, a forward section and a corner section and a fastener connected to the slot; the view showing the head of the fastener positioned within a slot in the track; the view showing the clamp arm tightened against a workpiece thereby holding the workpiece against the benchtop.

FIG. 81 is a side elevation view of the benchtop having a fastener extending through the benchtop, the view showing a clamp arm with a rearward section, a forward section and a corner section connected to the fastener; the view showing the clamp arm tightened against a workpiece thereby holding the workpiece against the benchtop.

DETAILED DESCRIPTION OF THE INVENTION

Figure 1:
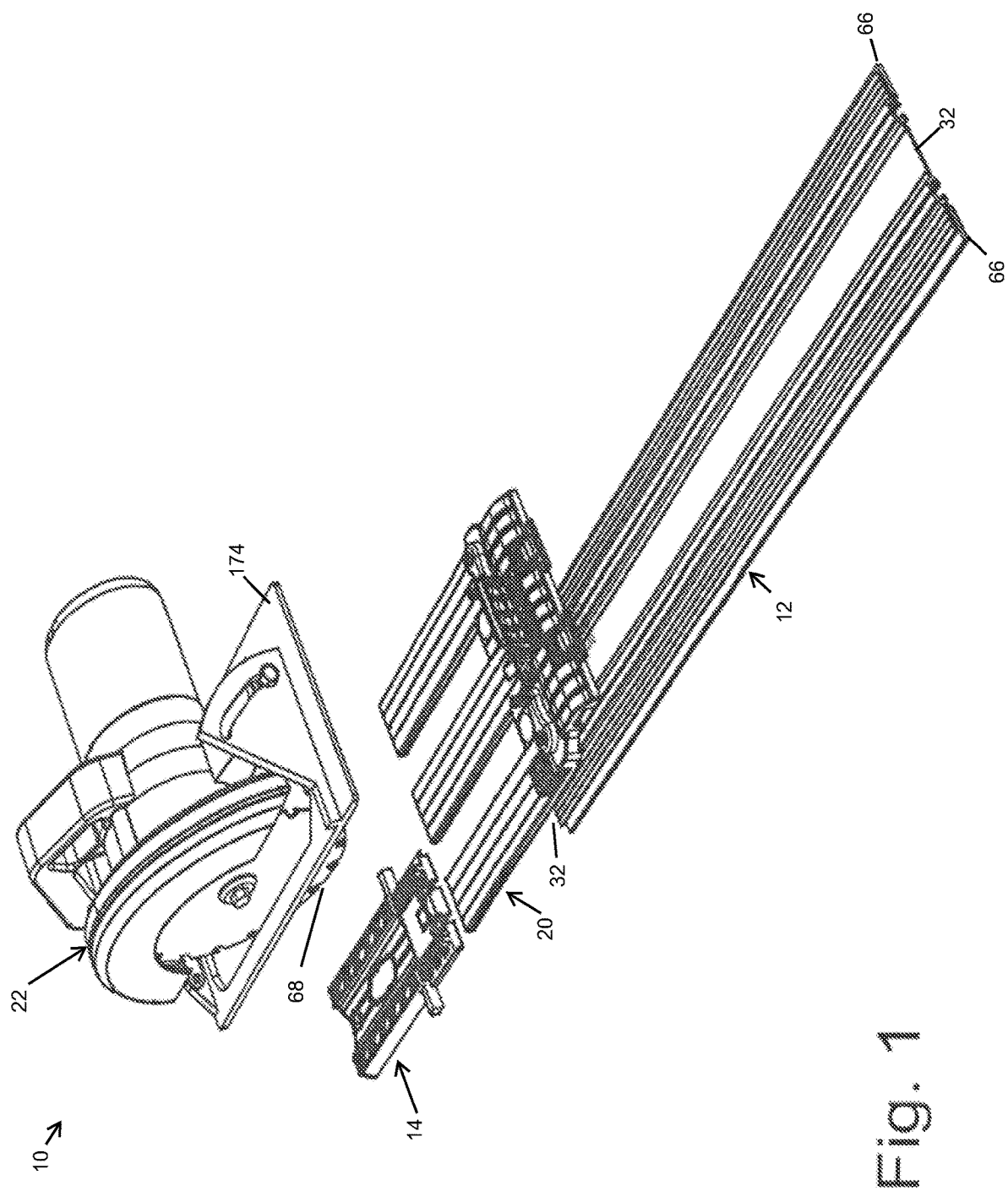
FIG. 1 is a perspective exploded view of a guided circular saw system, the view showing a cutting device, a sled, a ramp and a track; the cutting device is in the form of a circular saw that has a blade and a baseplate; the sled is configured to receive and lock onto the baseplate of the circular saw, the sled has features in its lower surface that cooperate with features in the upper surface of the track such that the sled slides along the track; the ramp is configured to connect to an end of the track and provides a place for the circular saw and sled to rest and be aligned prior to a cutting operation; the track extends a length between opposing ends, wherein the ramp connects to one end, the track includes a pair of T-slots that open toward its bottom surface, and includes a plurality of features that are configured to guide sled along the length of the track; a pair of grip strips are connected to the bottom surface of the track adjacent its outward sides, the grip strips are formed of a rigid upper material and a lower material having a higher coefficient of friction.
Figure 2:
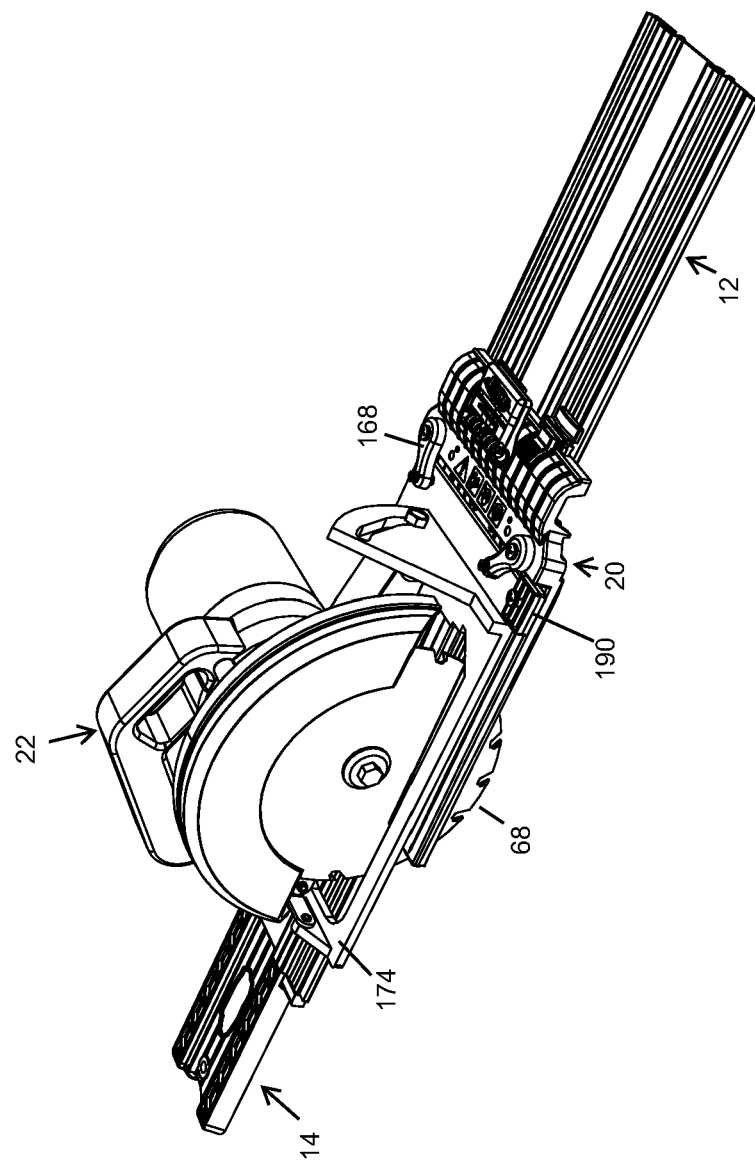
FIG. 2 is a front perspective view of the guided circular saw system shown in FIG. 1, the view showing the cutting device having a right-side blade installed on the sled, the sled positioned on the track and the ramp installed on the track.
Figure 3:
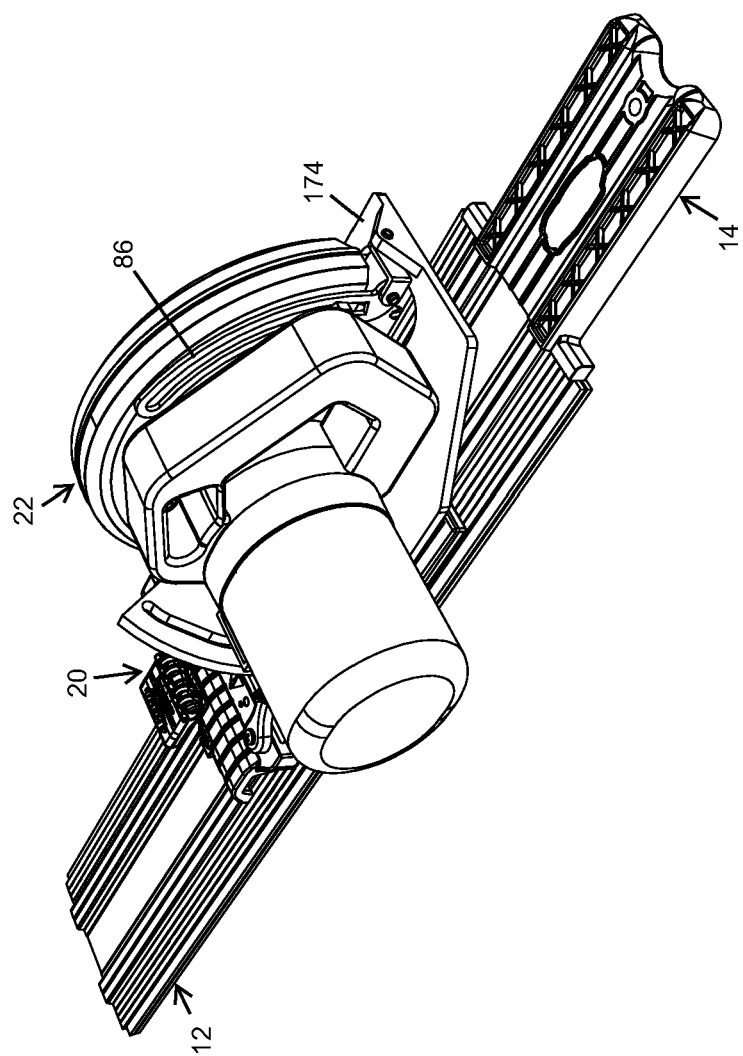
FIG. 3 is a rear perspective view of the guided circular saw system shown in FIG. 1, the view showing the cutting device having a right-side blade installed on the sled, the sled positioned on the track and the ramp installed on the track.
Figure 4:
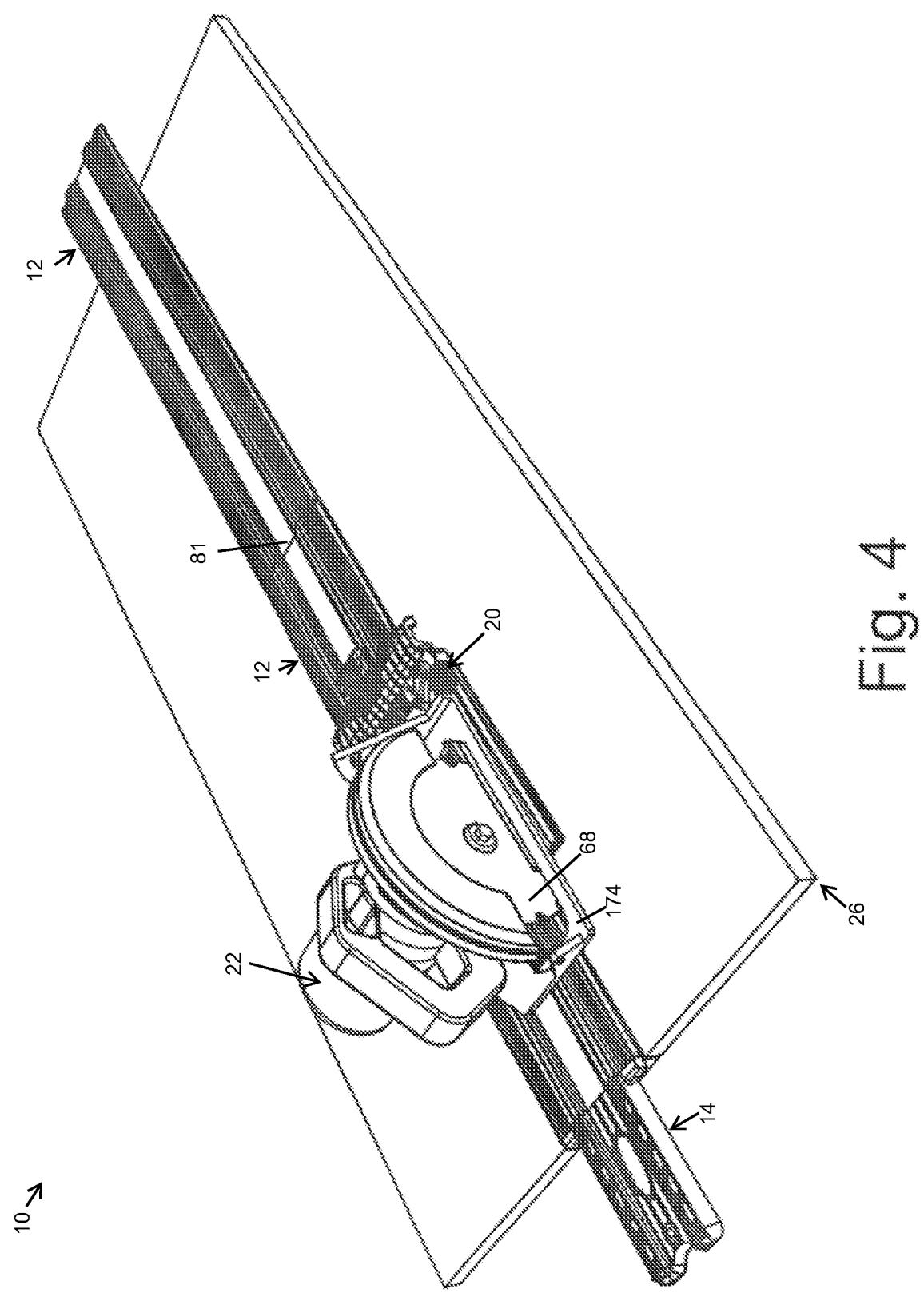
FIG. 4 is a rear perspective view of the guided circular saw system shown in FIG. 1, the view showing the cutting device having a right-side blade installed on the sled, the sled positioned on the track and the ramp installed on the track; the view showing the system positioned on the upper surface of a workpiece and the cutting device partially along the cutting operation; the view showing the stop surface of the ramp positioned against the edge of the workpiece; the view showing the track formed of two track sections that are connected together along a seam line to extend the length of the track.
Figure 5:
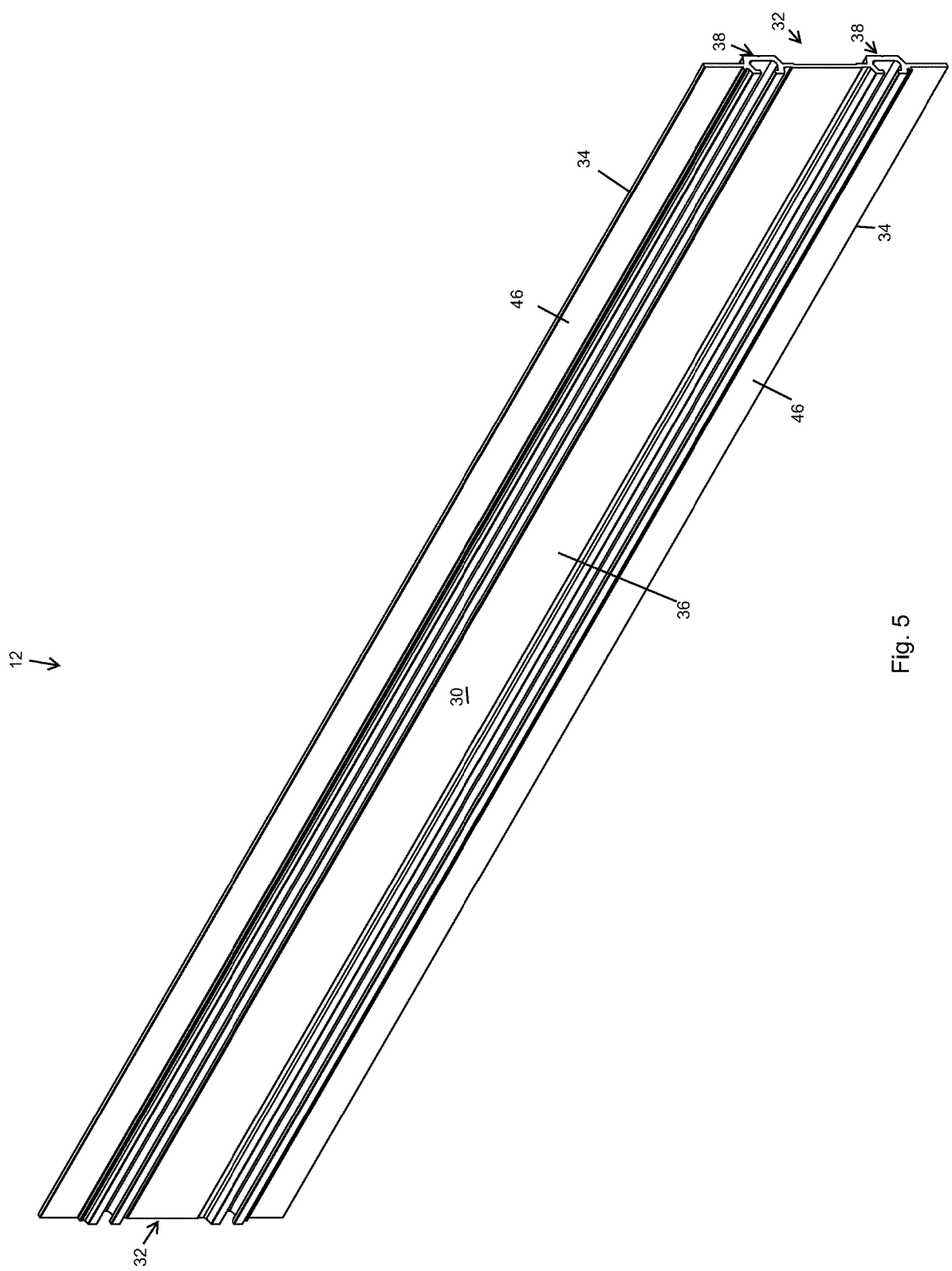
FIG. 5 is a bottom perspective view of the track of the guided circular saw system shown in FIG. 1, the view showing the track extending a length between opposing ends and having a generally elongated planar shape; the view showing the track having a center section, a pair of features connected to the center section, and a tab extending outward from the outward sides of the features; the view showing the profile of the track extending from end to end of the track; the view showing the features extending above and below the center section of the track and having a slot in their lower surface and a hollow interior that forms a T-shaped slot; a pair of tabs extend outward from the outward sides of the features.
Figure 6:
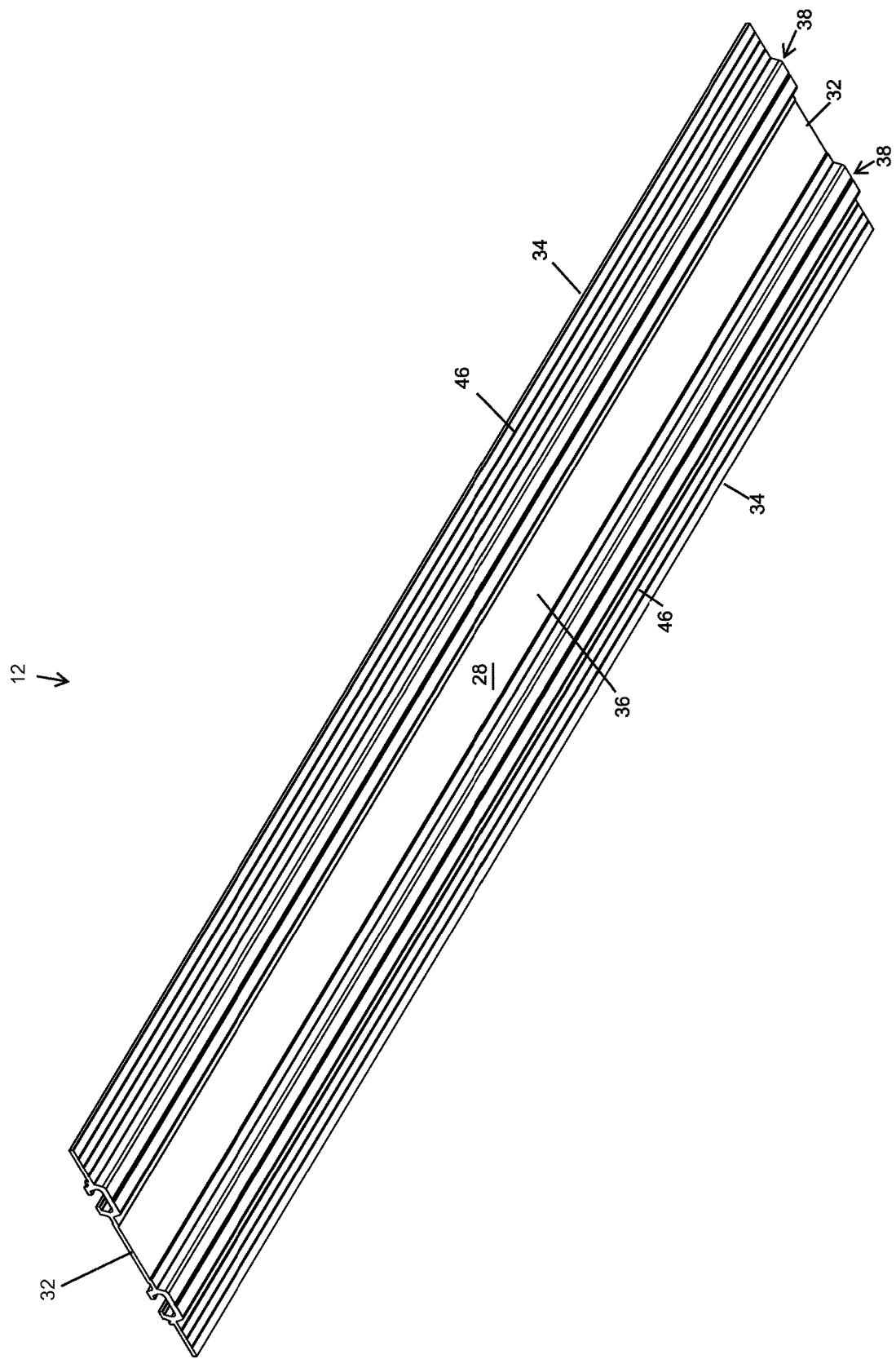
FIG. 6 is a top perspective view of the track shown in FIG. 1.
Figure 7:
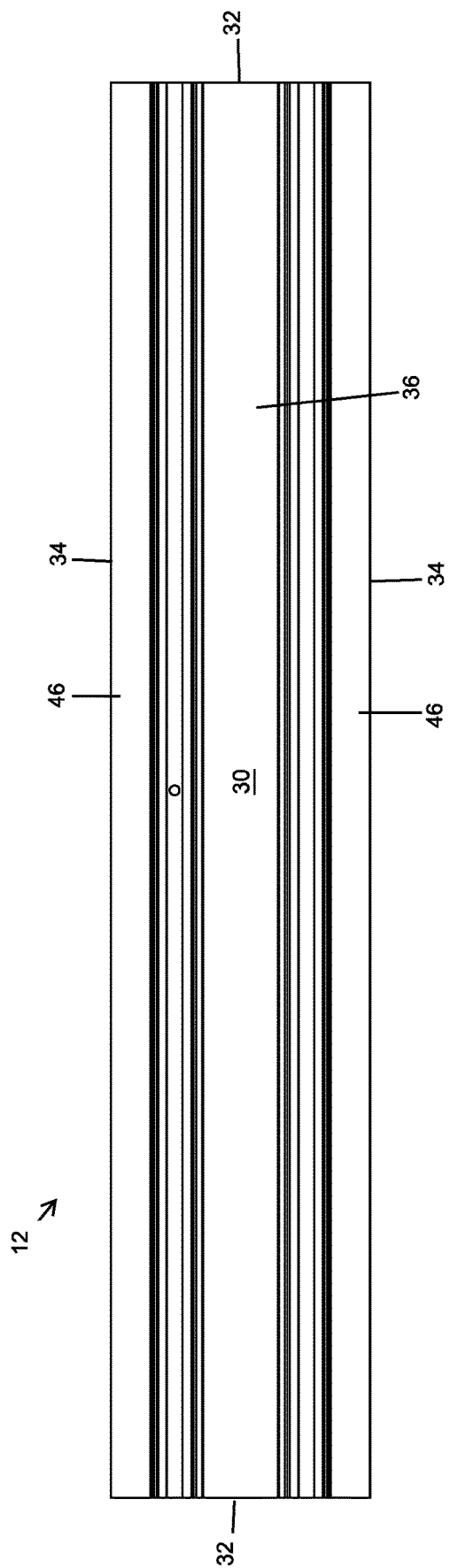
FIG. 7 is a top elevation view of the track shown in FIG. 1.
Figure 8:
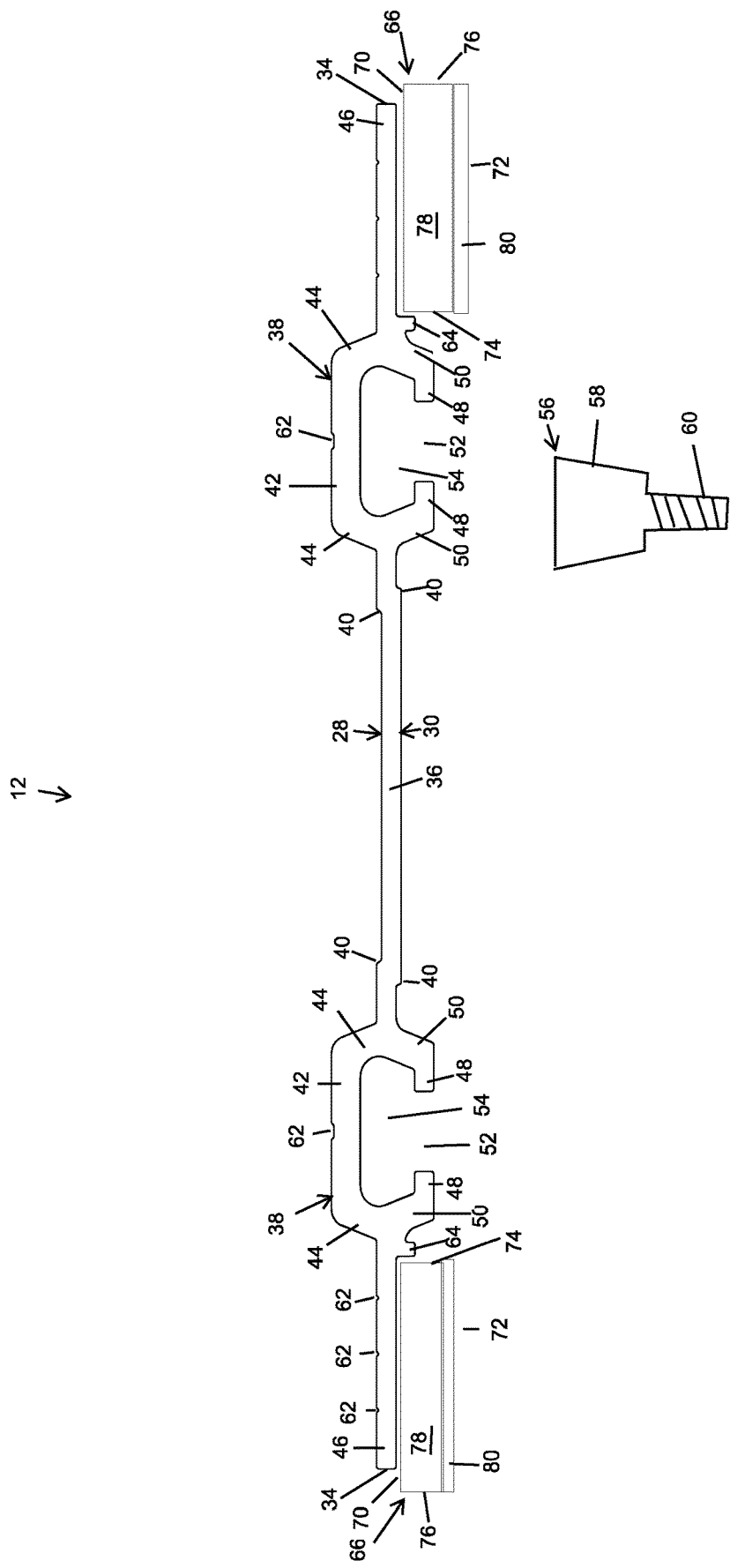
FIG. 8 is an elevation view of a side of the track shown in FIG. 1; the view showing the profile of the track including the generally planar center section, the features that extend above and below the center section and having a T-shaped slot, the tabs connected to the outward ends of the features; the view also showing grip strips connected to the lower surface of the tabs and butted against the exterior surface of a stop to provide alignment to the grip strip; the view showing the grip strips formed of an upper layer that is rigid and a lower layer that has a high coefficient of friction; the view showing a fastener that is configured to fit within the T-shaped slot of a feature.
Figure 9:
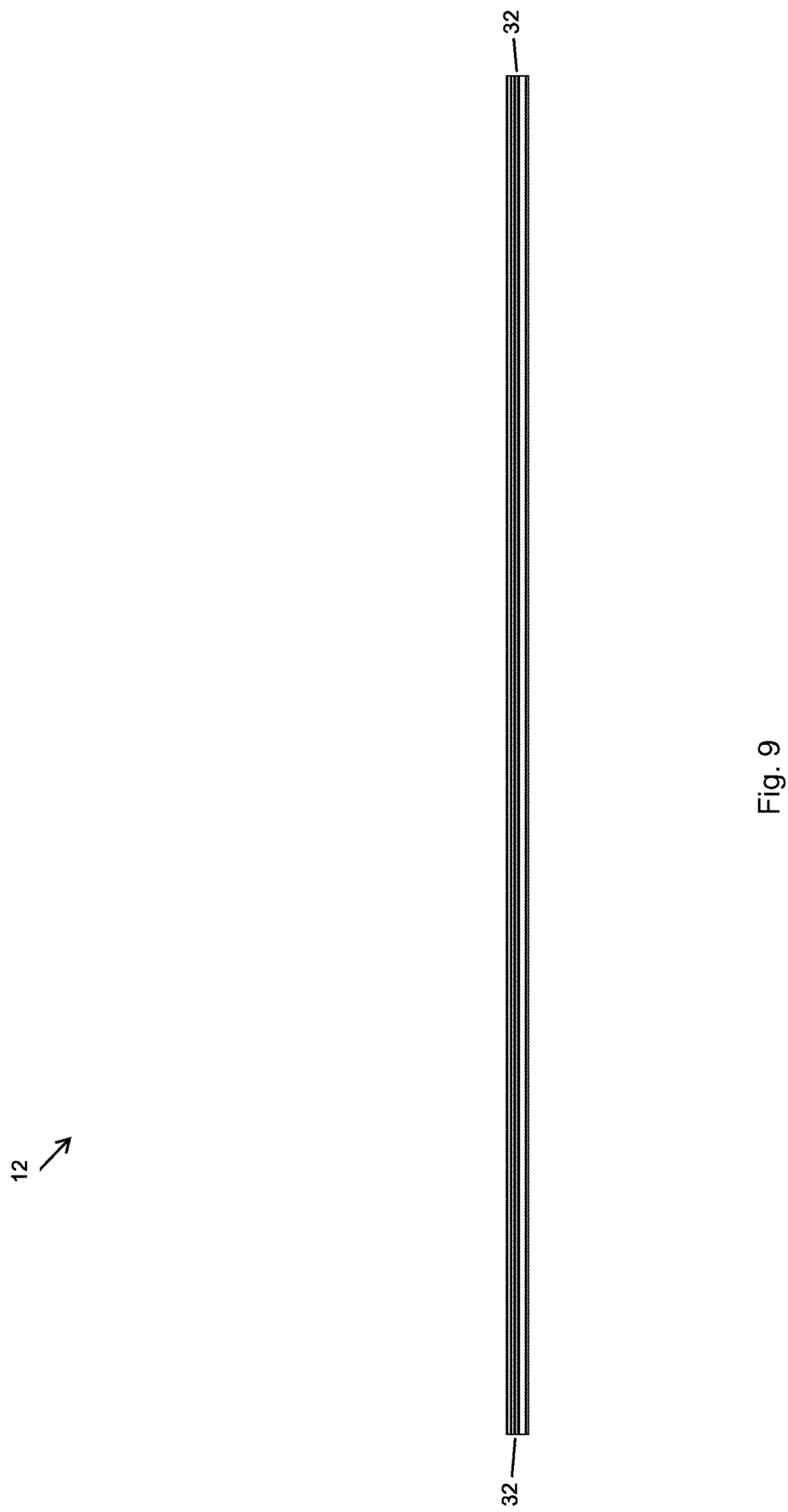
FIG. 9 is an elevation view of a side of the track shown in FIG. 1
Figure 10:
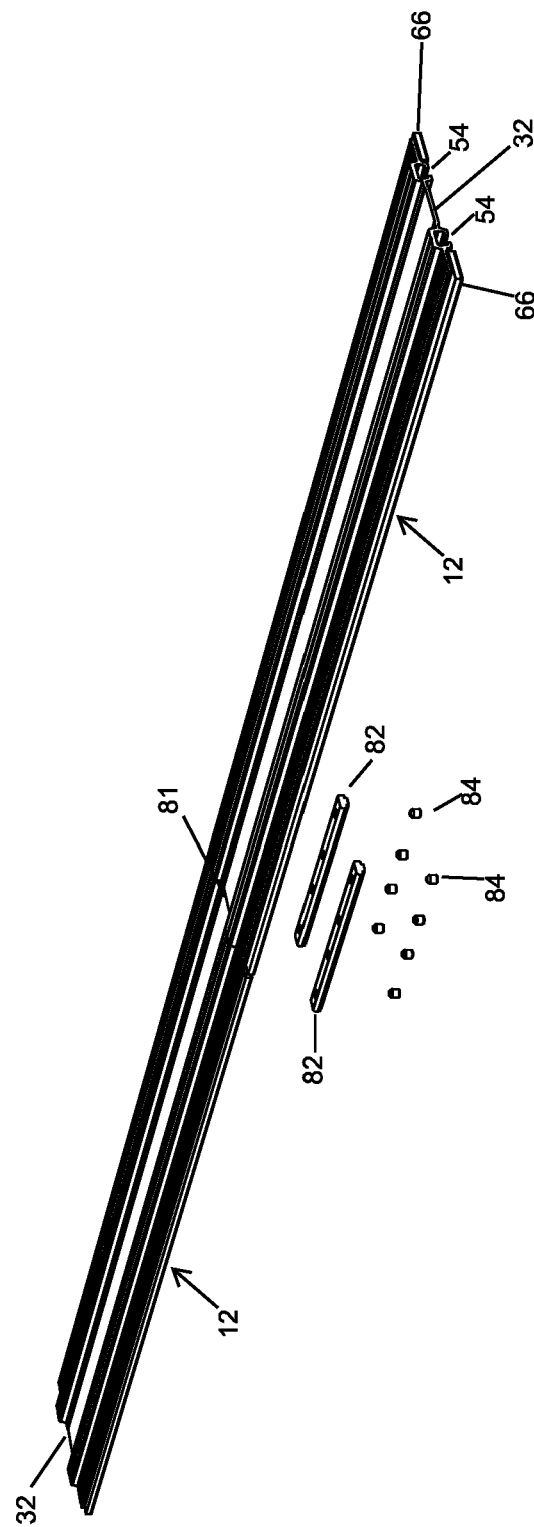
FIG. 10 is a perspective view of the track shown in FIG. 1, the view showing the track formed of a pair of sections connected to one another along a seam line to extend the length of the track; the view showing connecting members and fasteners that are used to connect adjacent track portions.
Figure 11:
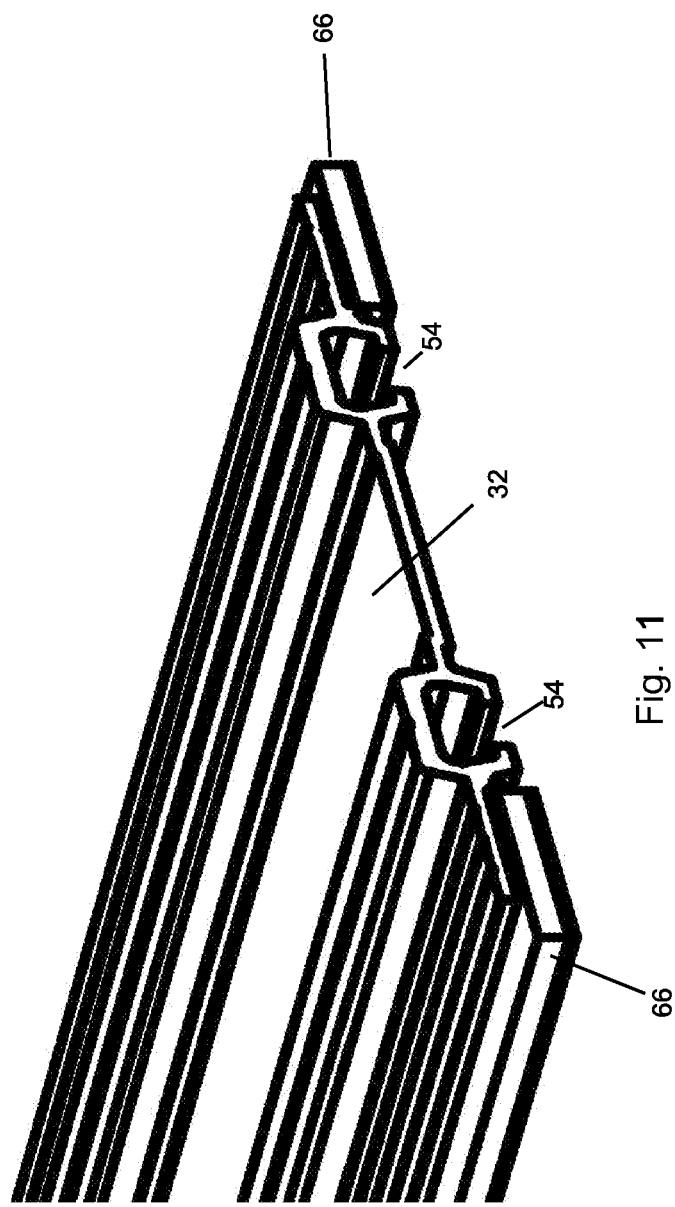
FIG. 11 is a close up perspective view of the end of the track shown in FIG. 1.
Figure 12:
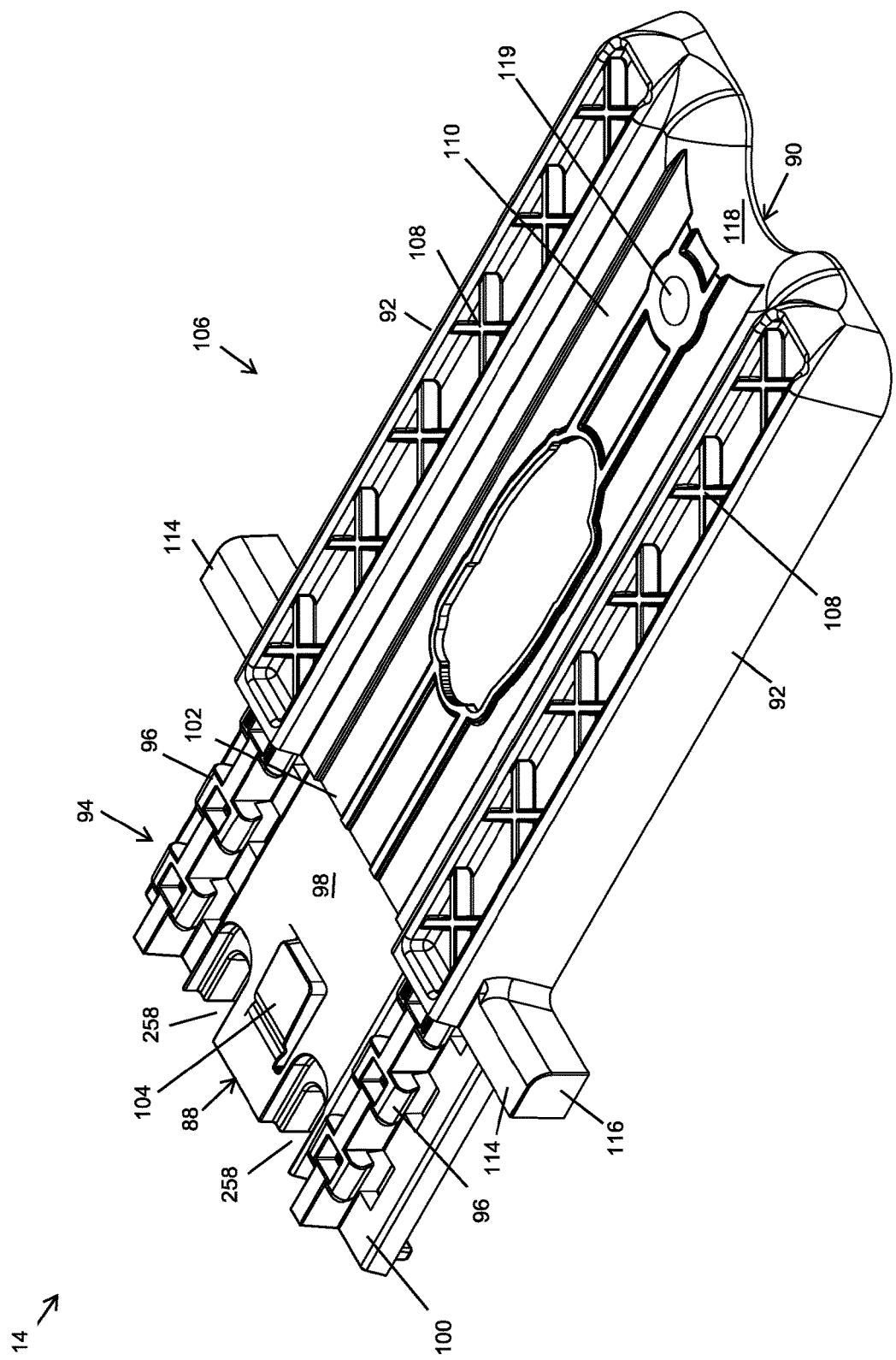
FIG. 12 is a rear perspective view of the upper surface of the ramp shown in FIG. 1; the view showing the main body section and the connecting section; the view showing the connecting members that are configured to fit within the slot and hollow interior of the features of the track as well as a bias member that is configured to impart friction upon the track once installed; the view showing the arms that are positioned at the intersection of the main body section and the connecting section, the arms configured to start a blade guard during a cutting operation; the view showing the ramp having features and a center section that correlate in size and shape to the features and center section of the track, however the view shows that the ramp does not have tabs like the track thereby allowing the blade and blade guard of the cutting device to hang down from the ramp in an unencumbered state prior to a cutting operation thereby allowing a user to rest the cutting device on the ramp prior to a cutting operation.
Figure 13:
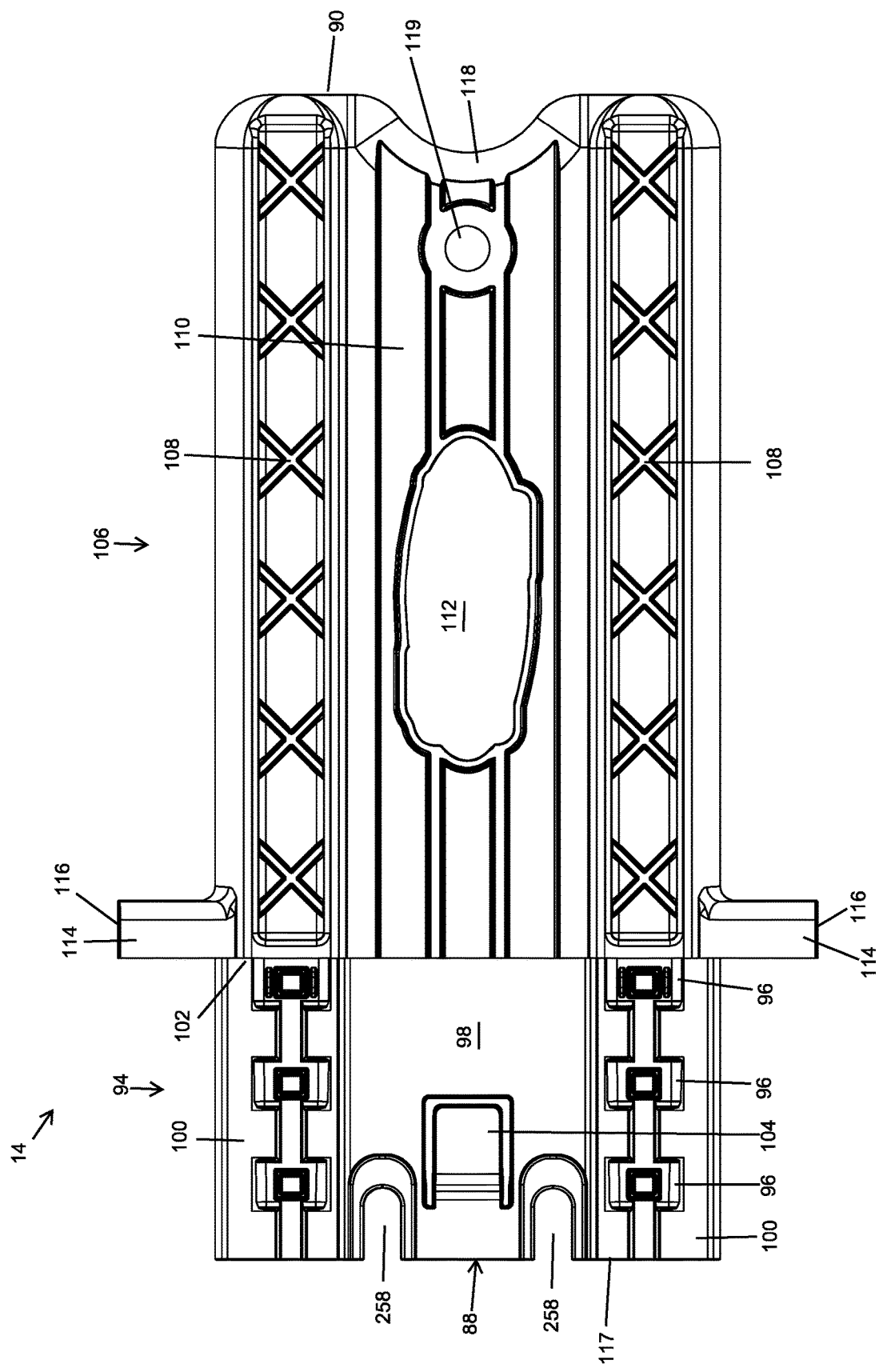
FIG. 13 is an elevation view of the ramp shown in FIG. 1, the view showing the upper surface of the ramp.
Figure 14:
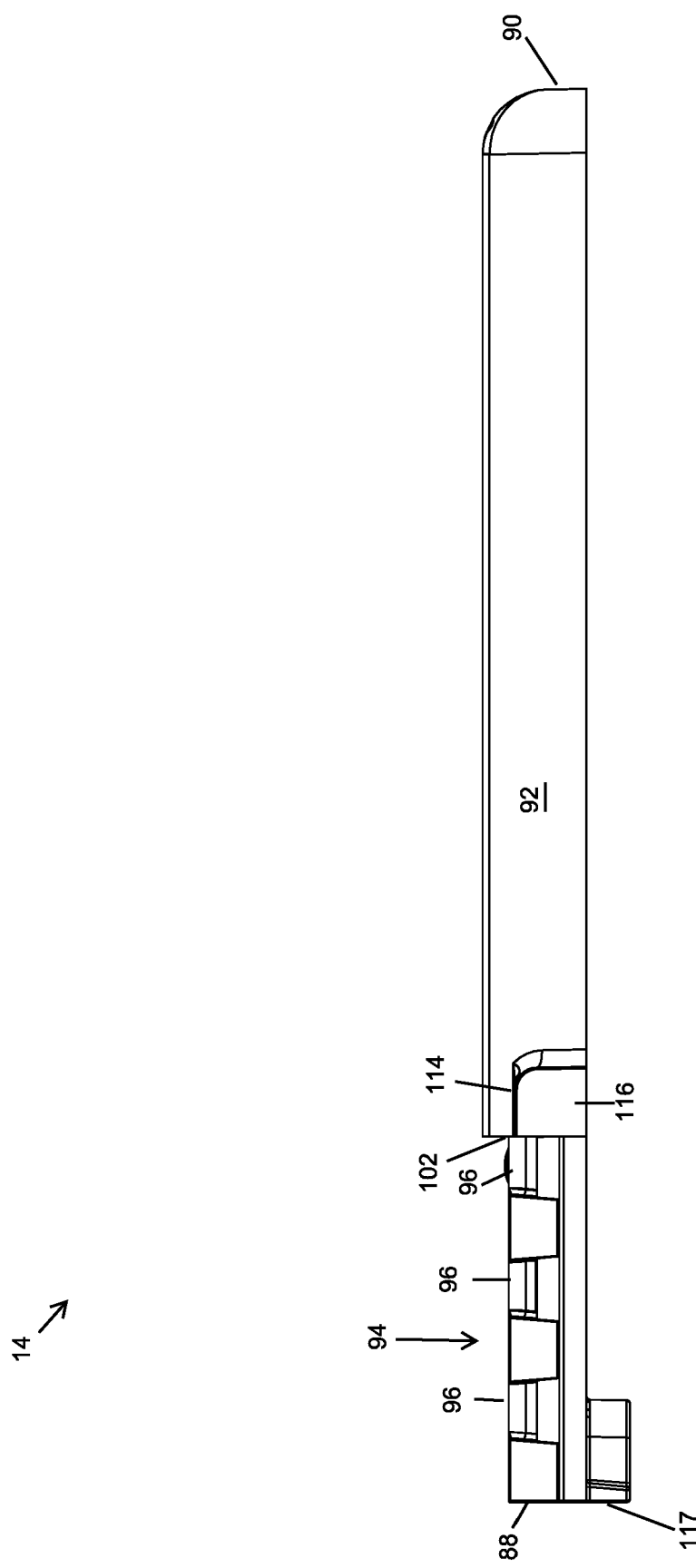
FIG. 14 is an elevation view of the ramp shown in FIG. 1, the view showing the side surface of the ramp; the view showing the step between the connecting section and the main body section; the view showing the stop positioned at the end of the connecting section that is configured to engage an edge of a workpiece.
Figure 15:
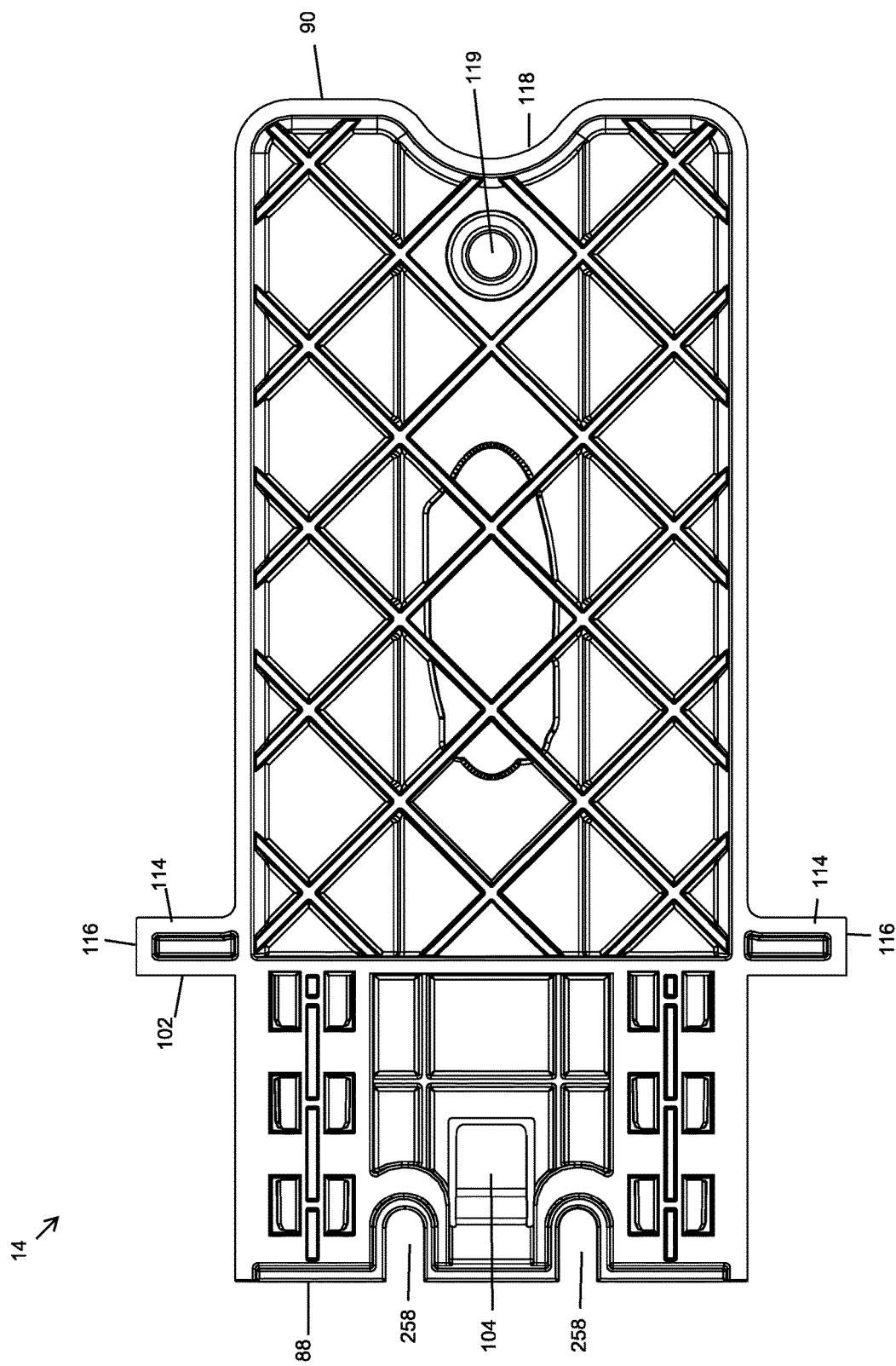
FIG. 15 is an elevation view of the ramp shown in FIG. 1, the view showing the lower surface of the ramp.
Figure 16:
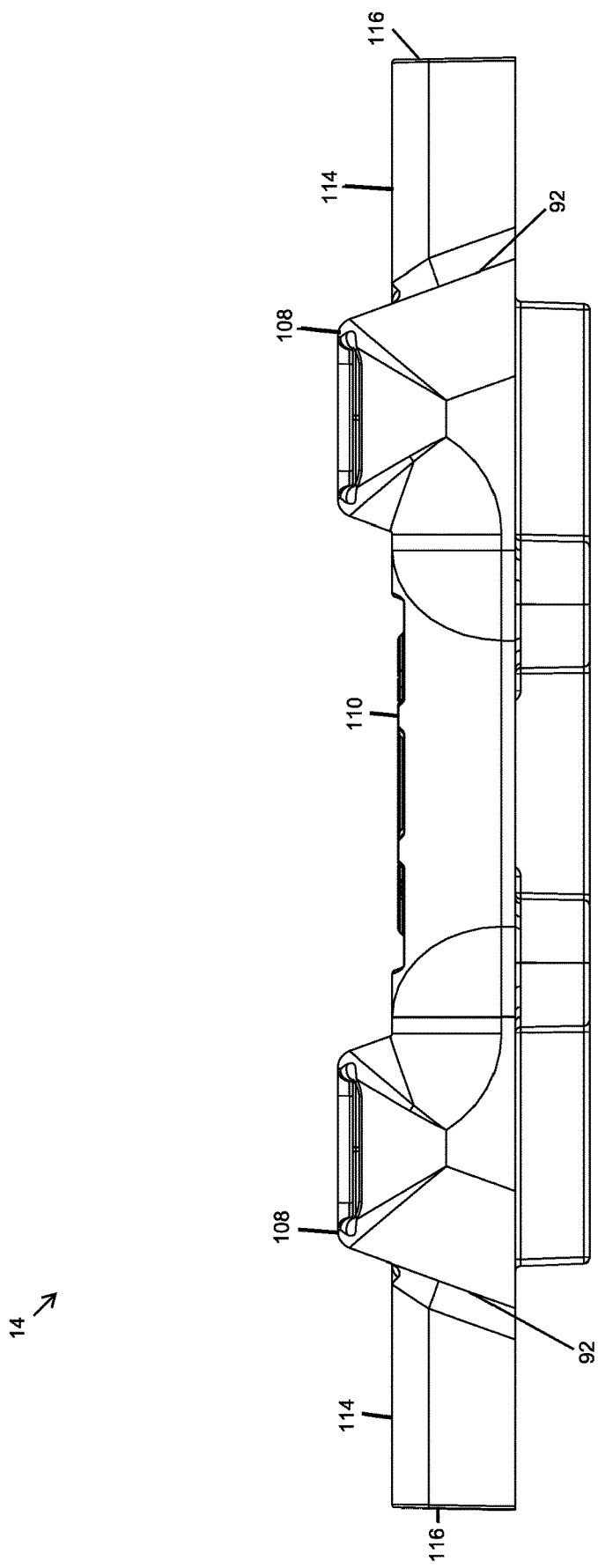
FIG. 16 is an elevation view of the ramp shown in FIG. 1, the view showing the rearward end of the ramp; the view showing the profile of the features extending upward from the center section and the stop extending downward from the ramp; the view showing the arms extending outward from the features.
Figure 17:
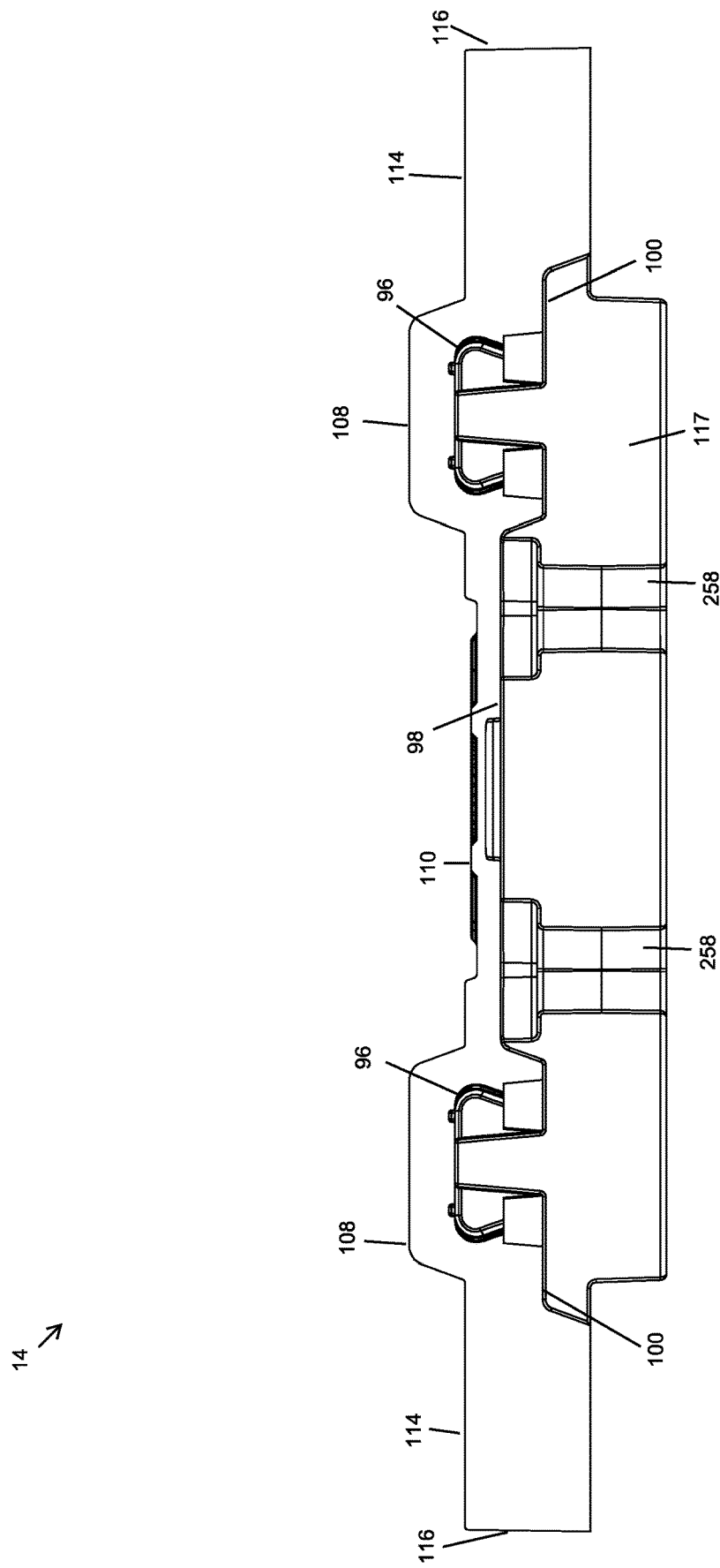
FIG. 17 is an elevation view of the ramp shown in FIG. 1, the view showing the forward end of the ramp; the view showing the profile of the connecting members of the connecting section; the view showing the features extending upward from the center section and the stop extending downward from the ramp; the view showing the arms extending outward from the features.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the invention.

System:

With reference to the figures, a guided circular saw system 10 (system 10) is presented. System 10 is formed of any suitable size, shape and design and is configured to facilitate the safe cutting of large and small workpieces. In the arrangement shown, guided circular saw system 10 includes a track 12, ramp 14, one or more hinge members 16, a benchtop 18, a sled 20, a cutting device 22, an indicator clip 24, and a workpiece 26, among other components.

Track:

Guided circular saw system 10 includes a track 12. Track 12 is formed of any suitable size, shape and design and is configured to receive sled 20 and cutting device 22 and to provide guiding alignment as sled 20 and cutting device 22 slide along the length of track 12 while cutting workpiece 26.

In the arrangement shown, as one example, track 12 includes an upper surface 28, a lower surface 30, extends a length between opposing ends 32 and extends a width between opposing sides 34. Track 12 is generally rectangular in shape, or planar in shape and extends an elongated length from end 32 to end 32.

In the arrangement shown, as one example, when viewing track 12 from an end 32 track 12 includes a center section 36 having a feature 38 positioned on either side of the center section 36. In the arrangement shown, center section 36 is generally flat and planar and connects at its outward sides to the inside edges of features 38. While generally planar, in the arrangement shown, center section 36 includes a step 40, that is positioned inward a distance from the interior edges of features 38. Center section 36 steps down a short distance in both the upper surface 28 and the lower surface 30 at step 40. Step 40 provides an additional alignment feature for sled 20 as is further described herein. In addition, step 40 provides additional structural rigidity to track 12, in much the same way that corrugation provides strength to sheet steel. In addition, step 40 provides relief for chips, particles and dust formed during the cutting process.

In the arrangement shown, as one example, features 38 extend above the upper surface 28 of center section 36 a distance and below the lower surface 30 of center section 36 a distance. In this way, features 38 put an outward boundary on center section 36.

In one arrangement, as is shown, features 38 include an upper wall 42 that extends in approximate parallel spaced alignment to the upper surface 28 of center section 36. The outward edges of upper wall 42 connect to upper sidewalls 44. Upper sidewalls 44 extend from the outward edges of upper wall 42 downward and slightly outward at an angle until connecting to the other portions of track 12. That is, the inwardly positioned upper sidewall 44 connects at its upper end to the inward edge of upper wall 42 and the lower end of upper sidewall 44 connects to the outward edge of center section 36. Similarly, the outwardly positioned upper sidewall 44 connects at its upper end to the outward edge of upper wall 42 and the lower end of upper sidewall 44 connects to the inward edge of tab 46.

In one arrangement, as is shown, features 38 include a lower wall 48 that extends in approximate parallel spaced alignment to the lower surface 30 of center section 36. The outward edges of lower wall 48 connect to lower sidewalls 50. Lower sidewalls 50 extend from the outward edges of lower wall 48 upward and slightly outward at an angle until connecting to the other portions of track 12. That is, the inwardly positioned lower sidewall 50 connects at its lower end to the inward edge of lower wall 48 and the upper end of lower sidewall 50 connects to the outward edge of center section 36. Similarly, the outwardly positioned lower sidewall 50 connects at its lower end to the outward edge of lower wall 48 and the upper end of lower sidewall 50 connects to the inward edge of tab 46. Lower wall 48 also includes a slot 52 therein that provide access to the hollow interior 54 of feature 38.

In the arrangement shown, slot 52 is narrower than hollow interior 54. As such, slot 52, when viewed from the side, forms what is known as a T-slot however any other shape of a slot or other feature is hereby contemplated for use. Fastener 56 is formed to fit within and slide along a length of slot 52 and hollow interior 54. More specifically, head 58 of fastener 56 is sized and shaped to fit within hollow interior 54 within close and tight tolerances and slide there along while the shaft 60 of fastener 56 extends through slot 52. Slot 52 being narrower than hollow interior 54 prevents the head 58 of fastener 56 from pulling out of hollow interior 54.

When viewed from the side, features 38 form a generally hexagonal shape that is wider than it is tall with the upper wall 42 and lower wall 48 positioned in approximate parallel spaced relationship to one another and the angled upper sidewalls 44 and lower sidewalls 50 that connect to the upper wall 42 and lower wall 48, respectively, and then to one another.

Tabs 46 connect to the outward edges of features 38 and extend outwardly therefrom a distance. When viewed from the side, tabs 46 as well as center section 36 are generally centrally aligned with one another. When viewed from the side, tabs 46 are generally flat and planar in shape and are generally aligned in parallel spaced alignment with center section 36, such that center section 36 and tabs 46 on either side form a generally flat and planar member save for the upper and lower protrusion of features 38. In the arrangement shown, tabs 46 include a plurality of groove 62 therein that extend in parallel spaced alignment along the length of tabs 46 from end 32 to end 32. Grooves 62 provide additional structural rigidity to track 12, in much the same way that corrugation provides strength to sheet steel. In addition, grooves 62 provide relief for chips, particles and dust formed during the cutting process. In one arrangement, a similar groove 62 is also positioned in the upper surface of upper wall 42 of feature 38, however in the arrangement shown, this groove 62 in the upper wall 42 is wider than the grooves 62 shown in the tabs 46.

In the arrangement shown, stops 64 are positioned in the lower surface 30 of track 12 and are positioned at the inward edge of tabs 46 and the outward edge of lower sidewalls 50. Stops 64 extend downward from tab 46 in approximate perpendicular alignment to the lateral extension or plane of tabs 46. In the arrangement shown, the lower end of stops 64 is generally square or rectangular in shape. Stops 64 provide a stop surface for the upper inward edge of grip strips 66 as is further described herein. In the arrangement shown, the intersection of the inward edge of the lower surface of tabs 46 with the outward facing edge of stops 64 form a generally perpendicular or right angle intersection, however any other shape is hereby contemplated for use.

Grip Strips:

Grip strips 66 are formed of any suitable size, shape and design and serve to provide grip for track 12 on workpieces 26 as well as to provide a sacrificial edge that has a close tolerance with blade 68 of cutting device 22 so that it prevents or reduces tear-out during cutting.

In the arrangement shown, as one example, grip strips 66 are generally rectangular in shape when viewed from an end and have a generally flat upper surface 70 and a generally flat lower surface 72 that extend in approximate parallel spaced relation to one another. Grip strips 66 extend laterally from an inward edge 74 to an outward edge 76 that extend in approximate parallel spaced relation to one another.

In the arrangement shown, the upper surface 70 of grip strips 66 are engaged with the lower surface of tabs 46 with the inward edge 74 of grip strips 66 engaged with the outward side of stop 64. Grip strips 66 are connected to track 12 by any manner, method or means such as by using two sided tape, adhesive, gluing, cementing, screwing, bolting, welding, using fitting features, using snap fitting features, or the like, or by connecting by any other manner method or means. The outward edge 76 of grip strips 66 extend past the outward edge 34 of track 12 a distance.

Grip strips 66 are intended to be partially sacrificial. That is, on the first pass of the blade 68 of cutting device 22, the blade 68 is intended to cut the grip strip 66 down to precisely match the position of blade 68. In this way, the outward edge 76 of grip strip 66 is precisely positioned to terminate just before the blade 68 of cutting device 12. As such, when cutting device 22 is a circular saw, the blade 68 rotates upward into the workpiece 26. When the outward edge 76 of grip strip 66 terminates within close proximity to blade 68, or even within frictional engagement with blade 68, this helps to prevent tear-out of the upper surface of the workpiece 26 during cutting by providing a supporting surface to the workpiece 26 immediately adjacent where it is being cut. As such, by providing the partially consumable or sacrificial grip strip 66 this provides better and nicer cuts.

In the arrangement shown, while the track 12 is generally formed of a metallic material or metal alloy such as aluminum or an aluminum alloy, or other metal material, grip strips 66 are generally formed of a plastic or composite material. This is to allow for easy cutting of grip strip 66 down to size during use without damaging blade 68.

Grip strip 66 is intended to provide both increased grip on workpiece 26 while also providing enough structural rigidity to extend past the end 34 of tab 46 and withstand cutting by blade 68 without substantial give, bend or deformation while also not being so hard that the grip strip 66 cannot be easily cut by blade 68 without damage, while also not being so fragile that the grip strip 66 shatters or breaks upon impact or during cutting-down of the grip strip 66.

In one arrangement to provide both desired grip as well as desired structural rigidity, grip strip 66 is formed of an upper layer 78 and a lower layer 80. Upper layer 78 is formed of a generally rigid plastic material that provides the needed structural rigidity to grip strip 66. Due to its strength and rigidity, upper layer 78 tends to be relatively slick and have a low coefficient of friction. As such, if upper layer 78 itself were in direct engagement with workpiece 26, track 12 and/or grip strip 66 would have a tendency to slip along the workpiece 26, or said another way there would be a low coefficient of friction between the track 12/grip strip 66 and the workpiece 26. In contrast, and to correct this potential deficiency, lower layer 80 is formed of a more flexible or more compressible material than the upper layer 78, which is more compressible than the metallic material of track 12. The lower layer 80 has a higher coefficient of friction than the upper layer 78, and a higher coefficient of friction than the metallic material of track 12, and therefore the lower layer 80 provides enhanced grip on workpiece 26. The enhanced grip of the lower layer 80 of grip strip 66 allows the track 12 to stay in place during a cutting operation thereby allowing for a cleaner, more accurate and safer cut. Also, the opposite is true. That is, the high coefficient of friction of the material of lower layer 80 helps to hold the workpiece 26 or workpieces 26 in place and prevent them from moving during a cutting operation thereby allowing for a cleaner, more accurate and safer cut.

In one arrangement, the upper layer 78 and lower layer are formed of a single piece construction, such as extruding two flowable or semi-flowable materials at a single time, such as dual durometer extrusion or dual material extrusion operation, or molding the two materials together at the same time, such as a dual durometer or dual material molding operation. Alternatively, the two layers are formed independently of one another and are then connected together by any manner, method or means such as by using two sided tape, adhesive, gluing, cementing, screwing, bolting, welding, using fitting features, using snap fitting features, or the like, or by connecting by any other manner method or means. In another arrangement, a first layer is formed through any process such as extrusion, molding, or the like and the second layer is added to the formed first layer in a secondary manufacturing process such as molding, extrusion, spray deposition or the like processes.

Durometer or Shore Durometer is one of several measures of the hardness of a material. Higher numbers indicate harder materials whereas lower numbers indicate softer materials. Hardness may be defined as a material's resistance to indentation. Durometer is typically used as a measure of hardness in polymers, elastomers, and rubbers, although it is applicable to most if not all other materials as well. While the durometer of a material does not necessarily or always define or correlate to the coefficient of friction of a material (e.g. how much grip or stick a material has when placed on another material) there is often a high correlation with a material's durometer and its coefficient of friction. That is, it is often the case that higher durometer materials, which are harder, tend to have a low coefficient of friction, meaning they are slicker, whereas in contrast lower durometer materials, which are softer, tend to have a high coefficient of friction, meaning they are sticker or provide more grip when in contact with another material.

In one example, the upper layer 78 of grip strip 66 has a higher durometer and a lower coefficient of friction compared to the lower layer 80 which has a lower durometer and a higher coefficient of friction. In this way, by adding a thicker layer, upper layer 78, that is relatively hard but does not engage the workpiece 26 and a thinner layer, lower layer 80, that is relatively soft and has a high coefficient of friction that engages the workpiece 26 the grip strip 66 harnesses the benefits of both of these materials in a single piece that provides the benefits of both materials in a single component thereby reducing the number of parts and simplifying the resulting product/system 10.

This arrangement also provides the benefit of eliminating the need to provide one or more dedicated grip strips to the bottom of track 12 that only serve to provide grip to workpiece 26 as well as dedicated chip strips to along the sides 34 of track 12 that only serve to provide chipping protection. This arrangement also provides the benefit of providing grip to workpiece 26 at the exact position wherein the chipping protection is needed, adjacent blade 68, which helps to provide a cleaner cut and prevents movement at the sight of the cut. As such this arrangement with upper layer 78 being rigid and lower layer 80 having a high coefficient of friction provides a substantial advantages.

Connecting Members:

In many applications, it is desirable to cut long work pieces. To facilitate cutting long work pieces, an elongated track 12 may be used. However, shipping and transporting an elongated track 12 is cumbersome. To resolve this problem and to improve shipping, storage, transportation and portability among other problems, two or more tracks 12 are connected together in end 32 to end 32 alignment with one another along a seamline 81. To facilitate this end 32 to end 32 connection, connecting members 82 are inserted within the hollow interior 54 of features 38 and are screwed tight against the track 12 using fasteners 84 that extend through slot 52. These connecting members 82 are configured to slidably fit within hollow interior 54 and/or slot 52 within close and tight tolerances while sliding therein. As such, when viewed from the an end, connecting members 82 have a profile that corresponds in size and shape to the profile of hollow interior 54 and slot 52 of track 12. Once the connecting members 82 are positioned to extend across seamline 81, the intersection of both end-to-end tracks 12, the connecting members 82 are tightened in place with fasteners 84 thereby essentially forming a single elongated track 12. This process is repeated for as many track segments as is necessary to achieve the desired length of track 12. Once locked together with connecting member 82 and fasteners 84, neither the connecting members 82 or fasteners 84 protrude below the lower surface of lower wall 48 of features 38. As such, connecting two or more tracks 12 together does not disrupt the smooth and flat bottom surface or plane formed by grip strips 66 and/or other components of track 12.

While two features 38 are shown for use with track 12, any number of features 38 are hereby contemplated for use such as one, three, four or more.

Ramp:

Guided circular saw system 10 includes a ramp 14. Ramp 14 is formed of any suitable size, shape and design and is configured to provide a resting point or starting point for cutting device 22 to start the cutting operation while providing clearance for the blade guard 86 that covers blade 68 of cutting device 22. Ramp 14 is also configured to start the blade guard 86 before workpiece 26 is engaged thereby increasing the accuracy of the cutting operation by eliminating any interaction between the blade guard 86 and the workpiece 26.

In the arrangement shown, as one example, ramp 14 extends a length from a forward end 88 to a rearward end 90 and a width between opposing sides 92. The forward end 88 includes a connecting section 94 that is configured to facilitate a connection to an end 32 of track 12. In the arrangement shown, connecting section 94 includes a pair of connecting members 96 that are sized and shaped to fit within the slot 52 and hollow interior 54 of features 38. As such, when viewed from the an end 88, connecting members 96 have a profile that corresponds in size and shape to the profile of hollow interior 54 and slot 52 of track 12.

Connecting section 94 also includes a center section 98 that is generally planar in shape and extends between and connects opposing connecting members 96. When ramp 14 is connected to an end 32 of track 12, the upper surface of center section 98 of ramp 14 is positioned just below the lower surface of center section 36 of track 12 and the two planes are positioned in approximate parallel spaced relation to one another. Connecting section 94 also includes a tab 100 that connects at its inward edge to the outward edge of connecting members 96 and extends outward therefrom a distance. When ramp 14 is connected to an end 32 of track 12, the upper surface of tabs 100 of ramp 14 are positioned just below the lower surface of the outward positioned lower walls 48 of features 38 of track 12 and the two planes are positioned in approximate parallel spaced relation to one another. The outward ends of tabs 100 terminate just prior to the inward edge of grip strips 66.

The rearward end of center section terminates in a step 102 that extends upward from the components of the connecting section 94. Step 102 is configured to engage an end of track 12 when ramp 14 is installed on track 12 and in this way step 102 serves as a stop surface indicating that the ramp 14 is fully inserted onto track 12 when end 32 of track 12 engages step 102. In one arrangement, the upper corner or edge of step 102 is angled or chamfered. This angled or chamfered upper edge or corner facilitates easy sliding of the sled 20 back over the ramp 14 when the sled 20 moves rearward.

Connecting section 94 facilitates connection of ramp 14 to an end 32 of track 12. In the arrangement shown, ramp 14 is connected to track 12 by aligning connecting members 96 with the slot 52 and hollow interior 54 of features 38. Once aligned in this manner, the connecting members 96 are slid into the slot 52 and hollow interior 54 of features 38 until the step 102 engages the end 32 of track 12. In this position, step 102 is in flat and flush engagement with the end 32 of track 12. In this position, center section 98 of connecting section 94 is positioned just below the center section 36 of track 12, and the tabs 100 of connecting section 94 are positioned just below the tabs 46 of track 12. In this way, the overlapping alignment of the center section 98 and tabs 100 of connecting section 94 with the center section 36 and tabs 46 of track 12 provide increased stability and rigidity and alignment to the connection between track 12 and ramp 14.

Center section 98 of connecting section 94 also includes a bias member 104. Bias member 104 is formed of any suitable size, shape and design and is configured to engage and apply a force between ramp 14 and track 12 to prevent the unintentional separation between the two as well as to provide increased friction between the two components track 12 and ramp 14. In the arrangement shown, bias member 104 is a spring loaded tab that has a connected end towards the forward end 88 of ramp 14 and a free end toward the rearward end 90 of ramp 14 that extends upward from the center section 98 and engages the bottom surface of the center section 36 of track 12, thereby holding the two components together.

Rearward of step 102, ramp 14 includes a main body section 106 that takes on the approximate profile of that of the track 12 without the tabs 46. That is, main body section 106 includes a pair of features 108 that are sized and shaped to correspond with the size and shape of features 38 of track 12. In the arrangement shown, features 108 have a skeletonized appearance, so as to maximize strength and rigidity while minimizing material usage and providing recess for chips and debris so as to avoid interference with sled 20. Despite the skeletonized appearance of features 108, the profile of features 108 corresponds to the profile of features 38 in track 12. Main body section 106 also includes a center section 110 that is generally planar in shape and extends between opposing features 108 and is sized and shaped to correspond with the size and shape of center section 36 of track 12. In this way, when ramp 14 is connected to the end 32 of track 12 ramp 14 essentially extends the length of the upper surface of center section 36 and features 38 a distance. However, the main body section 106 of ramp 14 does not include the tabs 46 of track 12. By ramp 14 not having tabs 46 this provides room for blade 68 as well as blade guard 86. This allows a user to place sled 20 with attached cutting device 22 on ramp 14 without interference with blade 68 or blade guard 86.

In the arrangement shown, while features 108 have approximately the same profile as the upper surface of features 38 of track 12, the features 108 of ramp 14 have a skeletonized configuration that reduces material cost, provides recesses for chips, dust and debris so that it does not interfere with a cutting operation, and provides additional structural rigidity to the ramp 14. Similarly, while the center section 110 has approximately the same profile as the center section 36 of track 12, the center section 110 of main body section 106 includes additional ribs or structural features that reduces material cost, provides recesses for chips, dust and debris so that it does not interfere with a cutting operation, and provides additional structural rigidity to the ramp 14. Center section 110 also includes a recess 112 that is configured to receive a manufacturers label or logo.

This configuration of an extension of the length of the upper surface of center section 36 and features 38 of track 12 provides a starting place or resting place for sled 20 prior to starting a cutting operation. By main body section 106 not having tabs connected to the side of the features 108, this provides room and clearance for the blade 68 and blade guard 86 of cutting device 22.

Ramp 14 also includes a pair of arms 114 that are positioned at the forward end 88 of main body section 106 and terminate at step 102. Arms 114 extend outward from the forward outward sides of features 108 and are configured to cover the profile of tabs 46 of track 12 when ramp 14 is installed on track 12. The vertical height of arms 114 is greater than tabs 46 and grip strips 66. Arms 114 however do not cover the profile of grip strips 66. Or, said another way, grip strips 66 extend past the outward ends 116 or arms 114.

When sled 20 is placed on the ramp 14 the recess or relief provided by ramp 14 not extending past the outward edges of features 108 allows the blade 68 and blade guard 86 to hang down from the ramp 14, while the sled 20 rests on the ramp 14. In this position, when the sled 20 is slid forward, the blade guard 86 of cutting device 22 engages arm 114. Notably, the blade guard 86 engages the arm 114 but the blade 68 does not engage the arm 114. This engagement between blade guard 86 and arm 114 causes the blade guard 86 to retract before the blade 68 reaches the grip strip 66 and/or workpiece 26. This retraction of the blade guard 86 before reaching the workpiece 26 facilitates easier and more-accurate cutting as the user does not need to overcome the resistance of the blade guard 86 while simultaneously dealing with the dynamics of starting to cut workpiece 26. This improves safety, makes the cutting device 22 easier to use, improves safety, increases the level of control the user has over the cutting device 22 and increases the user confidence while cutting.

The forward end 88 of connecting section 94 includes a stop 117. Stop 117 is formed of any suitable size, shape and design and is configured to engage the edge of workpiece 26 so as to align the track 12 with the edge of the workpiece 26 and to prevent further forward movement of the track 12 with respect to the workpiece 26 during a cutting operation. In the arrangement shown, when viewed from the side, stop 117 is a generally flat and planar surface that establishes a generally perpendicular surface to the planar lower surface 30 of track 12 and extends downward therefrom. As such, when ramp 14 is attached to an end of track 12 the track 12 is placed on the upper surface of a workpiece 26 the track 12 is slid forward until the stop surface 117 engages the edge of the workpiece 26.

The rearward end 90 of main body section 106 of ramp 14 includes a recess 118. Recess 118 is formed of any suitable size, shape and design and is configured to receive and hold a power cord connected to cutting device 22. In the arrangement when shown, recess 118 is a semicircular or curved shape that extends inward from rearward end 90 a distance between opposing features 108, however any indentation or recessed shape is hereby contemplated for use. When a corded cutting device 22 is used, as the cutting device 22 is slid forward on track 12 the cord is held within recess 118 thereby preventing the cord from interfering with the cutting operation or distracting the user. In this way, recess 118 improves the convenience and safety of system 10.

Ramp 14 also a hanging member 119. Hanging member 119 is formed of any suitable size, shape and design and is configured to facilitate hanging of system 10 for storage purposes. In the arrangement shown, hanging member 119 is an opening or hole positioned approximately in the middle of ramp 14, between opposing features 108, at or near the rearward end 90 of ramp 14, however any other size, shape and design as well as positioning is hereby contemplated for use as hanging member 119.

Hinge Members:

Guided circular saw system 10 includes one or more hinge members 16. Hinge members 16 are formed of any suitable size, shape and design and are configured to provide vertical movement of ramp 14 while preventing lateral movement of ramp 14.

In the arrangement shown, as one example, hinge members 16 extend vertically from an upper end 120 to a lower end 122, and extend laterally between a forward edge 124 to a rearward edge 126. Hinge members 16 include a top section 128, a middle section 130 and a bottom section 132. Hinge members 16 also include an upper hinge 134, that hingedly connects the top section 128 to the middle section 130, and a lower hinge 136, that hingedly connects the middle section 130 to the bottom section 132. Hinge members 16 are generally planar in shape and lie in a generally flat plane when not in use and extend between an upper surface 138 that is generally flat and planar in shape that extends across the top section 128, middle section 130 and bottom section 132, and a lower surface 140 that is generally flat and planar in shape that extends across the top section 128, middle section 130 and bottom section 132.

In the arrangement shown, when viewed from above or below, the top section 128 is generally rectangular in shape, and the middle section 130 is generally square or rectangular in shape. The bottom section 132 is generally rectangular in shape as well with a rounded rearward edge. However, in one arrangement, the bottom section 132 extends rearward a distance from the rearward edge 126 of the top section 128 and middle section 130 so that bottom section 132 can span across two holes 142 in benchtop 18 (also known as bench dog holes) thereby providing greater stability and a stronger foundation to hinge members 16. In this way, with the rearward extension of bottom section 132 this causes the hinge members 16 to have a generally L-shaped appearance when viewed from above or below. In an alternative arrangement, as is shown, the bottom section 132 has the same or similar shape to the top section 128 and middle section 130. However, it is hereby contemplated that bottom section 132 connects to benchtop 18 by any other manner or method, such as screwing, bolting or adhering bottom section 132 directly to benchtop 18 or by connecting bottom section 132 to benchtop 18 by any other manner, method or means.

In one arrangement, as is shown, bottom section 132 includes a connecting member 143 that is configured to connect to the slot of a track 145 that connects to benchtop 18. In the arrangement shown, connecting member 143 fits within and slides along the slot of track 145 and facilitates connection of hinge member 16 to benchtop 18.

In one arrangement, the forward end and the rearward end of bottom section 132 includes holes 144. Holes 144 in bottom section 132 are configured to be aligned with the holes 142 in benchtop 18 and then a fastener 146 (not shown) is inserted therein thereby connecting the lower end 122 of hinge member 16 to benchtop 18. Fastener 146 is formed of any device that facilitates connection of two components together such as a screw, nut & bolt, plug, collar, snap-fit member, expansion mechanism or the like or any other device that connects two components together or any combination thereof. In one arrangement, as is shown, the holes 144 in the bottom section 132 are positioned at a standard configuration to match what are known as a "Bench Dog" hole arrangement in benchtop 18, which means a benchtop having holes in a standard and equally spaced grid pattern.

Similarly, the forward end and the rearward end of top section 128 includes holes 144. Holes 144 in top section 128 are configured to be aligned with slots 52 and hollow interior 54 in the bottom surface of track 12 and then a fastener 146 (not shown) is inserted therein thereby connecting the upper end 120 of hinge member 16 to track 12. Fastener 146 is formed of any device that facilitates connection of two components together such as a screw, nut & bolt, plug, collar, snap-fit member or the like or any other device that connects two components together or any combination thereof. In one arrangement, fastener 146 is formed of a conventional screw or bolt having a head that fits within hollow interior 54 and a shaft that fits through slot 52.

In the arrangement shown, hinge members 16 are formed of a single monolithic piece of material, such as a plastic, composite or the like. Any form of plastic material is hereby contemplated for use. In one arrangement, upper hinge 134 and lower hinge 136 are formed of what is known as a living hinge. A living hinge is a thin flexible hinge (or flexure bearing) made from the same material as the two (rigid or relatively rigid) pieces it connects. A living hinge is typically thinned or cut to allow the rigid pieces to bend along the line of the hinge. However, any other forms of a hinge is hereby contemplated for use including a conventional butt or barrel hinge having a pair of leafs with knuckles that connect to hinge pin and rotate upon the hinge pin. Said another way, any form of a joint or hinge is hereby contemplated for use to connect the top section 128 and middle section 130 as well as to connect the middle section 130 with the bottom section 132.

In the arrangement shown, to facilitate proper bending and articulation of the hinge member 16, the portion of material that connects the two adjacent rigid components of one of the upper hinge 134 and the lower hinge 136 is positioned near the upper surface 138 whereas the portion of material that connects the two adjacent rigid components of the other of the upper hinge 134 and the lower hinge 136 is positioned near the lower surface 140. This facilitates the hinge member 16 to transition from a generally flat arrangement when not in use to a generally Z-shaped or C-shaped arrangement when in use. As one example, as is shown, the portion of material of upper hinge 134 that connects top section 128 to middle section 130 is positioned near the upper surface 138 (with a recess positioned behind the thin piece of connecting material), whereas the portion of material of lower hinge 136 that connects middle section 130 to bottom section 132 is positioned near the lower surface 140 (with a recess positioned behind the thin piece of connecting material), however the opposite arrangement is hereby contemplated for use.

In the arrangement shown, a hinge member 16 is installed at or near the ends 32 of track 12, however any other positioning is hereby contemplated for use. In addition, while a pair of hinge members 16 are shown in use, any other number of hinge members 16 are hereby contemplated for use such as one, three, four, five, six or more.

When installed, the top section 128 lies in a generally flat and flush alignment with the bottom surface of track 12. Similarly, when installed, the bottom section 132 lies in a generally flat and flush alignment with the upper surface of benchtop 18. To facilitate proper functioning of the system 10 when more than one hinge members 16 are used, care is taken to align the two or more hinge members 16 such that the upper ends 120 point in the same direction and the lower ends 122 point in the same direction.

When track 12 is in a lowered position, the hinge member 16 generally lies flat with the upper surface 138 and the lower surface 140 of top section 128, middle section 130 and bottom section 132 in a generally flat and planar alignment to one another. In this position, the bottom surface of track 12 is in engagement with the upper surface 138 of top section 128, middle section 130 and bottom section 132. In this position, upper surface of the benchtop 18 is in engagement with the lower surface 140 of top section 128, middle section 130 and bottom section 132.

To raise the track 12, the user simply lifts up on the track 12. When the track 12 is raised, the top section 128 remains in flat and planar alignment with the bottom surface of track 12, and the bottom section 132 remains in flat and planar alignment with the upper surface of benchtop 18. However, the angle of the middle section 130 changes with respect to the top section 128 and bottom section 132. That is, the upper end of middle section 130 raises as the upper hinge 134 and lower hinge 136 articulate to accommodate for the movement. This eventually culminates in the hinge members 16 resulting in a Z-shape when the track 12 is at its highest point. It is notable, that the Z-shape is an over-center position for middle section 130. That is, as the track 12 is raised, the middle section 130 moves from a generally level or horizontal position upward until it reaches a vertical position. Once the middle section 130 reaches a vertical position, the middle section 130 moves past vertical to an over-center position until the intersection between the top section 128 and middle section 130 and the intersection between the bottom section 132 and middle section 130 engage one another which causes the hinge members 16 to stop movement. At this over-center position the hinge members 16 hold the track 12 a distance above the benchtop 18. When the track 12 is raised a workpiece 26 is positioned in the space formed between the bottom surface of the track 12 and the upper surface of the benchtop 18.

Once the workpiece 26 is placed under track 12, the track 12 is lowered and the hinge members 16 articulate in the opposite manner until the lower surface of the track 12, or more specifically the lower surface of grip strips 66 engage the workpiece 26. It is in this position that the track 12 is fully lowered. To remove the workpiece 26 after a cutting operation, the track 12 is simply raised and the workpiece 26 is removed and the process is repeated.

As the track 12 is raised and lowered, the track 12 actually moves in an arcuate manner. Meaning that the ends 32 move relative to the benchtop 18 a small distance between the fully raised position and the fully lowered position. However, this slight movement of the positions of the ends of the track 12 does not negatively affect operation of the system 10. This is especially true since movement of the track 12 is prevented in all other manners and directions.

When upper hinge 134 and lower hinge 136 are formed of a living hinge, this allows the hinge member 16 to be manufactured as a single piece such as through injection molding, compression molding, machining a solid component or the like processes, which reduces the cost of the components. Alternatively, the hinge members 16 may be formed through machining a plank or plate of material, which can also be an inexpensive process. The simple configuration of hinge members 16 reduces the cost of manufacturing these components and also makes them easy to use and easy to install.

Benchtop:

Guided circular saw system 10 includes a benchtop 18. Benchtop 18 is formed of any suitable size, shape and design and is configured to provide a base to which track 12 is mounted to.

In the arrangement shown, as one example, benchtop 18 is a generally flat surface that has a grid of holes 142 therein that are arranged in an equally spaced pattern. This arrangement of holes is known as a "bench dog" hole pattern or work surface. Practically any surface can serve as benchtop 18. When bench dog holes are not present, lower hinge 136 can be connected to benchtop 18 by any manner, method or means such as screwing, bolting, adhering, stapling, gluing, welding, snap fitting, attaching by a snap fit member or expansion mechanism, attaching to a slot, groove or other feature in the benchtop 18, or by any other manner, method or means.

Sled:

Guided circular saw system 10 includes a sled 20. Sled 20 is formed of any suitable size, shape and design and is configured to connect to cutting device 22 and to facilitate alignment with track 12 as well as to slide along track 12.

In the arrangement shown, as one example, sled 20 extends vertically from an upper surface 150 to a lower surface 152. Sled 20 extends a length from a forward end 154 to a rearward end 156. Sled 20 extends a width between opposing sides 158. Sled 20 includes a forward section 160 that is configured to receive and engage a laterally extending guide rail 230 of a rip-cutting guide for rip-cutting sheet material. Sled 20 also includes a main body section 162 that is configured to fit the upper surface 28 of track 12 and slide thereon when sled 20 is used in association with track 12 in a track saw cutting arrangement.

Forward section 160 of sled 20 is formed of any suitable size, shape and design and is configured to receive and engage a laterally extending guide rail 230 of a rip-cutting guide. One example of a rip-cutting guide is Applicant's "Kreg Rip Cut" rip-cutting guide for rip-cutting sheet material that includes a laterally extending guide rail 30 that connects to a perpendicularly disposed guide arm 232 connected to the end of the guide rail 230. The sled 20 slidably connects to the guide rail 230 at forward section 160. The sled 20 is positioned, laterally, at a position along the length of the guide rail 230, thereby setting the depth of cut from the guide arm 232. Once the sled 20 is positioned on the guide rail 230, the guide arm 232 is positioned along the side of the sheet material and the sled 20 slides along the surface of the sheet material as the guide arm 232 rides along the edge of the sheet material as the cutting device 22 cuts the sheet material.

To facilitate this functionality, in the arrangement shown, as one example, the lower surface 152 of forward section 160 includes a recess 164 that extends from side 158 to side 158 of sled 20. Recess 164 is configured to slidably receive the guide rail 230 or a feature of the guide rail 230 of the rip-cut guide therein and allows the position of sled 20 on the guide rail 230 to be set simply by sliding the guide rail 230 within recess 164.

Forward section 160 also includes a locking handle 166 positioned on the upper surface of forward section 160 that communicates with and controls a lock member 167 positioned on the lower surface of forward section 160 within recess 164. Locking handle 166 and lock member 167 are formed of any suitable size, shape and design and is configured to lock the guide rail 230 of a rip-cutting guide in position on the forward section 160 of sled 20. In the arrangement shown, handle 166 is connected to the upper forward portion of forward section 160 and is configured to rotate between a disengaged position, where the guide rail 230 of a rip-cutting guide positioned within recess 164 is free to slide therein, and an engaged position, where the guide rail 230 of a rip-cutting guide positioned within recess 164 is locked therein by lock member 167. In one arrangement, as is shown, when the handle 166 is moved toward an engaged position this pulls lock member 167 toward sled 20 thereby pinching or trapping guide rail 230 of a rip-cutting guide in position on the forward section 160 of sled 20.

Forward section 160 also includes one or more arms 168. Arms 168 are formed of any suitable size, shape and design and are configured to lock the cutting device 22 in place on sled 20. In the arrangement shown, as one example, an arm 168 is positioned adjacent each side 158 of the forward section 160. Arms 168 extend a lateral length and connect at their forward end to forward section 160 by way of a fastener 170 that extends through a hole in the forward end of arm 168. Arms 168 receive a fastener 172 that extends through a hole in the rearward end of arms 168 that facilitates locking cutting device 22 into position on sled 20.

Arms 168 rotate upon fastener 170 connected to forward section 160 between a retracted position and a deployed position. To attach cutting device 22 to sled 20, the bottom surface of the baseplate 174 of cutting device 22 is positioned on the upper surface 150 of the main body section 162 of sled 20. Once cutting device 22 is positioned on sled 20, arms 168 are rotated to extend over the baseplate 174. Next, the fasteners 172 are tightened into the upper surface of baseplate 174 thereby locking the baseplate 174 into frictional locking engagement with the upper surface 150 of main body section 162 thereby locking the baseplate 174 to the sled 20.

The forward end of forward section 160 also includes a guide rail 176. Guide rail 176 extends all or a portion of the length of the forward section between sides 158. Guide rail 176 is configured to receive an indicator clip and/or cursor 24 and allows indicator clip and/or cursor 24 to slide thereon. In one arrangement, a pair of guide rails 176 are positioned in the forward end 152 of sled 20, one adjacent each side of sled 20. In one arrangement, guide rail 176, when viewed from the side, is a generally rectangular rail that protrudes forward from the forward end 154 of sled 20. In one arrangement, as is shown, a bias member 177 is positioned above each guide rail 176 and is configured to provide a clamping or bias force against indicator clip or cursor 24 positioned on guide rail 176. Bias member 177 is formed of any suitable size, shape and design and is configured to provide a force against indicator clip or cursor 24. In one arrangement, as is shown, bias member 177 is formed of a hinged button member, wherein when the rearward side of the button is pressed it raises the forward end of the bias member 177 thereby allowing movement of the indicator clip or cursor 24 under the forward end of the bias member 177 that rides on the guide rail 176. When the rearward side of the button is released the natural bias of the bias member 177 engages the indicator clip or cursor 24 under the forward end of the bias member 177 and pinches it against the guide rail 176 it rides on thereby holding the indicator clip or cursor 24 in place. In one arrangement, an indicator clip 24 is positioned on one guide rail 176 and a cursor 24 is positioned on the other guide rail 176. The indicator clip and cursor 24 are used when sled 20 is used in a Rip-Cut application.

The components of forward section 160 are raised above the lower surface 152 of main body section 162 so that the components of forward section 160 do not interfere with the engagement of the lower surface 152 of main body section 162 with the track 12 as is further described herein.

Main body section 162 is formed of any suitable size, shape and design and is configured to receive and hold cutting device 22 on its upper surface 150 and to engage and slide on the features 38 of track 12 on its lower surface 152. In the arrangement shown, as one example, main body section 162 when viewed from the side is generally flat and planar in shape. However, in the arrangement shown, upper surface 150 of main body section 162 includes a plurality of recesses, grooves or other structural features that provide structural rigidity, reduce material needed to form the device and provide a place for dust and debris on the main body section 162 to escape so that it does not interfere with operation of the system 10.

In one arrangement, as is shown, forward end of main body section 162 includes a step 178 that rises above the plane of the upper surface 150 of main body section 162. Step 178 engages and stops the forward progression of baseplate 174 of cutting device 22 when cutting device 22 is placed on main body section 162. In the arrangement shown, step 178 extends across main body section 162 in approximate perpendicular alignment to the sides 158 of sled 20. In the arrangement shown, step 178 extends across main body section 162 in approximate perpendicular alignment to the planar upper surface 150 of sled 20.

Main body section 162 includes a pair of slots 180 that extend from the rearward end 156 of sled 20 in approximate parallel spaced alignment to the sides 158 of sled 20 before terminating prior step 178. When viewed from above or below, slots 180 are generally elongated and rectangular in shape. The two slots 180 separate the rearward end 156 of sled 20 into three fingers 182 a centrally positioned finger 182 with a finger 182 positioned on either outward side thereof.

Slots 180 are configured to receive the blade 68 and blade guard 86 of cutting device therein. When the blade 68 and blade guard 86 is on the right side of the cutting device 22, the blade 68 and blade guard 86 is positioned in the right slot 180; when the blade 68 and blade guard 86 is on the left side of the cutting device 22, the blade 68 and blade guard 86 is positioned in the left slot 180. In this way, sled 20 with two slots 180 is ambidextrous and can receive either left bladed or right bladed cutting devices 22.

The lower surface 152 of sled 20 includes a plurality of recesses 184 therein that are configured to engage and slide over track 12 while providing alignment to sled 20. In the arrangement shown, as one example, recesses 184 are configured to receive with close sliding engagement the portion of features 38 that extend above center section 36 and tabs 46 of track 12. As such, recesses 184 have approximately the same but opposite profile as features 38. That is, in the arrangement shown, recesses 184 are positioned in the lower surface 152 of fingers 182 and include a generally flat and planar center wall 186 that extends in approximate parallel spaced relation to the planes formed by the upper surface 150 and lower surface 152 of sled 20. Center wall 186 connects at its outward ends to sidewalls 188 that extend downward until connecting the lower surface 152. In one arrangement, as is shown, recesses 184 extend forward to back in approximate parallel spaced alignment with sidewalls 158 of sled 20 and extend in approximate perpendicular alignment to the rearward end 156, forward end 154 and step 178 of sled 20. The recesses 184 extend the length of the lower surface 152 of main body section 162.

As there are three recesses 184 in sled 20 but there are only two features 38 in track 12, only two of the recesses 184 are used at any one time. In the arrangement wherein the blade 68 and blade guard 86 are in place within the right slot 180, the two recesses 184 to the left are placed over the features 38. In this arrangement, when adjusted properly, the blade 68 is precisely positioned to clear the outward side 34 of tab 46 and engages the outward edge of grip strip 66. The opposite arrangement is true when the blade 68 is positioned within the left slot 180.

In one arrangement, as is shown, sled 20 includes a side block 190 that adjustably connects to a slot 192 in the main body section 162 of sled 20 by a fastener 194. Side block 190 is formed of any suitable size shape and design. Side block 190 serves to provide a stop to the baseplate 174 of cutting device 22 and thereby prevents the lateral movement of cutting device 22 on sled 20. Side block 190 also serves to precisely set the position of cutting device 22 on sled 20 so that cutting device 22 can be removed from and reinstalled onto sled 20 in a precise manner so that the grip strip 66 does not have to be cut again. This allows the user to remove and reinstall the cutting device 22 quickly and with ease. This also speeds the reinstallation process as well as extends the life of the consumable grip strip 66 as a portion of the grip strip 66 does not need to be cut every time the cutting device 22 is reinstalled onto the sled 20.

In the arrangement shown, side block 190 is generally square or rectangular in shape when viewed from above, and has a generally planar and rectangular shape when viewed from a side or an end, however any other shape is hereby contemplated for use. In the arrangement shown, the generally flat or squared side block 190 is positioned such that the flat bottom surface of the side block 190 engages the upper surface 150 of main body section 162 adjacent slot 192 and that the flat and squared forward-positioned surface of side block 190 engages the step 178 in generally flat and flush alignment. In this position, side block 190 slides laterally along step 178 until the proper position is achieved and fastener 194 is inserted through slot 192 and side block 190 is fastened in place thereby preventing lateral movement of cutting device 22. Engagement of the flat forward surface of side block 190 with the flat step 178 of sled 20 along with the interaction of fastener 194 with slot 192 ensures that the inward-positioned edge of side block 190 is in parallel spaced alignment with the forward to back length of sled 20. As such, when the inward edge of slide block 190 is in engagement with the edge of baseplate 174 of cutting device 22, along with the forward edge of base plate 174 being in engagement with the flat step 178 of sled 20 blade 68 is aligned in a straight and parallel spaced manner to the length of sled 20.

In one arrangement, the opening in side block 190 that receives fastener 194 is offset from the center of side block 190. While the slot 192 provides some lateral adjustability, by offsetting the opening in side block 190 this provides even more adjustability as the side block 190 can be turned around on fastener 194 thereby providing even more relative adjustability than what slot 192 provides.

A side block 190 may be placed on one or both sides of cutting device 22. However, in most applications, a single side block 190 is placed on the side of baseplate 174 adjacent blade 68.

Filler Strip:

In one arrangement, sled 20 includes a filler strip 195. Filler strip 195 is formed of any suitable size, shape and design and is configured to provide support for the forward end of baseplate 174 when baseplate 174 is attached to sled 20.

System 10 is configured to be used with practically any cutting device 22, such as a circular saw. One problem with this universality is that baseplates 174 of cutting devices 22 vary greatly. Some baseplates 174 angle upward at their forward end to facilitate better sliding over the workpiece 26, whereas other baseplates 174 are generally planar throughout their forward to back length. Because arms 168 are used to engage and pinch the forward end of base plate 174 against the upper surface 150 of sled 20, when the forward end of baseplate 174 angles upward when arm 168 is tightened this can cause baseplate 174, and cutting device 22, to pivot upward upon its angled forward end. This causes the plane of the bottom surface of baseplate 174 to not be in flush and flat engagement with the upper surface 150 of sled 20.

Filler strip 195 corrects this problem and facilitates a flat and flush and tight engagement with between the plane established by the upper surface 150 of sled 20 and the plane established by the lower surface of base plate 174 regardless of whether the forward end of base plate 174 is flat or angles upward. In one arrangement, as is shown, filler strip 195 is a generally elongated rectangular shaped member that extends a length between opposing ends. Filler strip 195 has an upper surface and opposing lower surface. Filler strip 195 extends a width between a forward wall and an opposing rearward wall. Filler strip 195 is configured to fit within a recess 196 within tight and close tolerances. Recess 196 is positioned at the intersection of the upper surface 150 of sled 20 and the step 178 of sled 20. When filler strip 195 is placed within recess 196 filler strip 195 is frictionally held in place by engagement between filler strip 195 and sled 20 and/or more specifically recess 196. As such, the periphery of recess 196 provides a guide or alignment for the exterior periphery of filler strip 195. In addition, the engagement of the exterior periphery of filler strip 195 with interior periphery of recess 196 provides frictional engagement and helps hold filler strip 195 within recess 196.

To increase the frictional engagement between filler strip 195 and recess 196, filler strip 195 includes one or more openings 197 in filler strip 195 that are configured to receive posts that are positioned in corresponding positions within recess 196. In the arrangement shown, two openings 197 are shown in use, each opening 197 positioned an equal distance from the center of filler strip 195 in a symmetric manner, however any other number of openings is hereby contemplated from none, one, two, three, four, five, six, seven, eight, nine, ten or more. As the filler strip 195 is forced downward into recess 196, posts are inserted within openings 197

Figure 18:
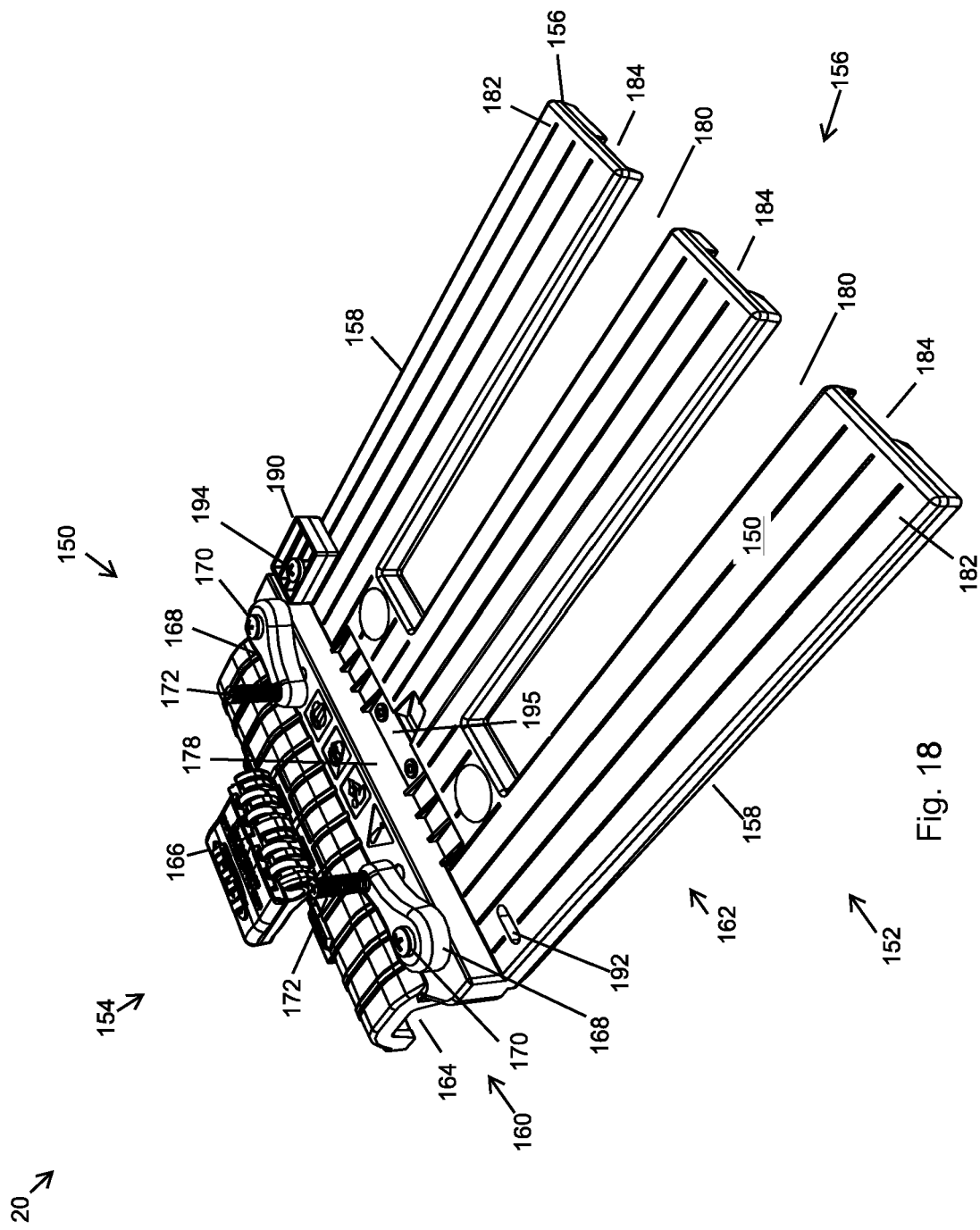
FIG. 18 is a perspective view of the sled shown in FIG. 1, the view showing the rearward side of the sled; the view showing the sled having a forward section and a main body section; the view showing the forward section having a step and a pair of arms that rotate out over the base plate of a cutting device; the view showing the main body section having a planar upper surface and having three fingers separated by slots that are used to provide access for a blade and blade guard of a cutting device; the view also showing a filler strip positioned at the intersection of the front of the main body and the rear of the forward section, the filler strip showing with its ribs pointing upward to facilitate mounting a cutting device with an angled leading edge of the base plate; the view showing the access slot that is used to pry the filler strip out of the recess that it resides in; the view showing the recesses in the lower surface of the fingers that are configured to receive the features in the ramp and track; the view showing the adjustable side block that is used to reposition the cutting device in the same place when it is removed from the sled.
Figure 19:
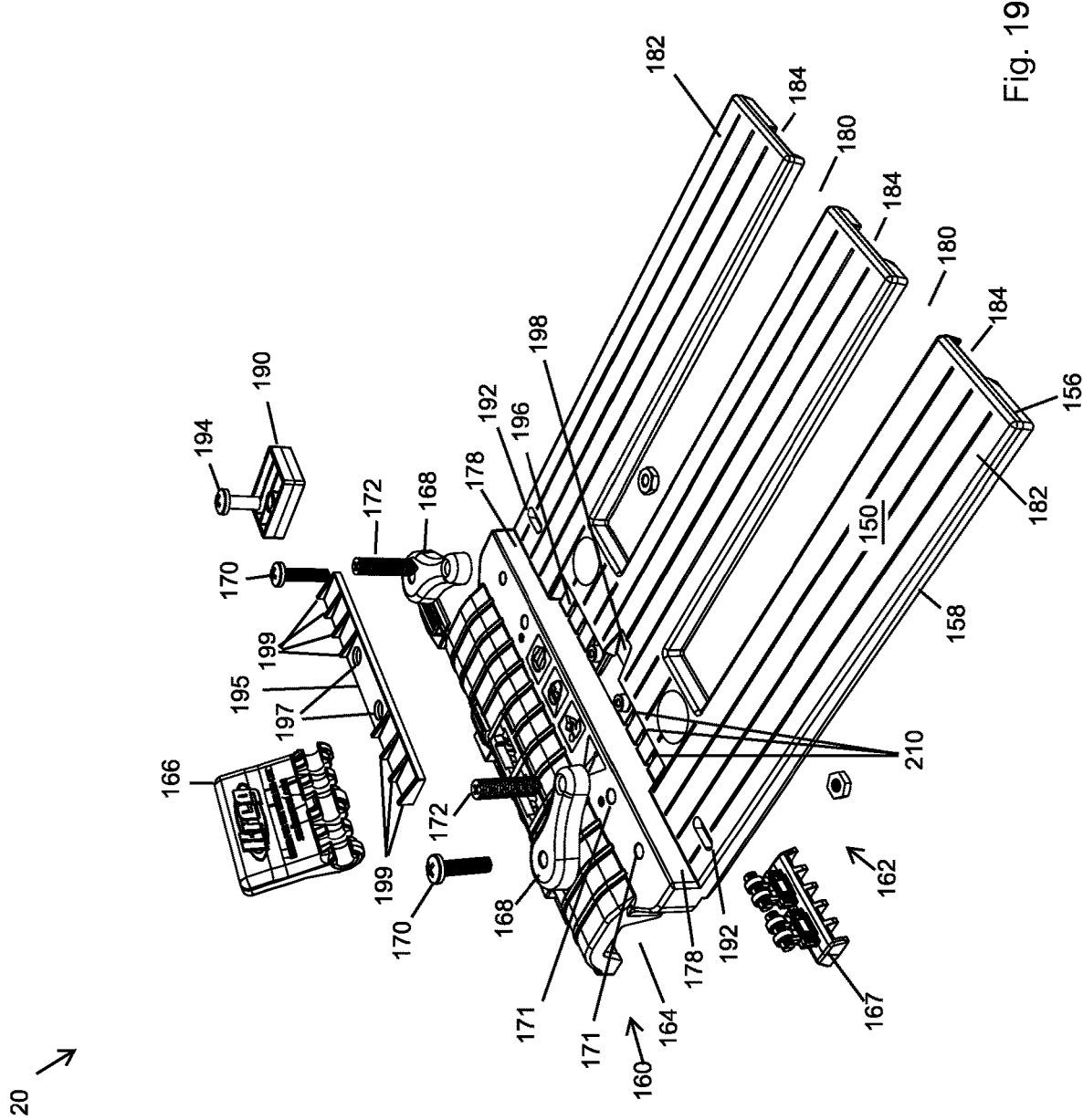
FIG. 19 is an exploded perspective view of the sled shown in FIG. 1.
Figure 20:
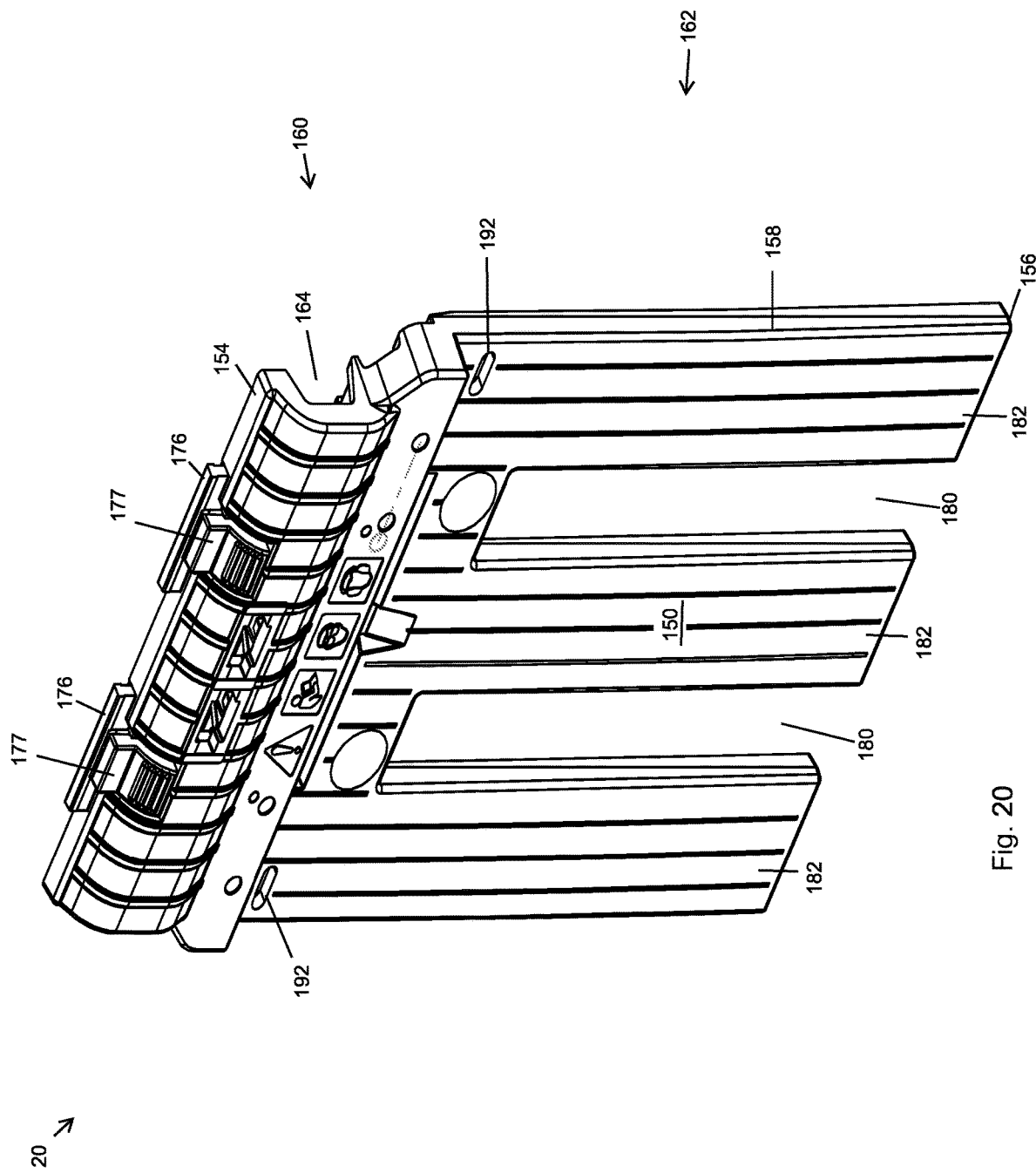
FIG. 20 is an perspective view of the sled shown in FIG. 1; the view showing the body of the sled with the attached components removed such as the lock member, arms, locking handle, filler strip and side block.
Figure 21:
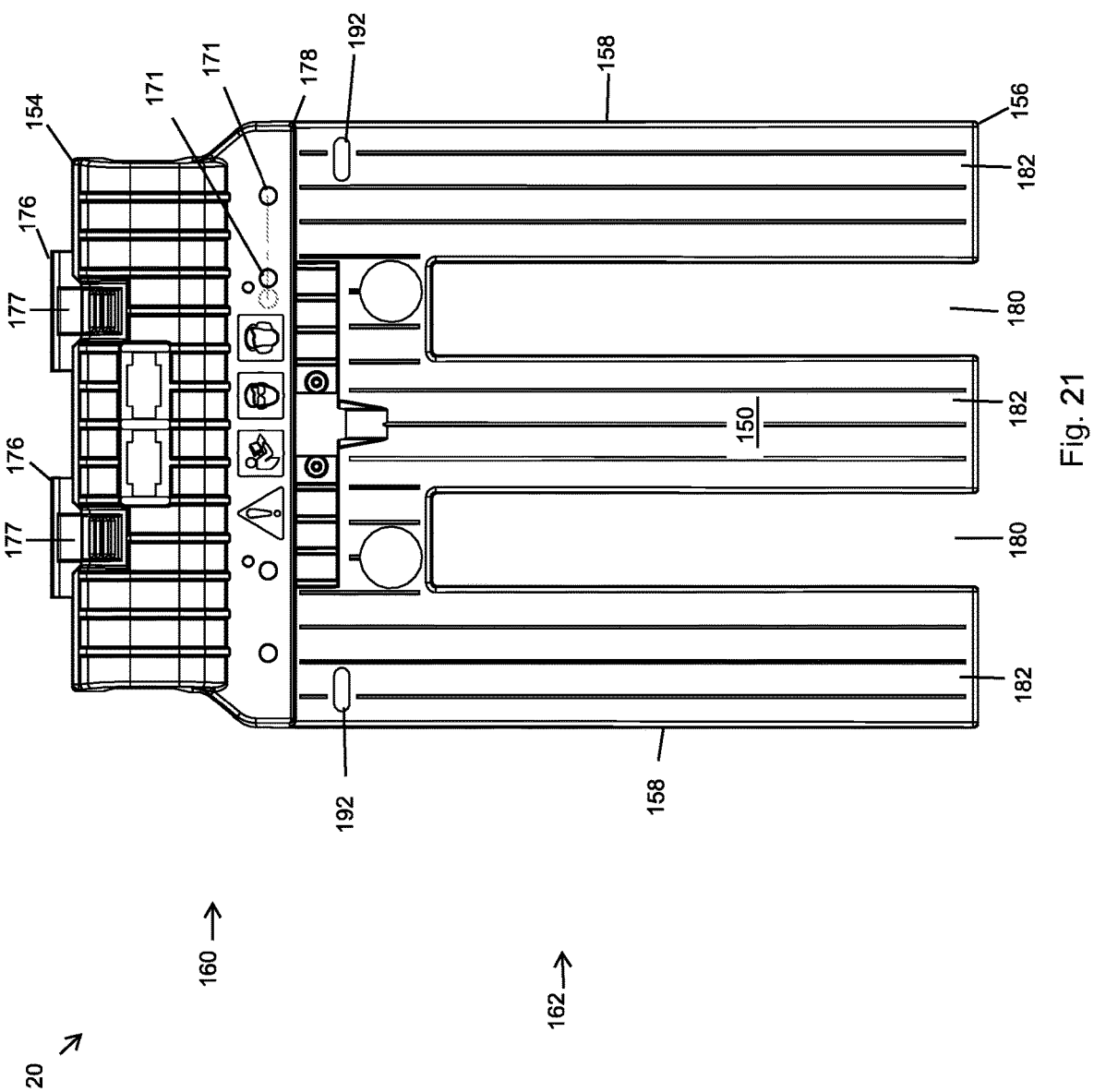
FIG. 21 is an elevation view of the sled shown in FIG. 19, the view showing the top side of the sled.
Figure 22:
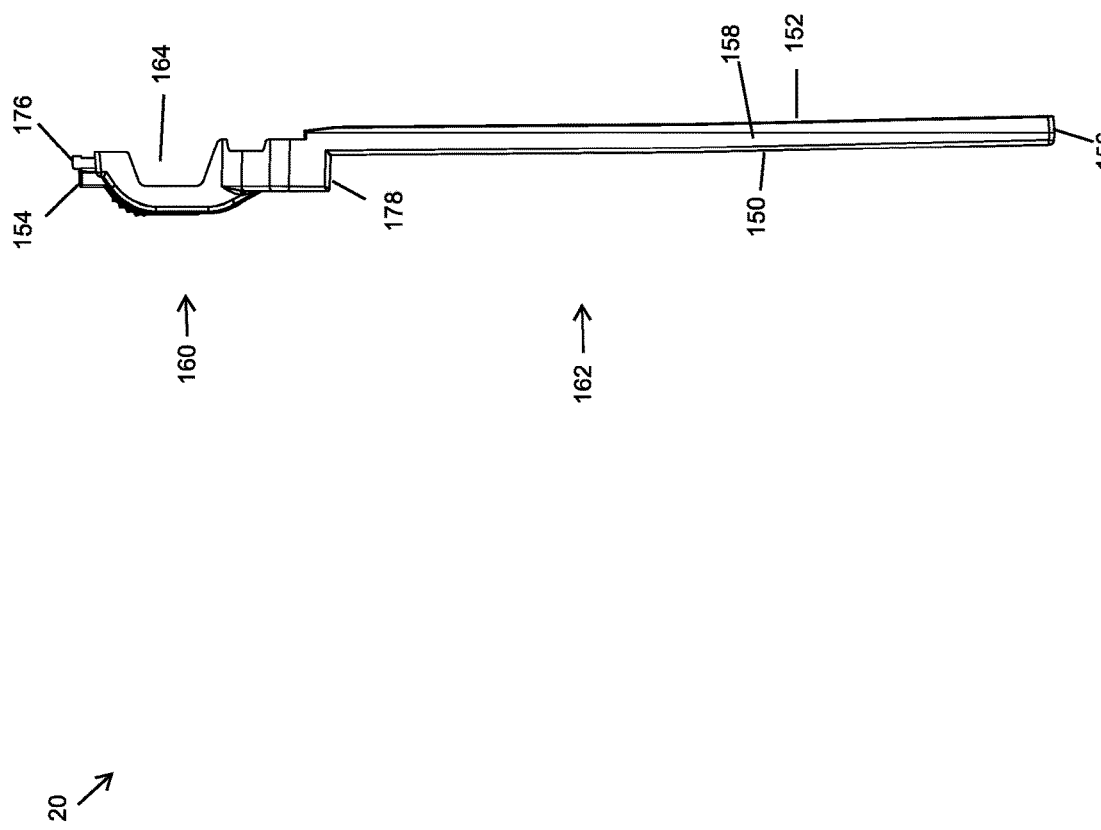
FIG. 22 is an elevation view of the sled shown in FIG. 19, the view showing the side of the sled.
Figure 23:
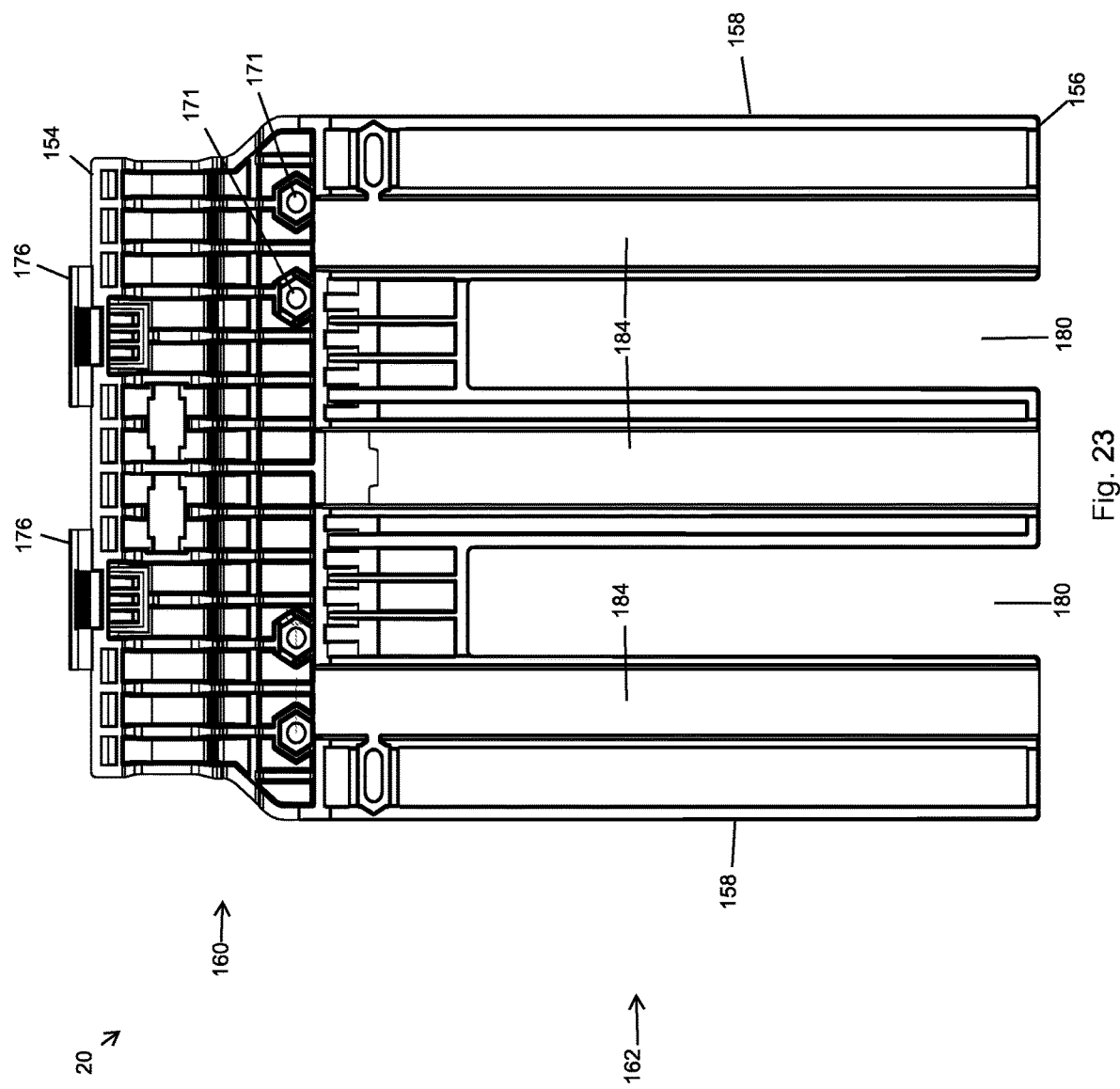
FIG. 23 is an elevation view of the sled shown in FIG. 19, the view showing the bottom side of the sled.
Figure 24:
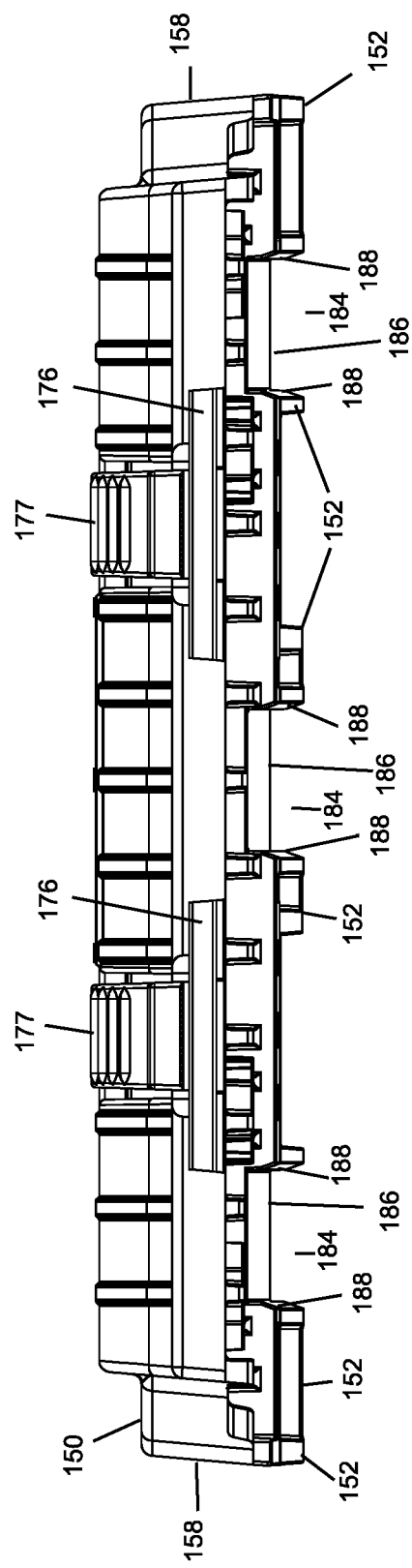
FIG. 24 is an elevation view of the sled shown in FIG. 19, the view showing the forward side of the sled; the view showing the profile of the recesses in the bottom surface of the fingers that are sized and shaped to receive the features of the track and ramp.
Figure 25:
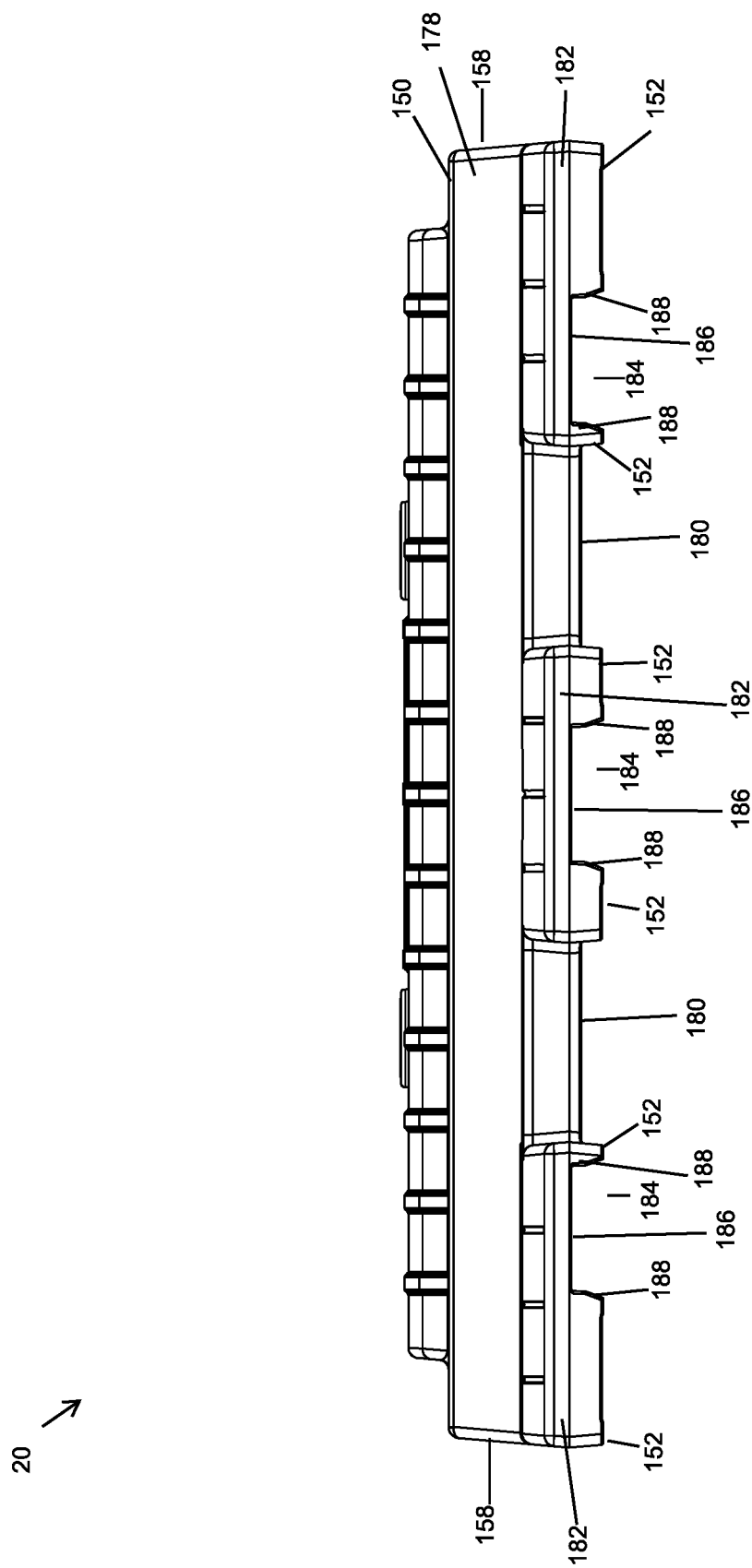
FIG. 25 is an elevation view of the sled shown in FIG. 19, the view showing the rearward side of the sled; the view showing the profile of the recesses in the bottom surface of the fingers that are sized and shaped to receive the features of the track and ramp.
Figure 26:
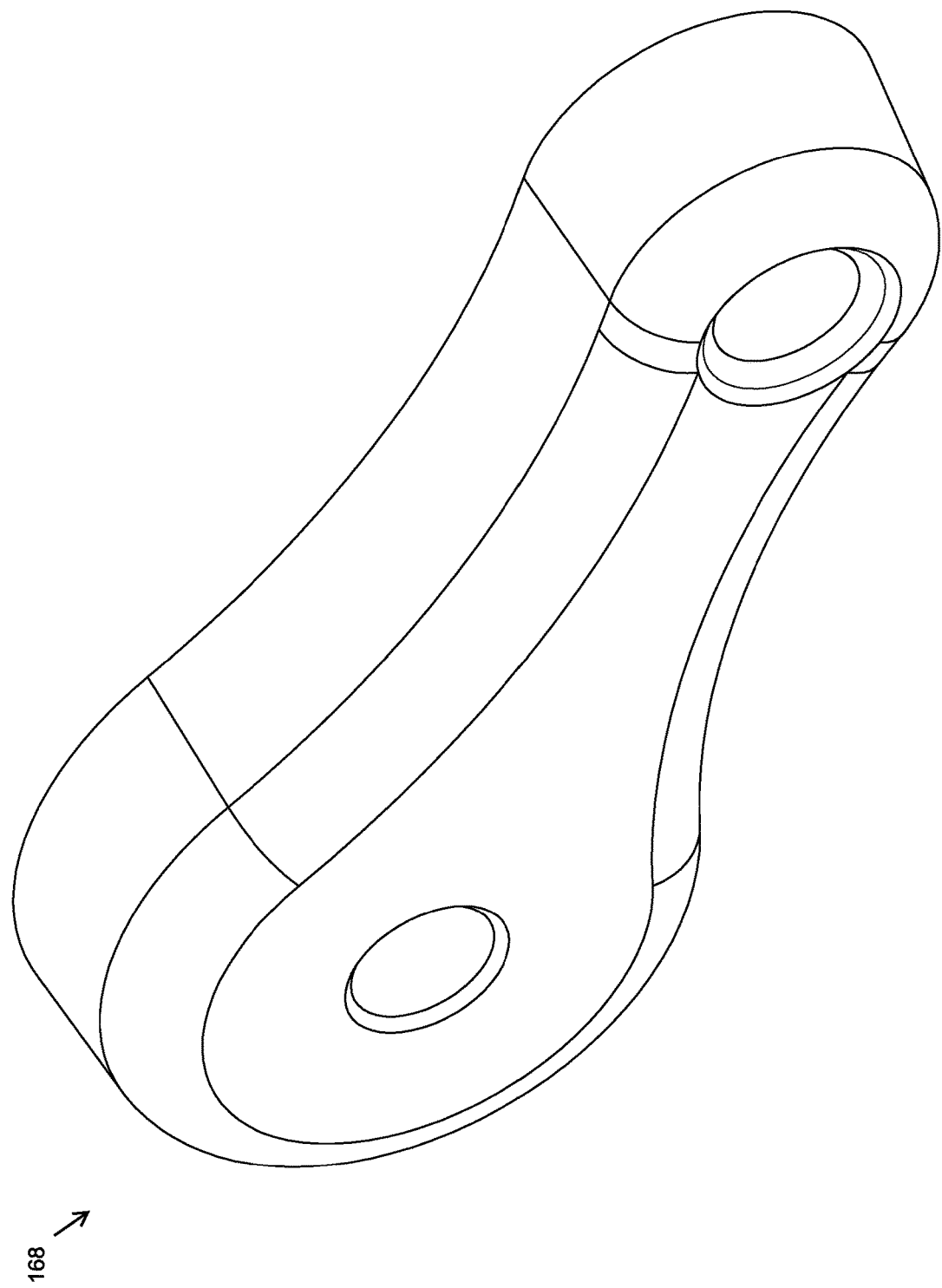
FIG. 26 is a perspective view of an arm that connects to the sled and is configured to clamp the base plate of a cutting device to the sled.
Figure 27:
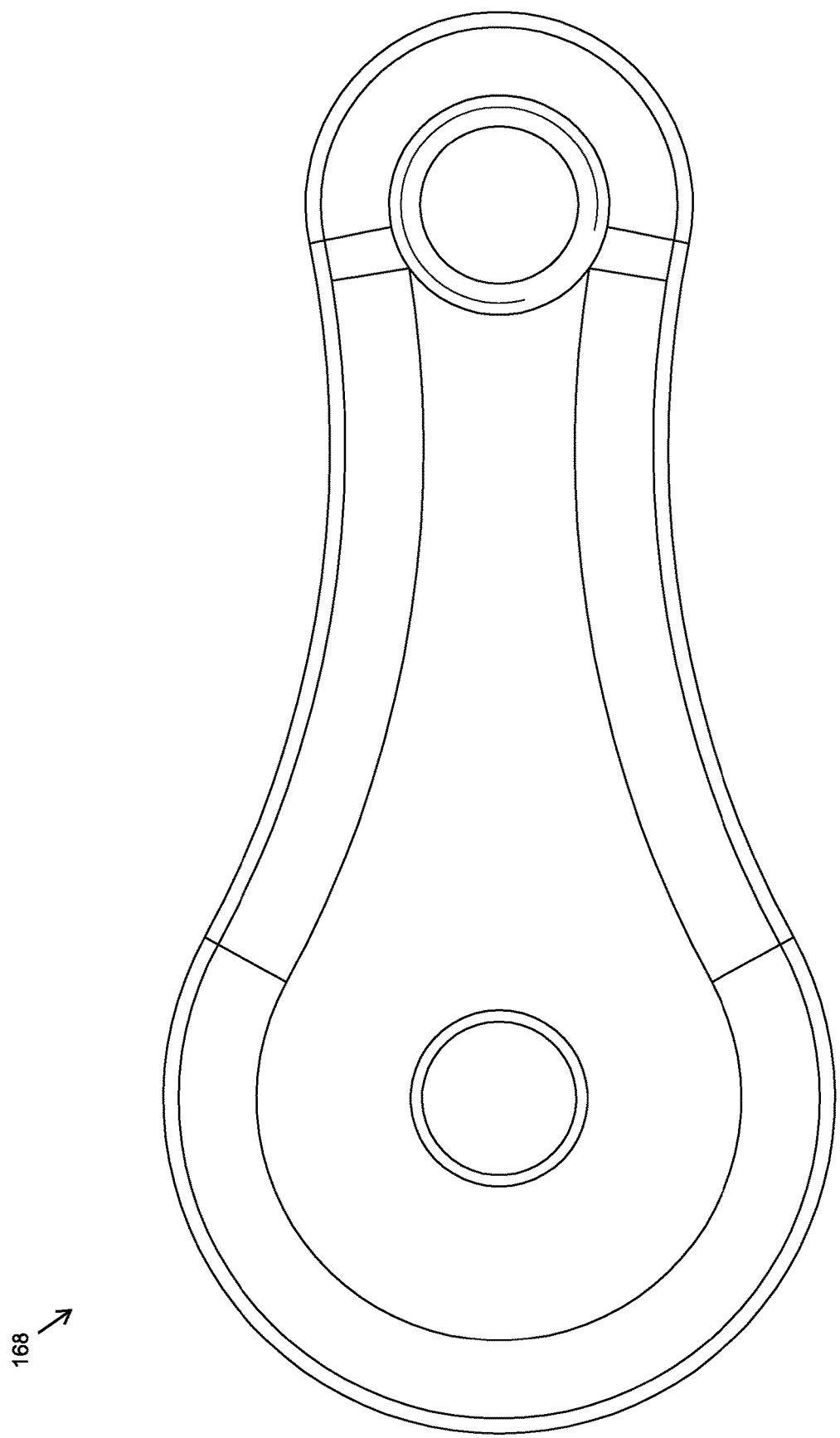
FIG. 27 is an elevation view of an arm that connects to the sled and is configured to clamp the base plate of a cutting device to the sled, the view showing the top side of the arm.
Figure 28:
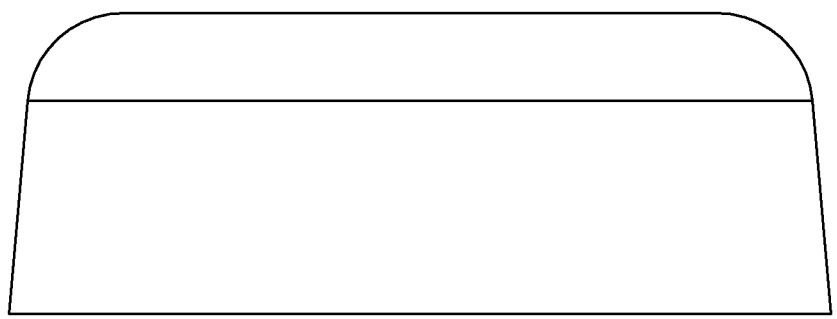
FIG. 28 is an elevation view of an arm that connects to the sled and is configured to clamp the base plate of a cutting device to the sled, the view showing the end of the arm.
Figure 29:
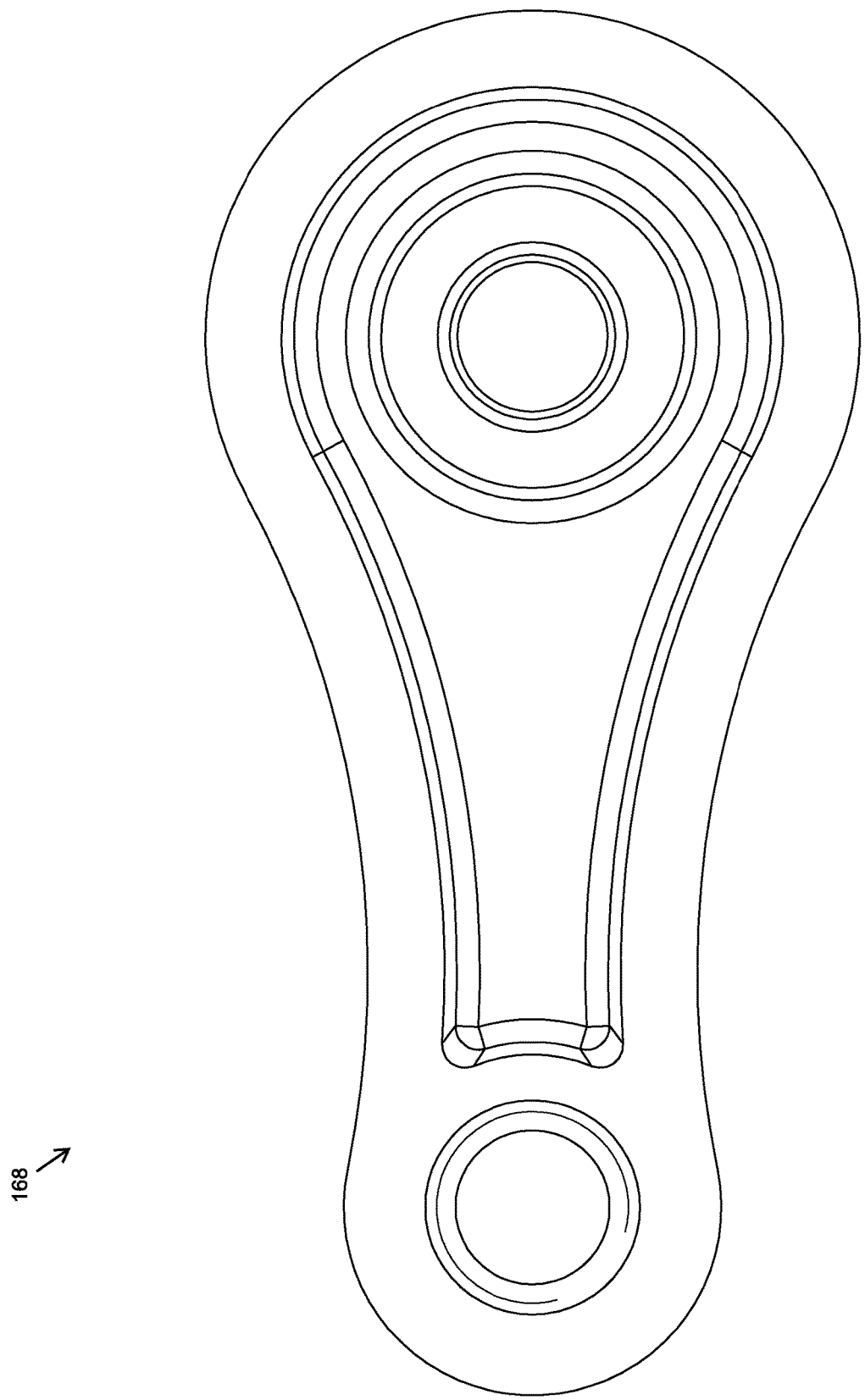
FIG. 29 is an elevation view of an arm that connects to the sled and is configured to clamp the base plate of a cutting device to the sled, the view showing the bottom side of the arm.
Figure 30:
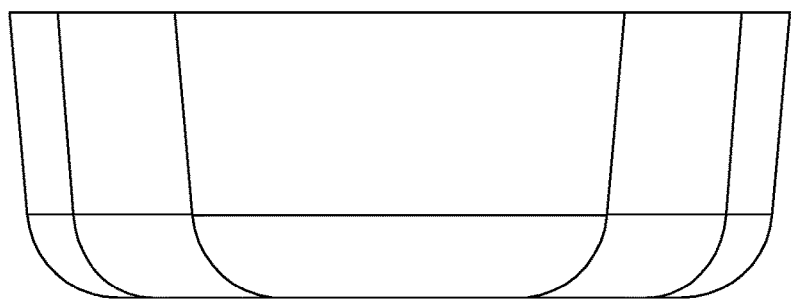
FIG. 30 is an elevation view of an arm that connects to the sled and is configured to clamp the base plate of a cutting device to the sled, the view showing the end of the arm.
Figure 31:
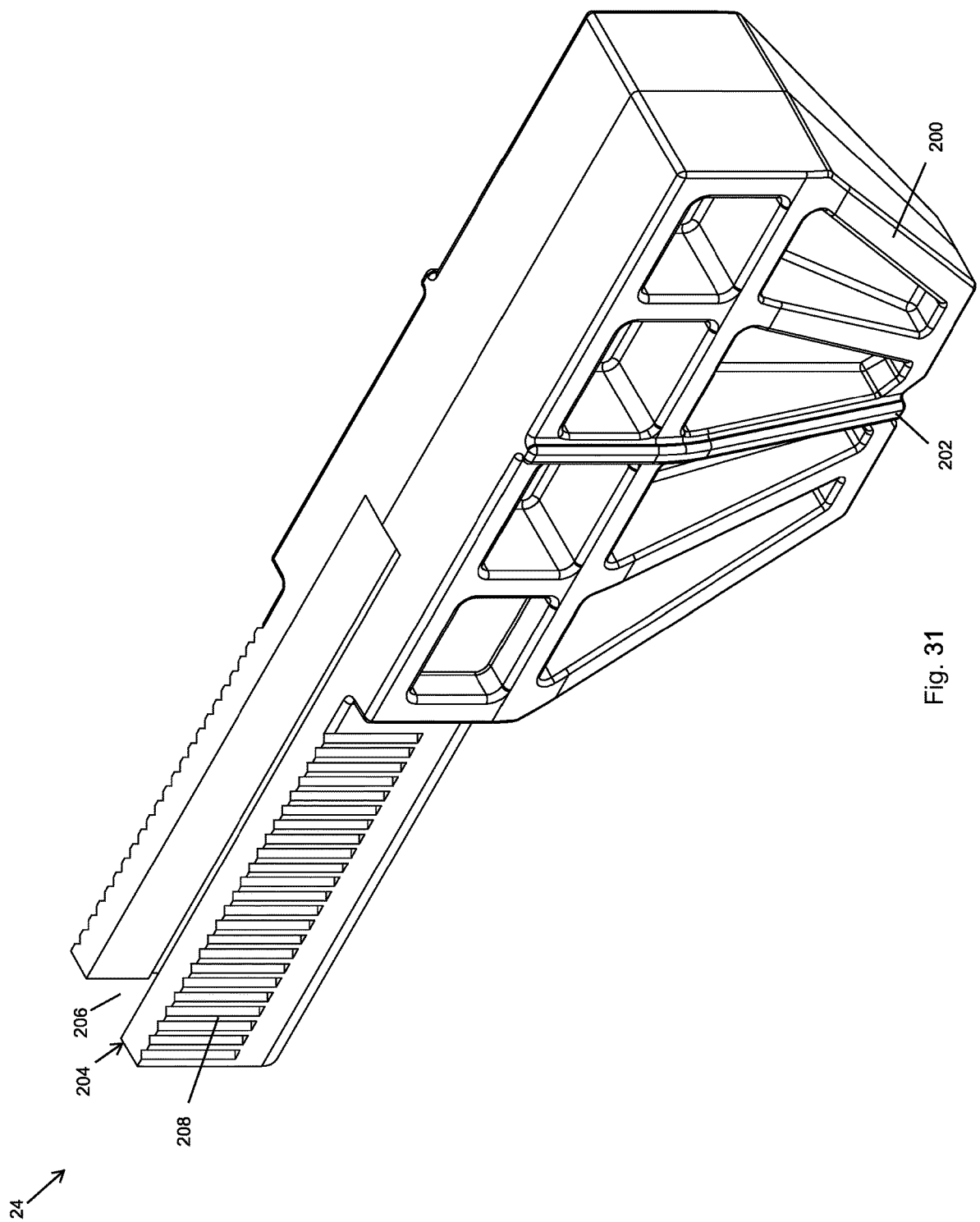
FIG. 31 is a perspective view of an indicator clip or cursor used in association with the sled shown in FIG. 1.
Figure 32:
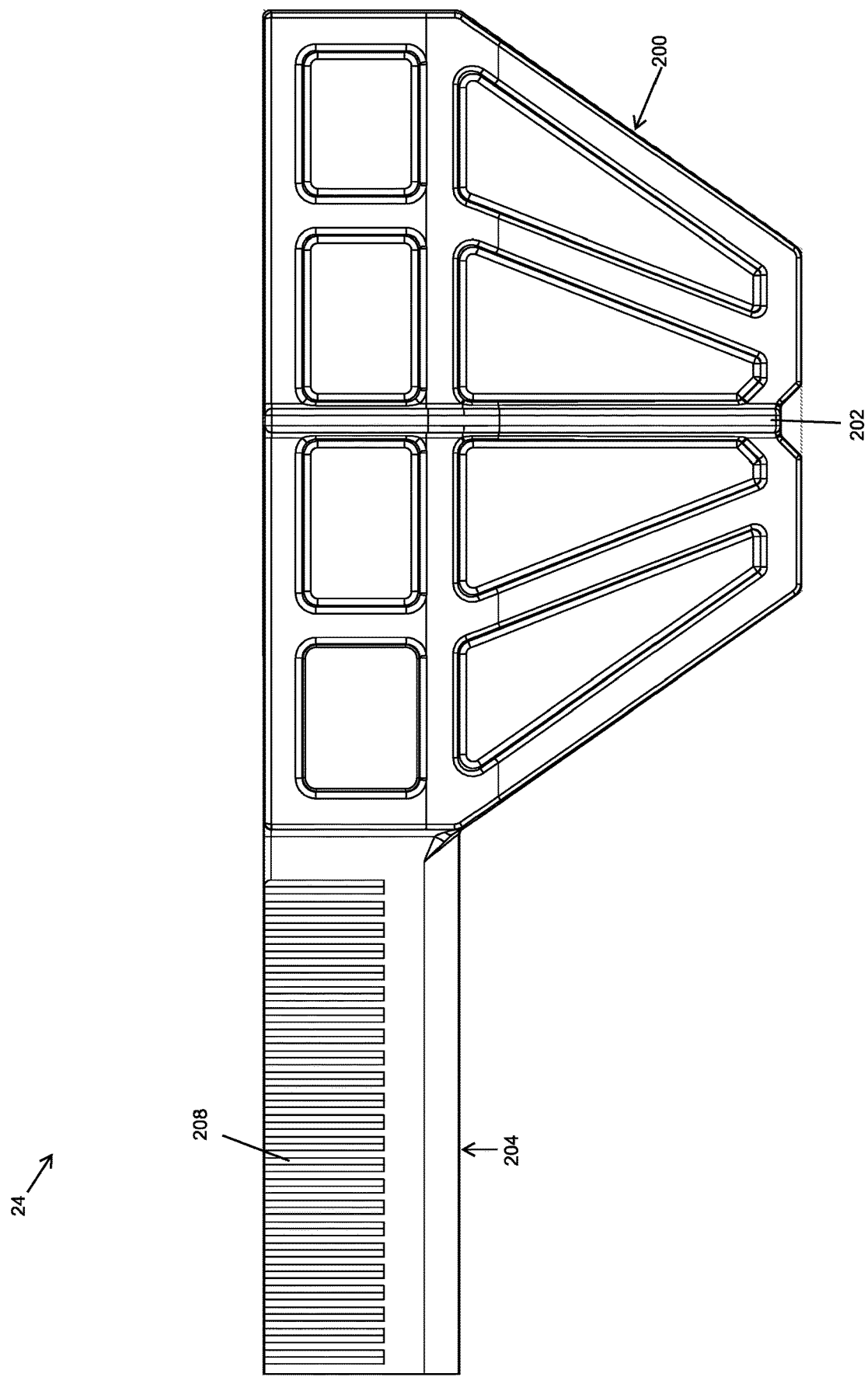
FIG. 32 is an elevation view of an indicator clip or cursor used in association with the sled shown in FIG. 1, the view showing the side of the indicator clip or cursor.
Figure 33:
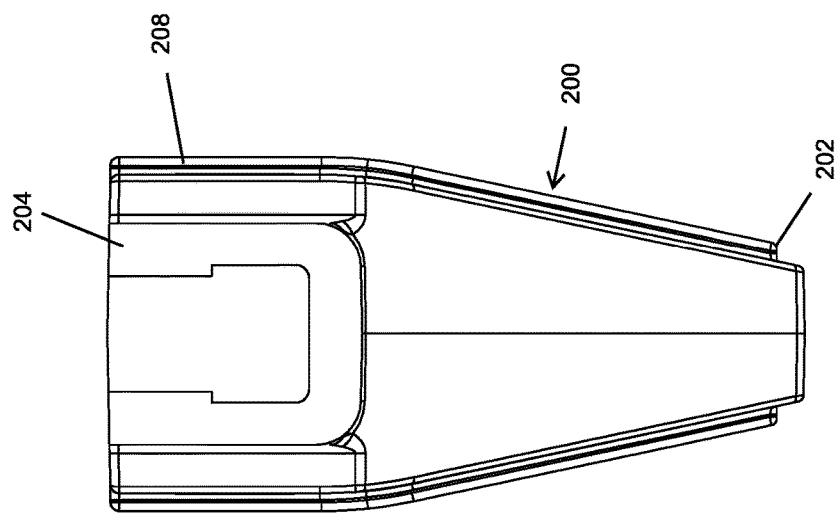
FIG. 33 is an elevation view of an indicator clip or cursor used in association with the sled shown in FIG. 1, the view showing the end of the indicator clip or cursor.
Figure 35:
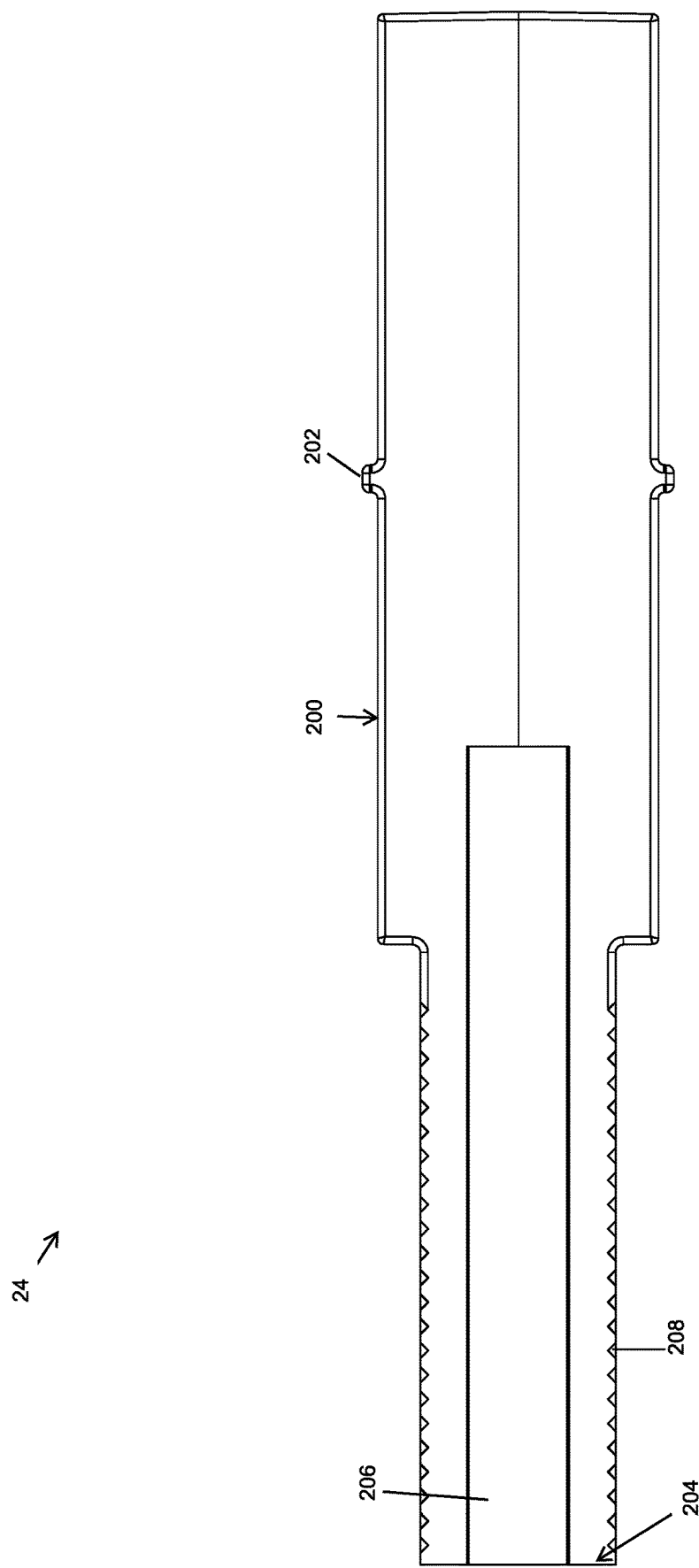
FIG. 35 is an elevation view of an indicator clip or cursor used in association with the sled shown in FIG. 1, the view showing the rearward side of the indicator clip or cursor.
Figure 36:
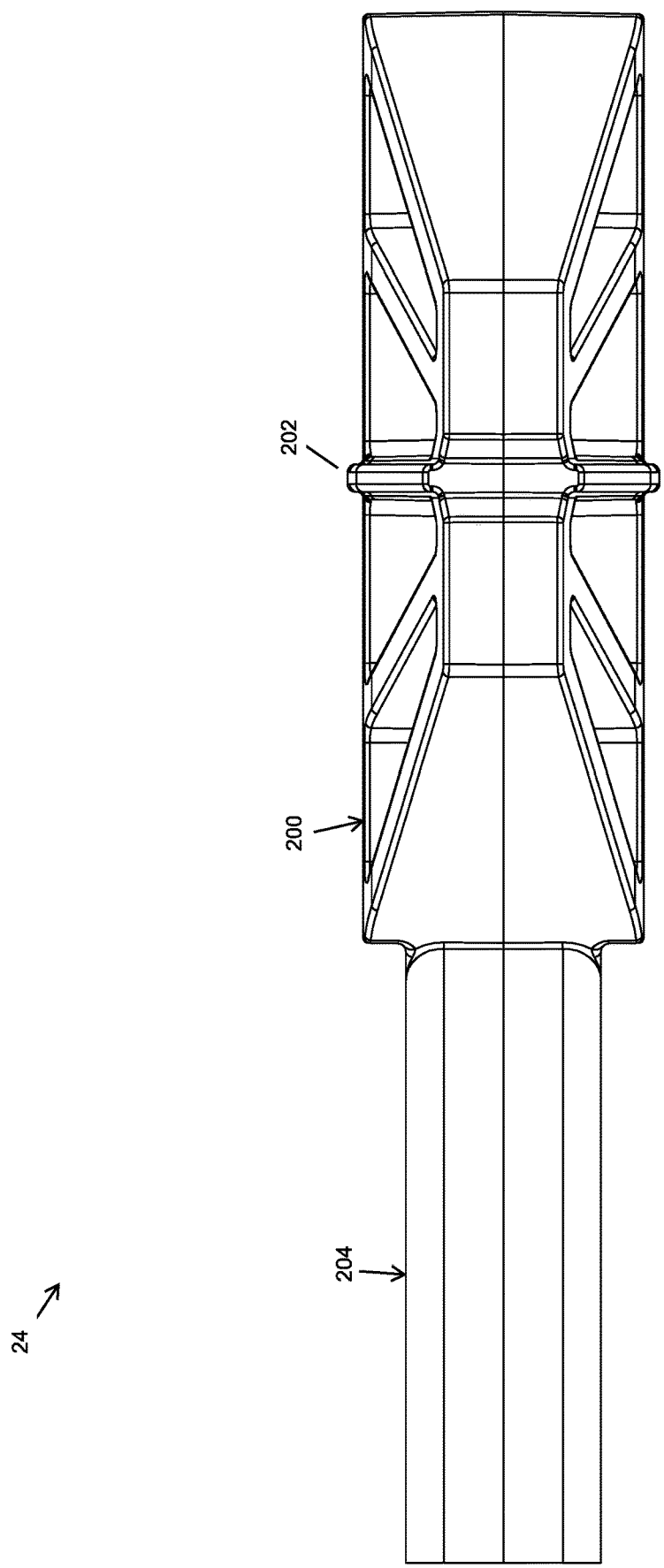
FIG. 36 is an elevation view of an indicator clip or cursor used in association with the sled shown in FIG. 1, the view showing the forward side of the indicator clip or cursor.
Figure 37:
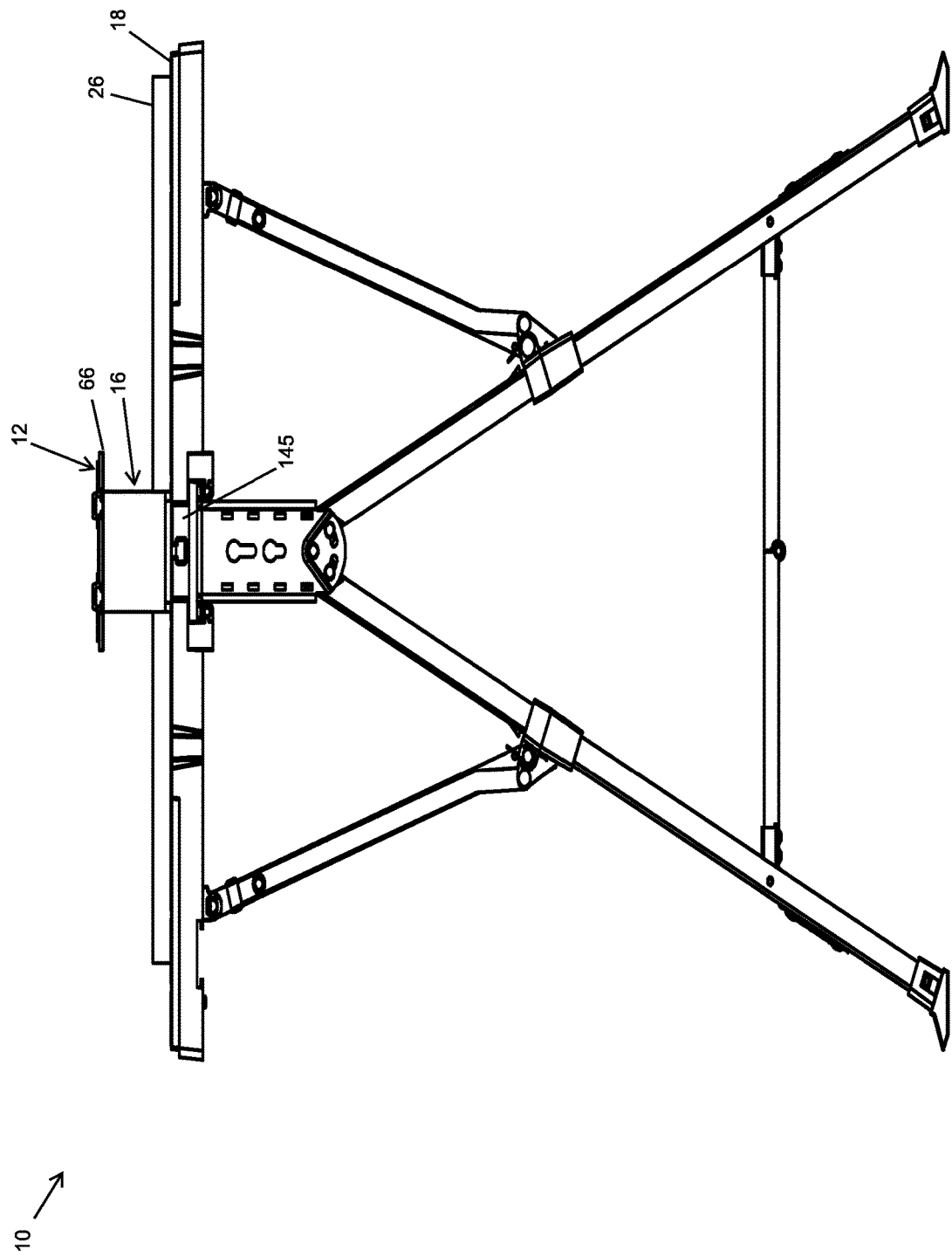
FIG. 37 is an elevation view of the system, the view showing a benchtop, which in this case is what is known as a Mobile Project Center, the benchtop forms a planar upper surface, with foldable wings on either side of a centrally positioned track having an upwardly facing T-slot; the view showing a hinge member connected to the benchtop, or more specifically the track using a connecting member connected to a bottom section of the hinge member, the view showing a track connected to an top section of the hinge member; the view showing the track and hinge members in a fully raised position which raises the bottom surface of the track a distance above the top surface of the benchtop; the view showing a workpiece positioned on the benchtop below the track.
Figure 38:
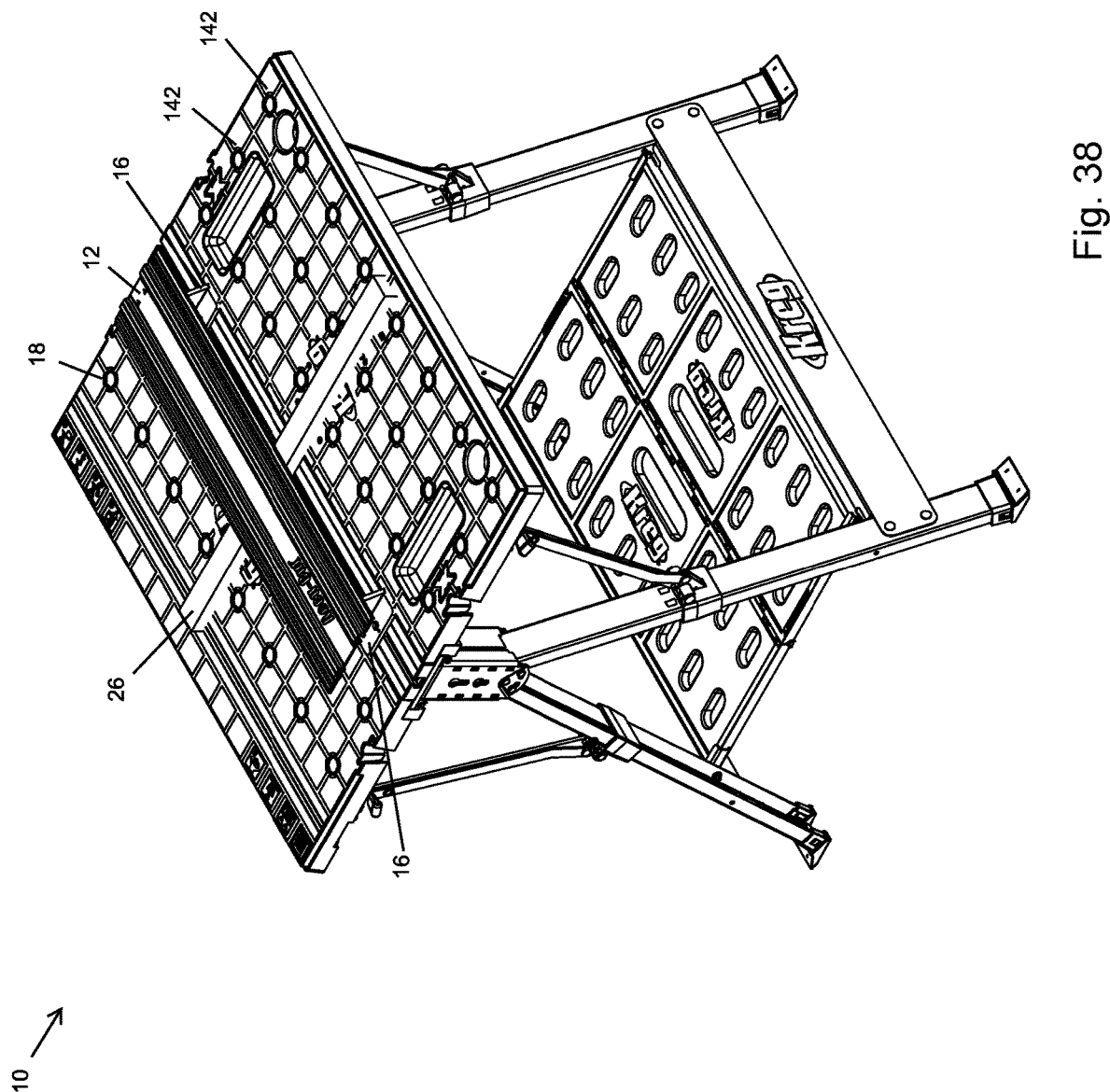
FIG. 38 is a perspective view of the system shown in FIG. 37.
Figure 39:
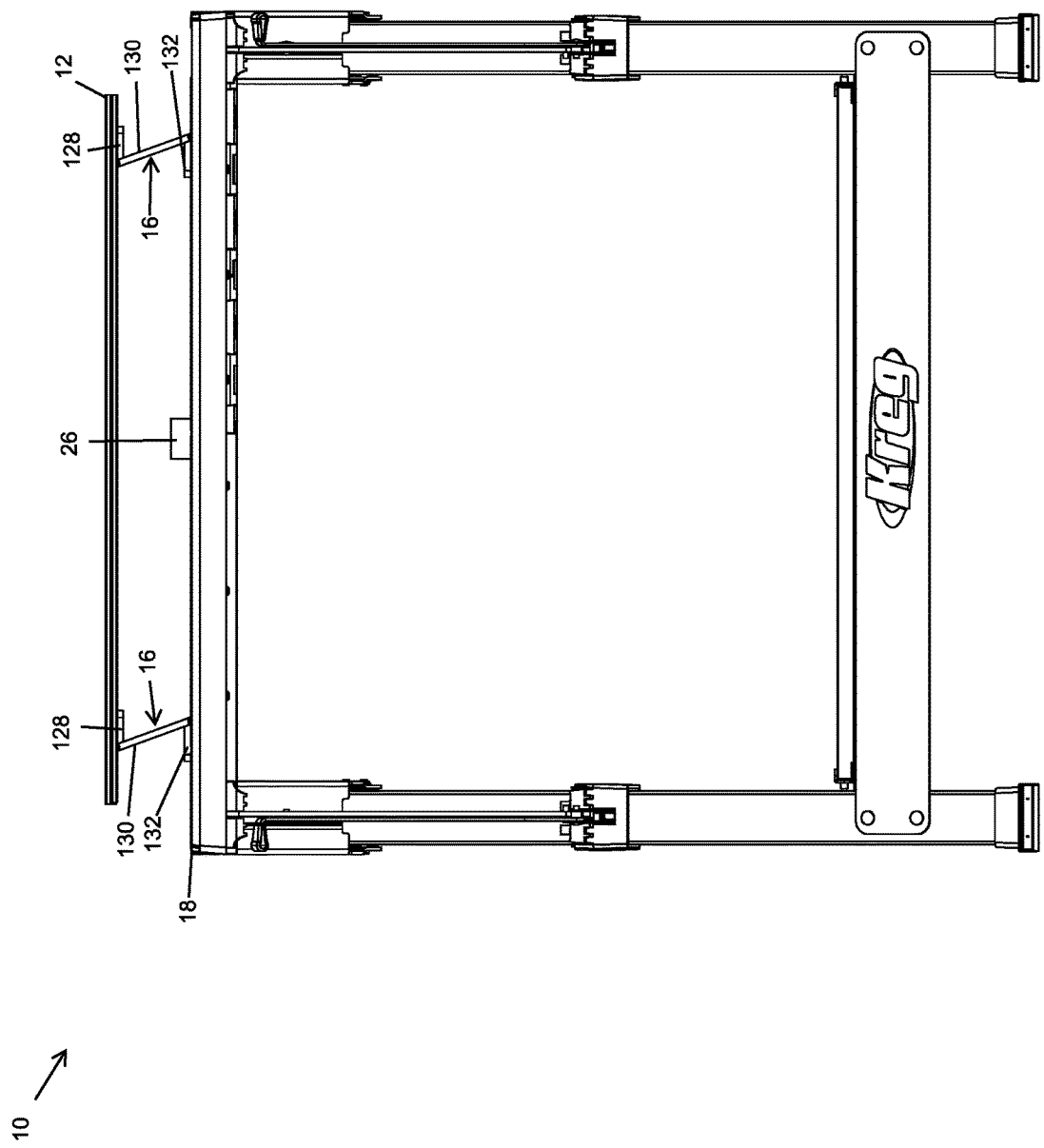
FIG. 39 is a side elevation view of the system shown in FIG. 37, the view showing the workpiece positioned in the space below the track; the view showing a hinge member connected adjacent the outward ends of the track; the view showing the hinge members having a top section, a middle section and a bottom section, wherein the top section is connected to the lower side of the track and the bottom section connected to the benchtop; the view showing the hinge members in a fully raised and over center position which allows the track to rest in a raised position while one or more workpieces are positioned under the track.
Figure 40:
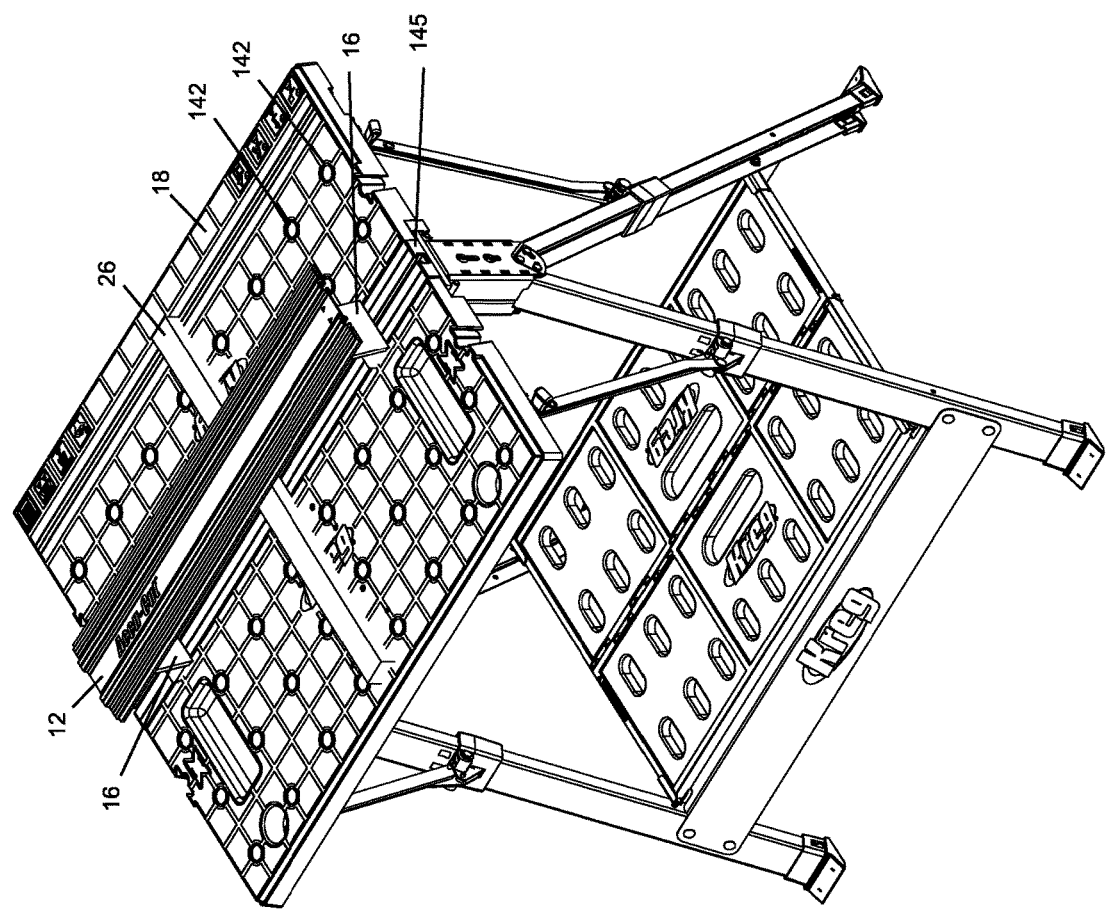
FIG. 40 is another perspective view of the system shown in FIG. 37.
Figure 41:
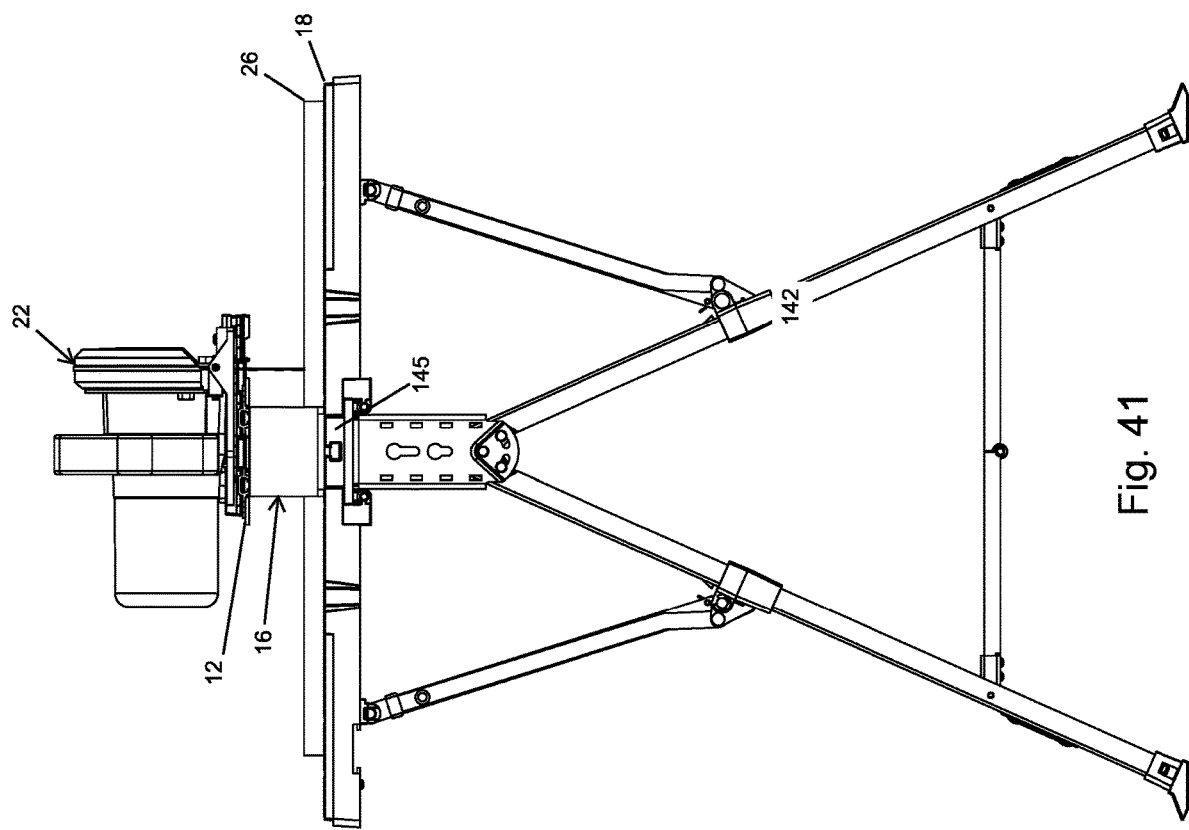
FIG. 41 is an end elevation view of the system shown in FIG. 37 the view showing the rearward end of the system, the view showing the workpiece positioned in the space below the track; the view showing a hinge member connected adjacent the outward end of the track; the view showing the hinge members having a top section, a middle section and a bottom section, wherein the top section is connected to the lower side of the track and the bottom section connected to the benchtop; the view showing the hinge members in a fully raised position which allows the track to rest in a raised position while one or more workpieces are positioned under the track; the view showing a cutting device, which in this case is a circular saw, connected to a sled that is positioned on the track.
Figure 42:
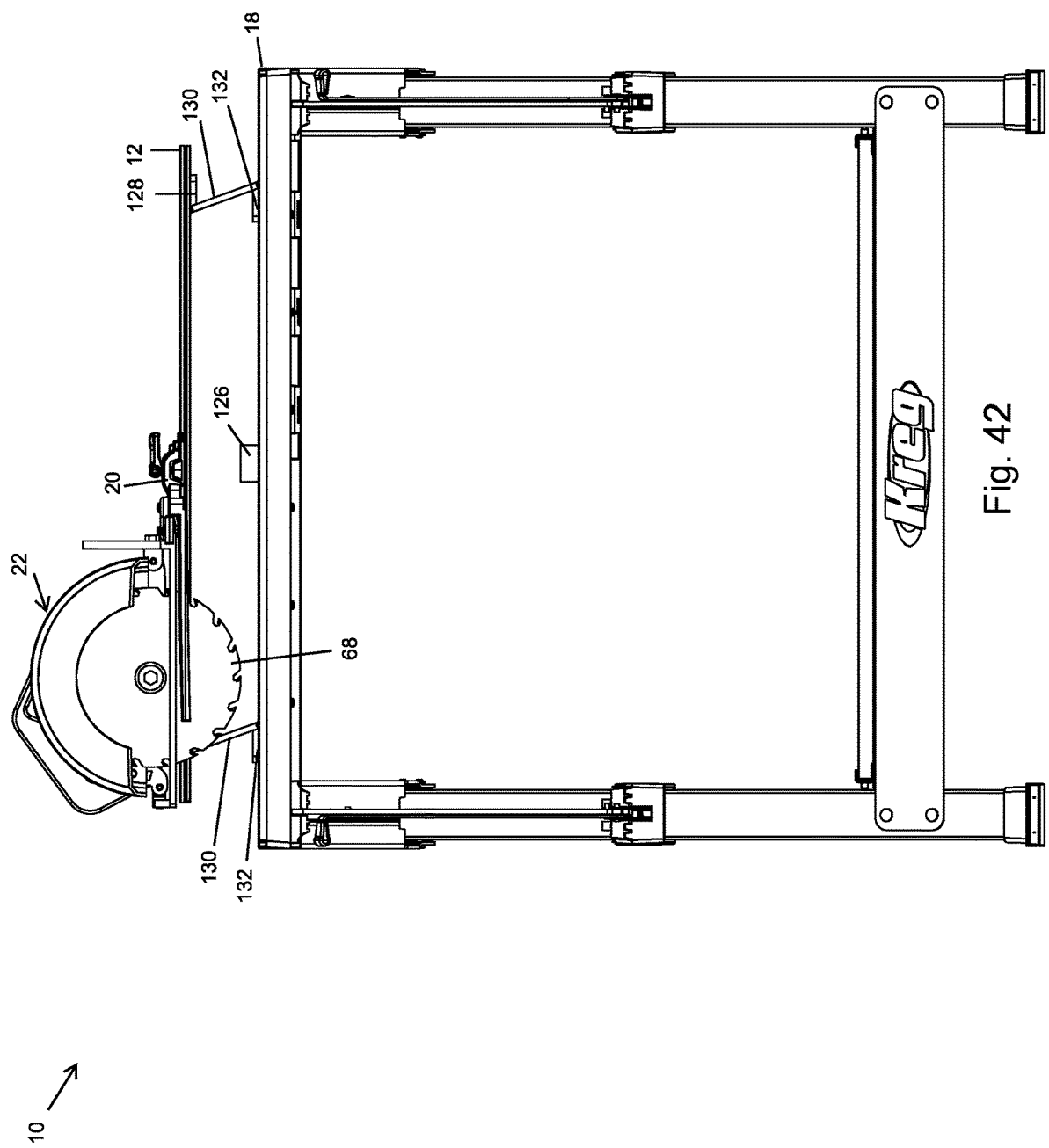
FIG. 42 is a side elevation view of the system shown in FIG. 41.
Figure 43:
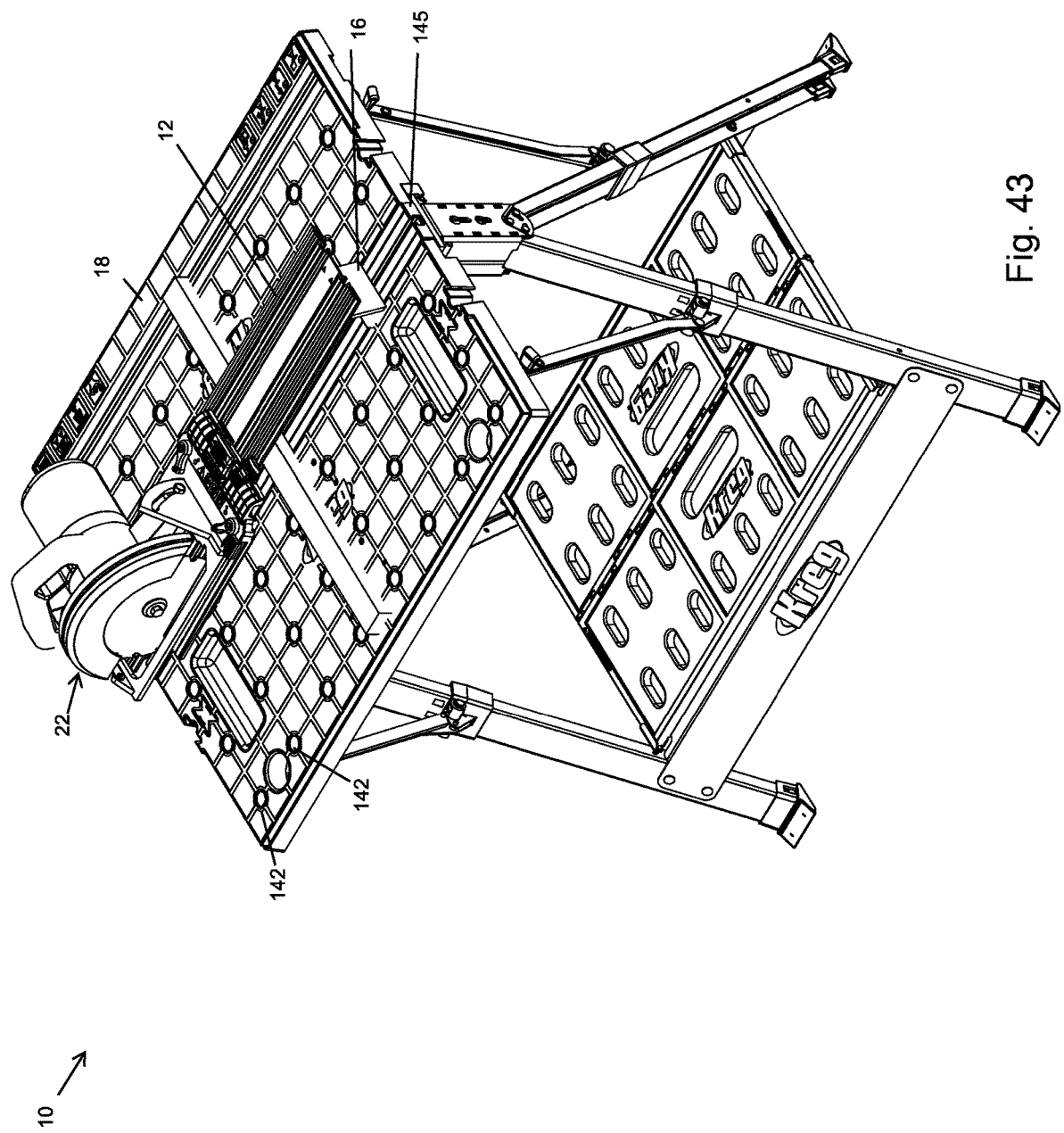
FIG. 43 is a perspective view of the system shown in FIG. 41.
Figure 44:
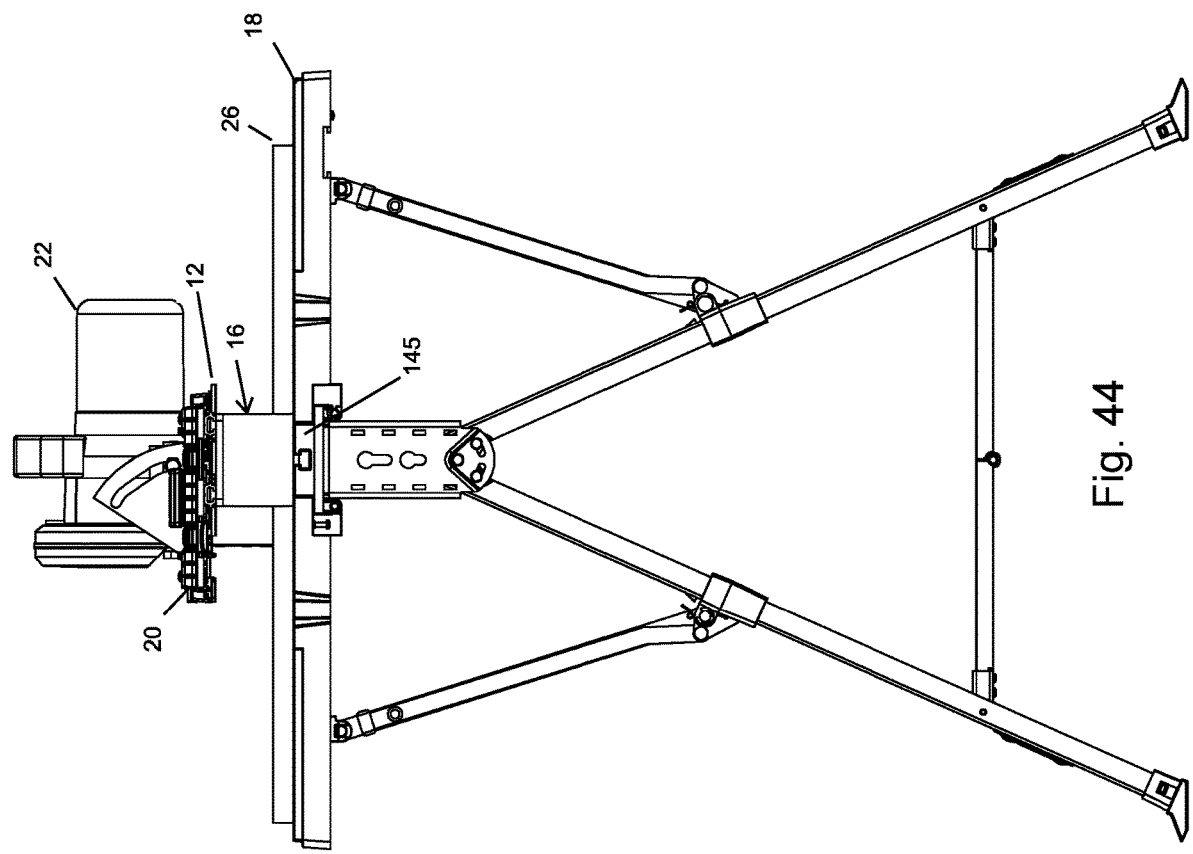
FIG. 44 is an end elevation view of the system shown in FIG. 41 the view showing the forward end of the system
Figure 45:
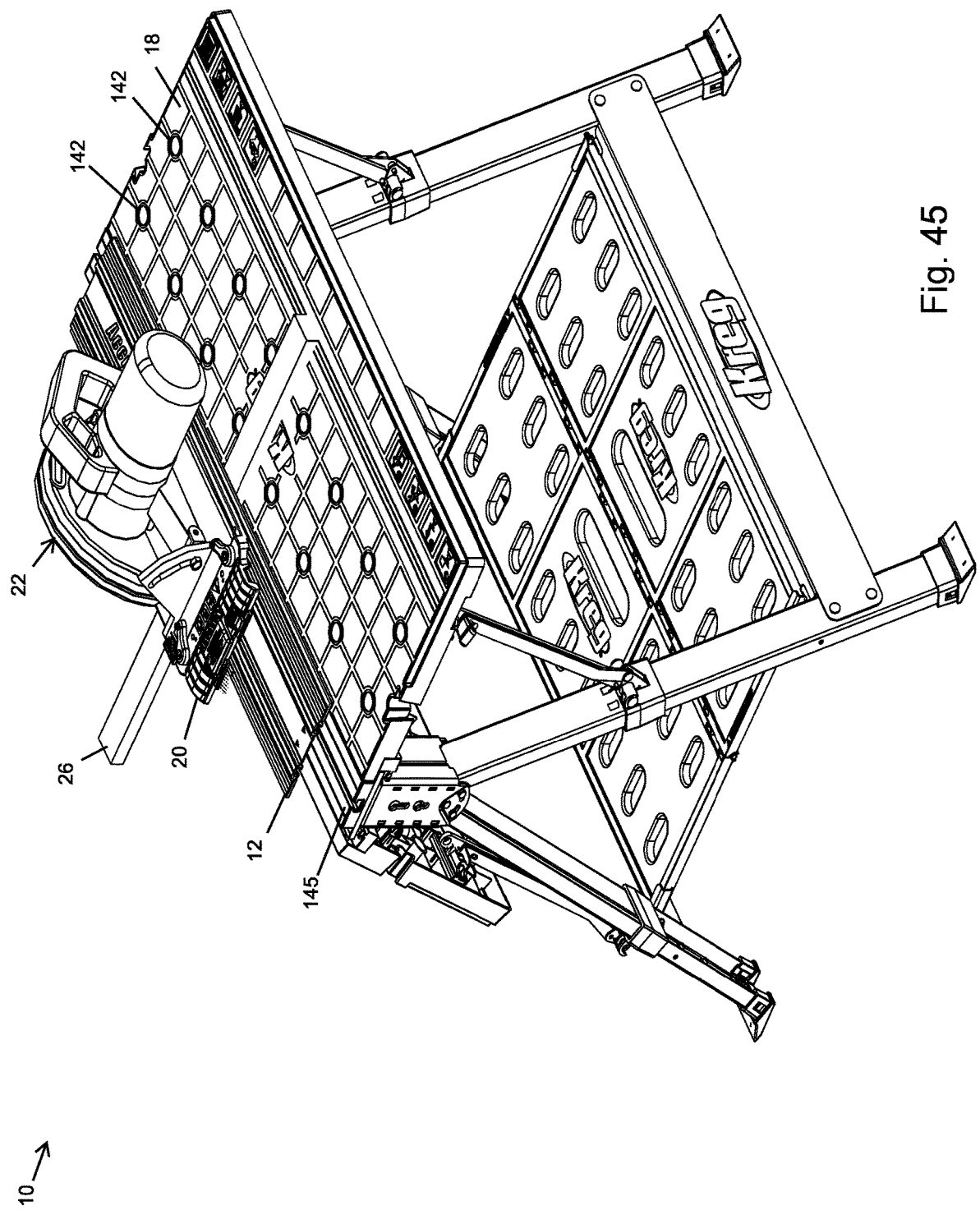
FIG. 45 is a perspective view of the system shown in FIG. 41; the view showing a wing of the benchtop in a folded position.
Figure 46:
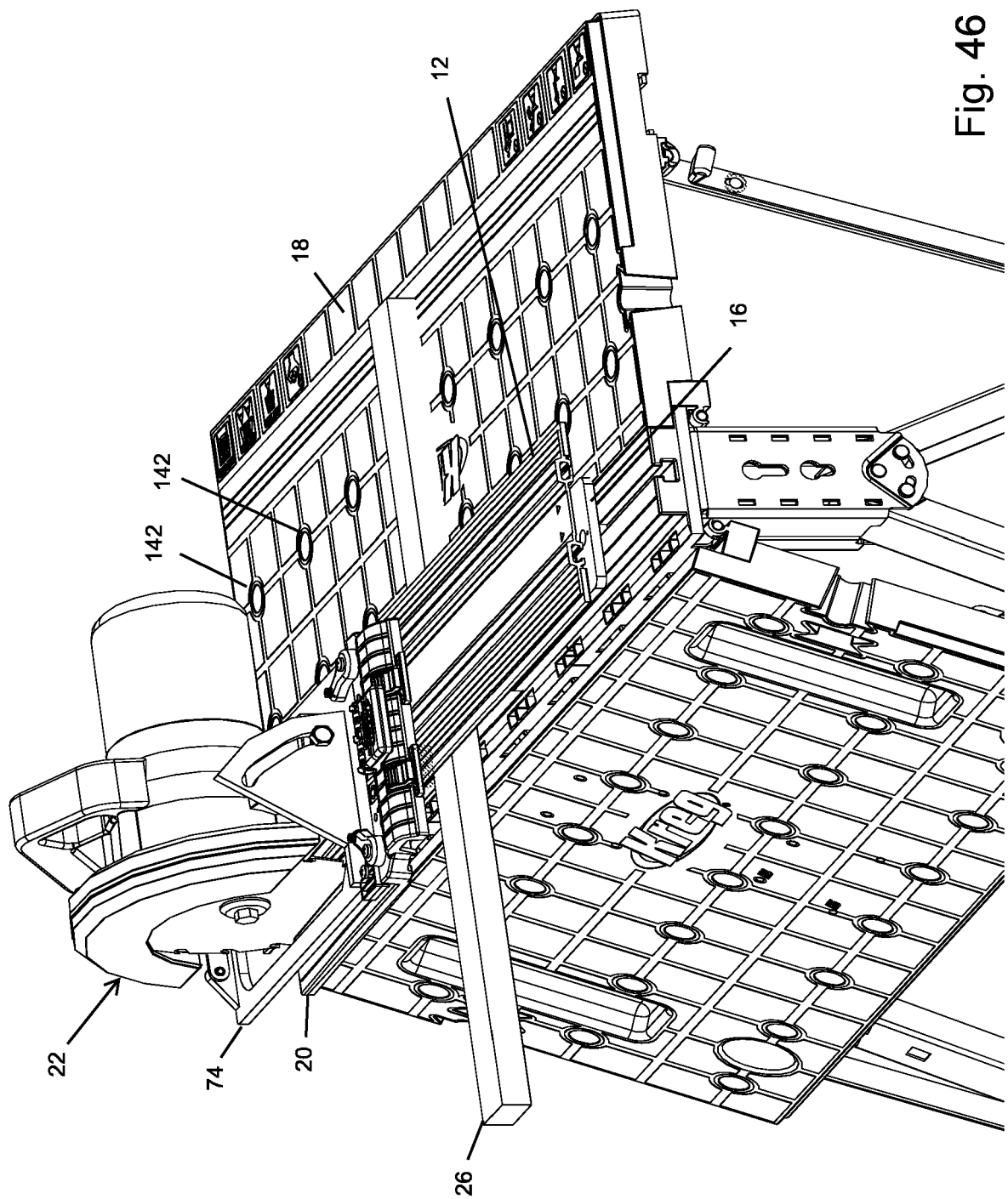
FIG. 46 is another perspective view of the system shown in FIG. 45.
Figure 47:
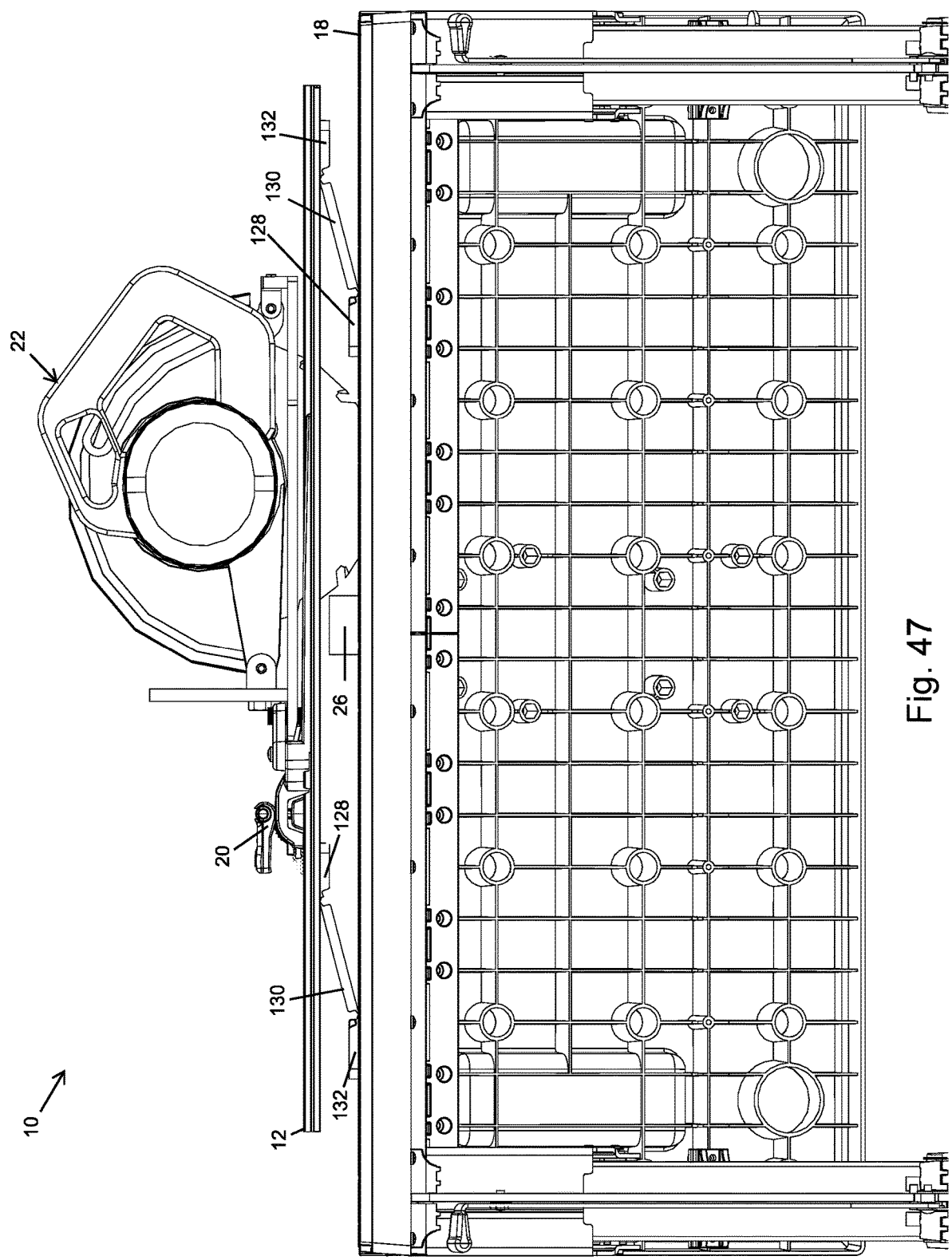
FIG. 47 is a side elevation view of the system shown in FIG. 37, the view showing the workpiece positioned in the space below the track; the view showing a hinge member connected adjacent the outward end of the track; the view showing the hinge members having a top section, a middle section and a bottom section, wherein the top section is connected to the lower side of the track and the bottom section connected to the benchtop; the view showing the hinge members in a lowered position wherein the lower surface of the grip strips engage the upper surface of the workpiece thereby holding the workpiece in place under the track and grip strips; the view showing a cutting device, which in this case is a circular saw, connected to a sled that is positioned on the track.
Figure 48:
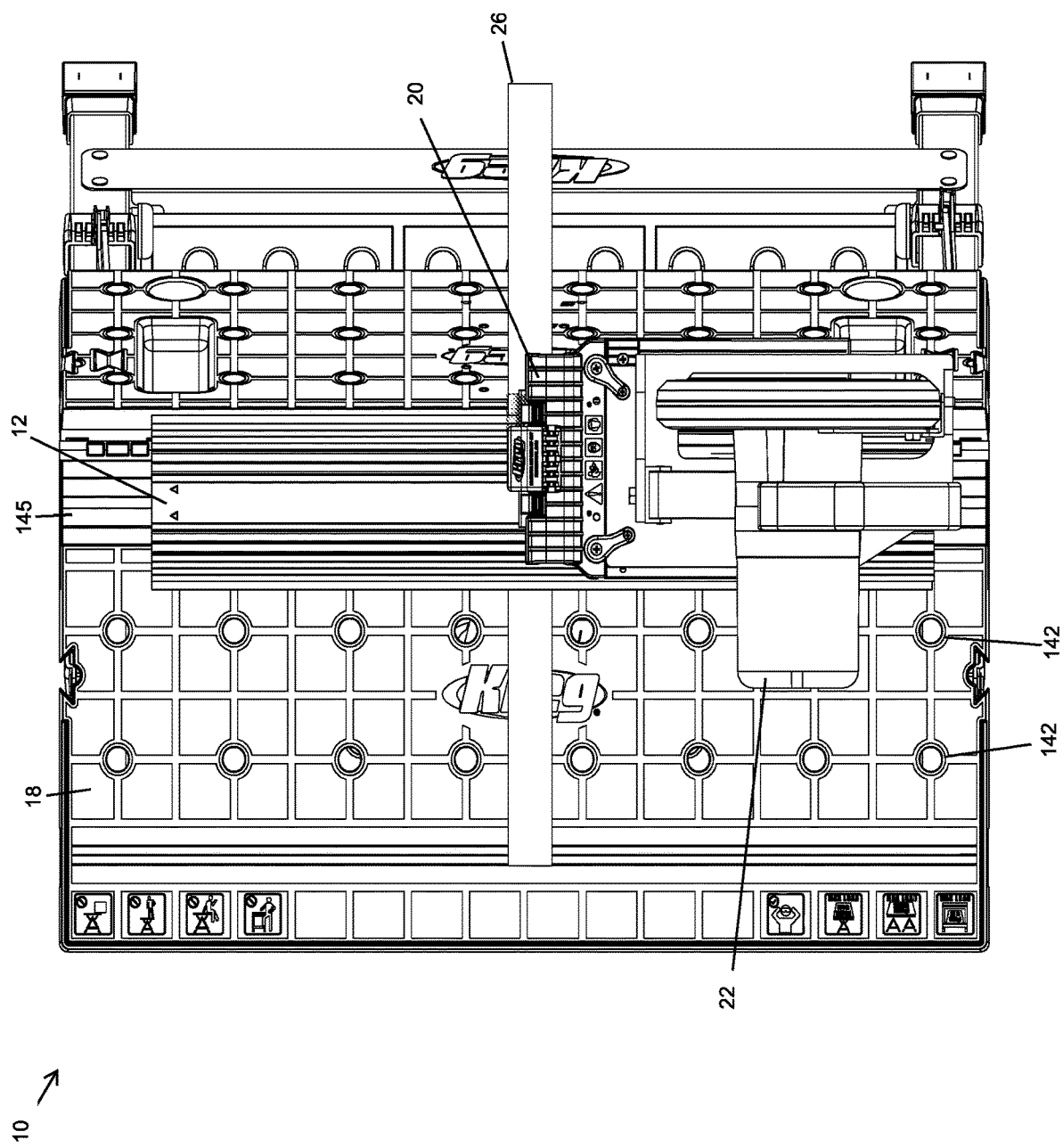
FIG. 48 is an elevation view of the system shown in FIG. 47, the view showing the top side of the system.
Figure 49:
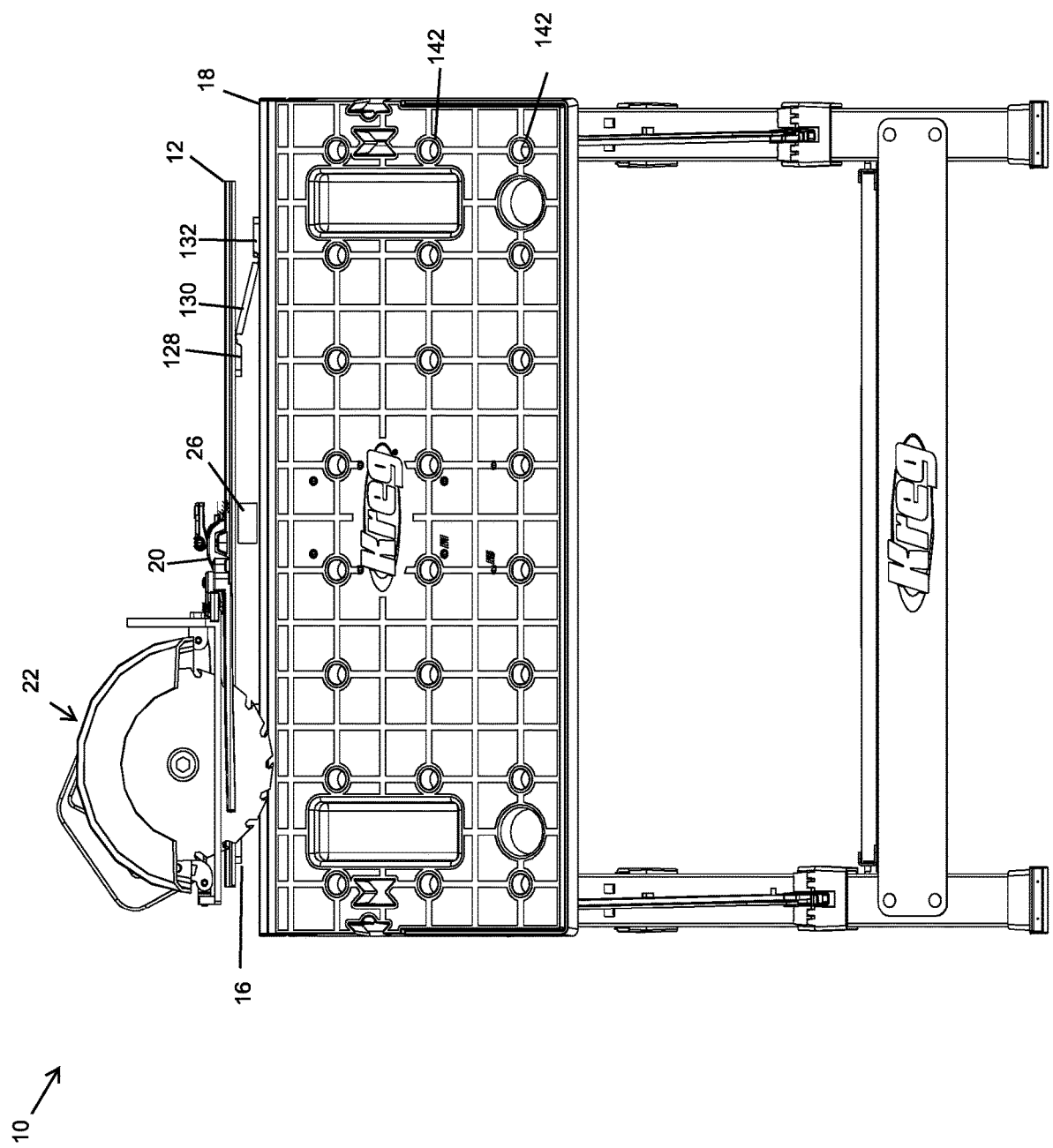
FIG. 49 is an elevation view of the system shown in FIG. 47, the view showing the other side of the system.
Figure 50:
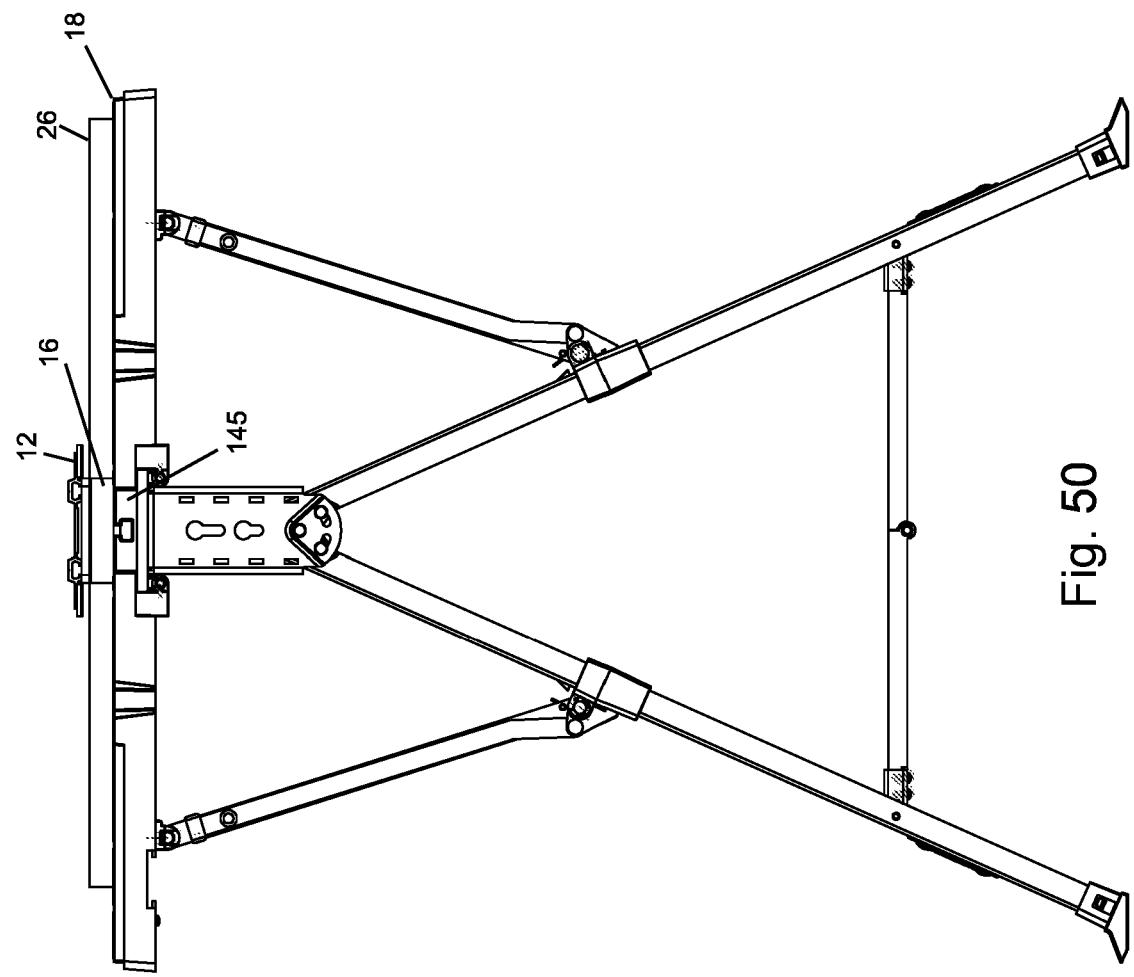
FIG. 50 is an elevation view of the system shown in FIGS. 37 and 47, the view showing an end view of the system; the view showing the track resting on the workpiece in a lowered position.
Figure 51:
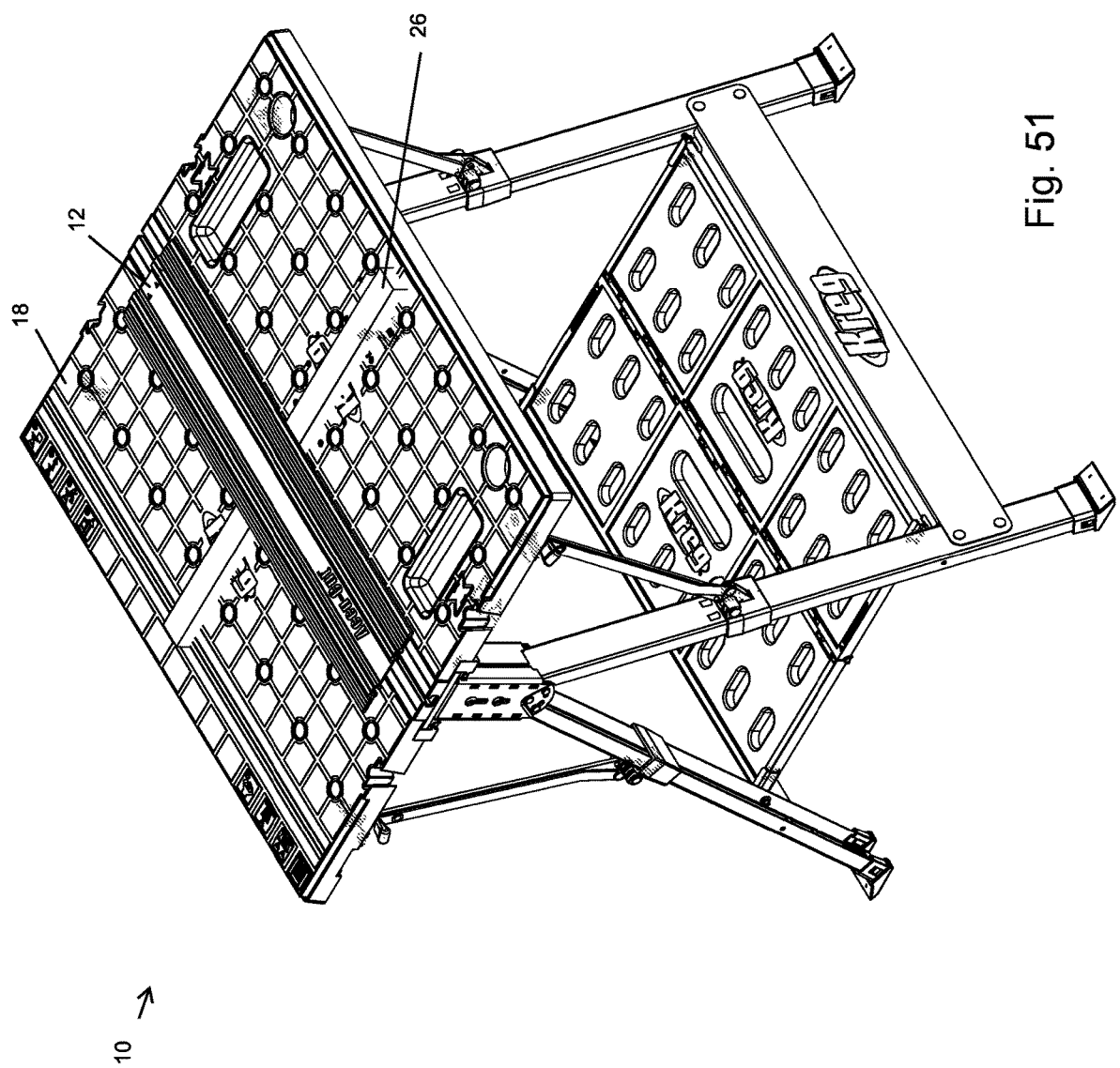
FIG. 51 is a perspective view of the system shown in FIG. 50, the view showing an end of the system; the view showing the track resting on the workpiece in a lowered position.
Figure 52:
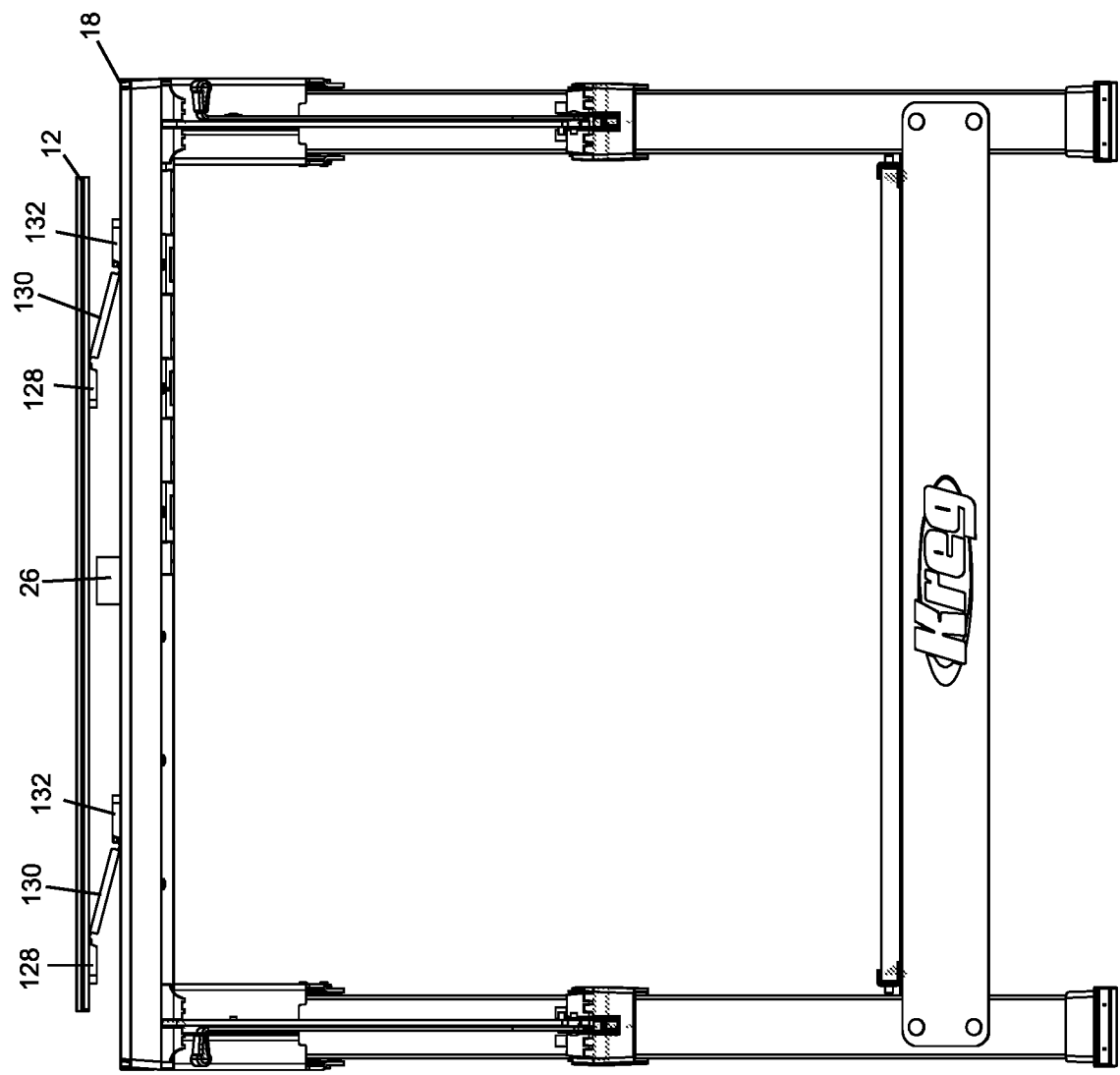
FIG. 52 is an elevation view of the system shown in FIG. 50, the view showing a side of the system; the view showing the track resting on the workpiece in a lowered position.
Figure 53:
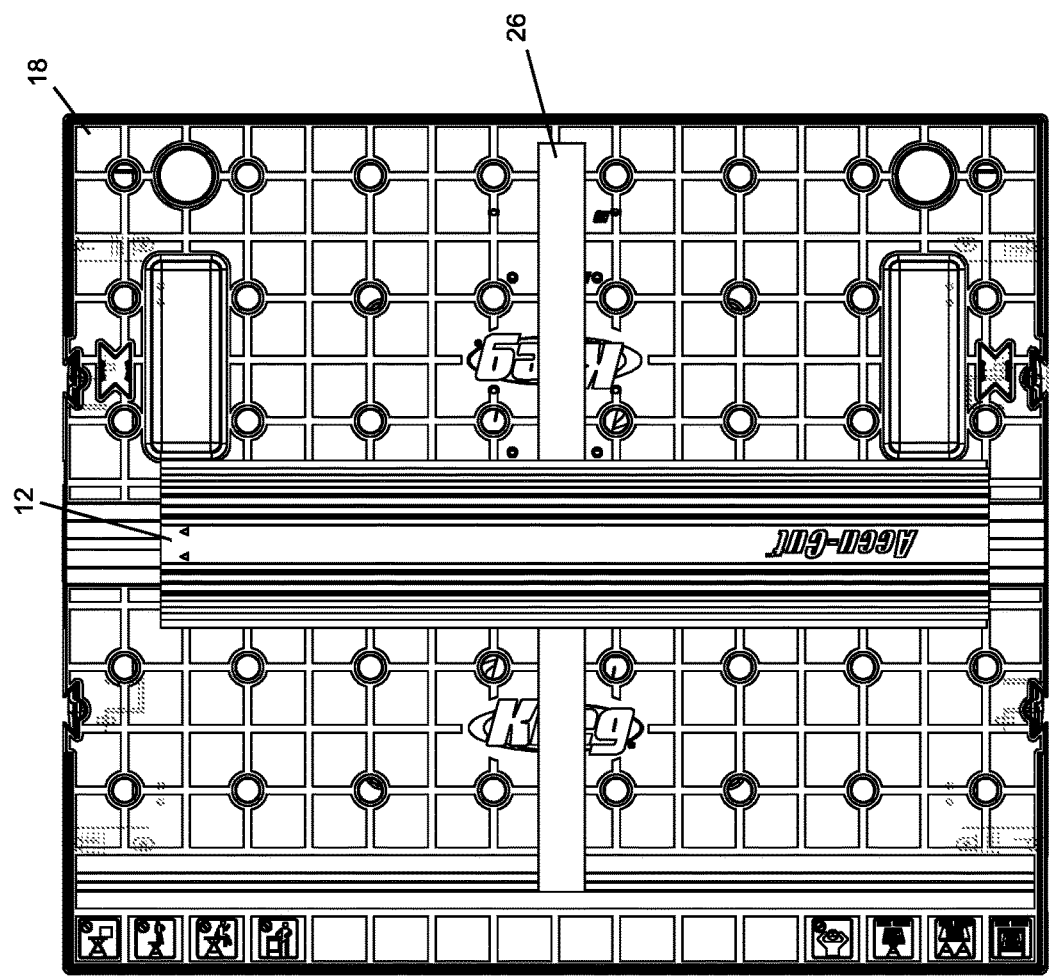
FIG. 53 is an elevation view of the system shown in FIG. 50, the view showing the top side of the system; the view showing the track resting on the workpiece in a lowered position.
Figure 54:
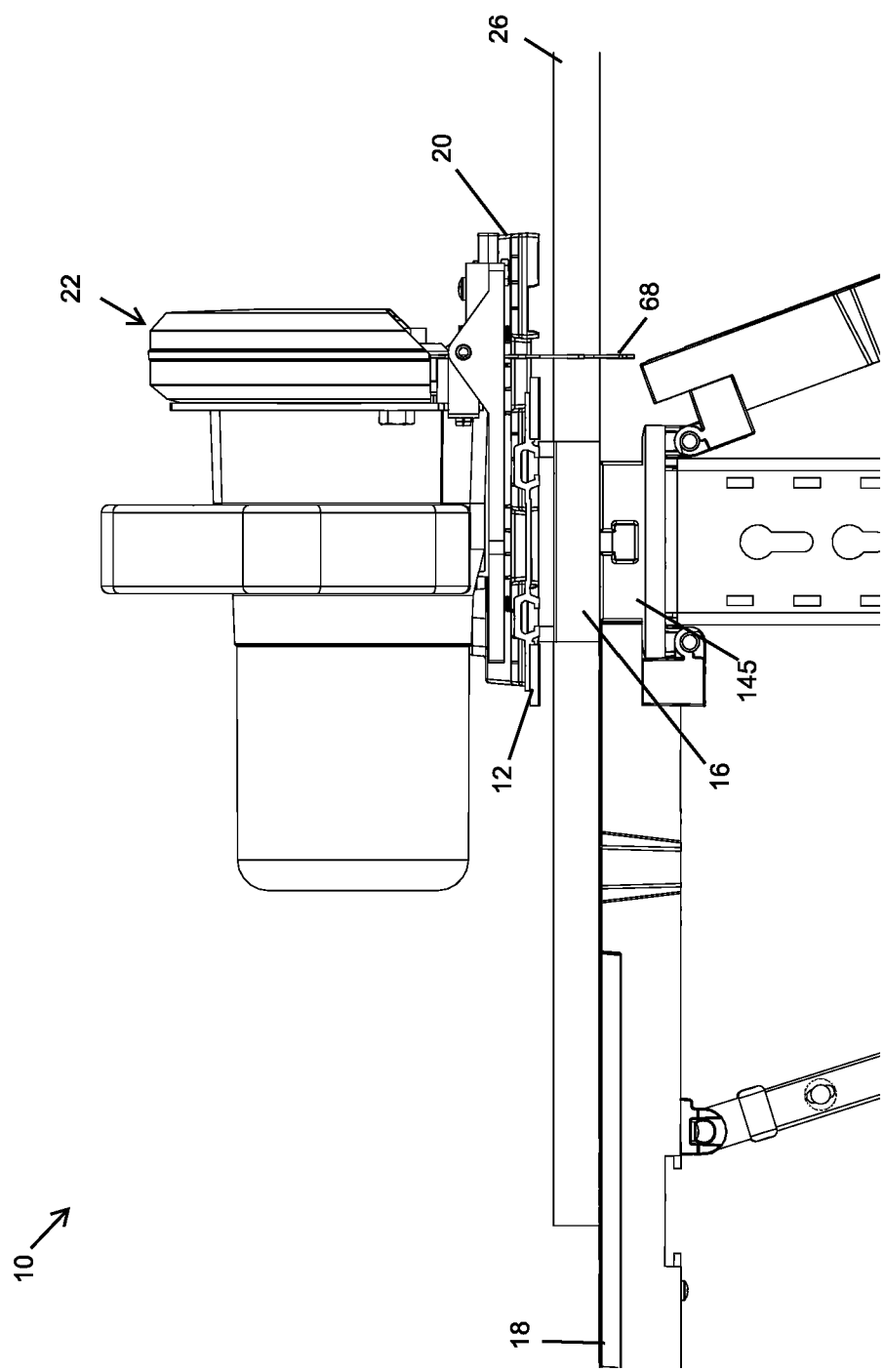
FIG. 54 is a close-up end elevation view of the system, the view showing the track in a lowered position on the workpiece; the view showing a cutting device, which in this case is a circular saw, connected to a sled that is connected to and sliding along the track; the view showing the blade of the cutting device intersecting with the work piece.
Figure 55:
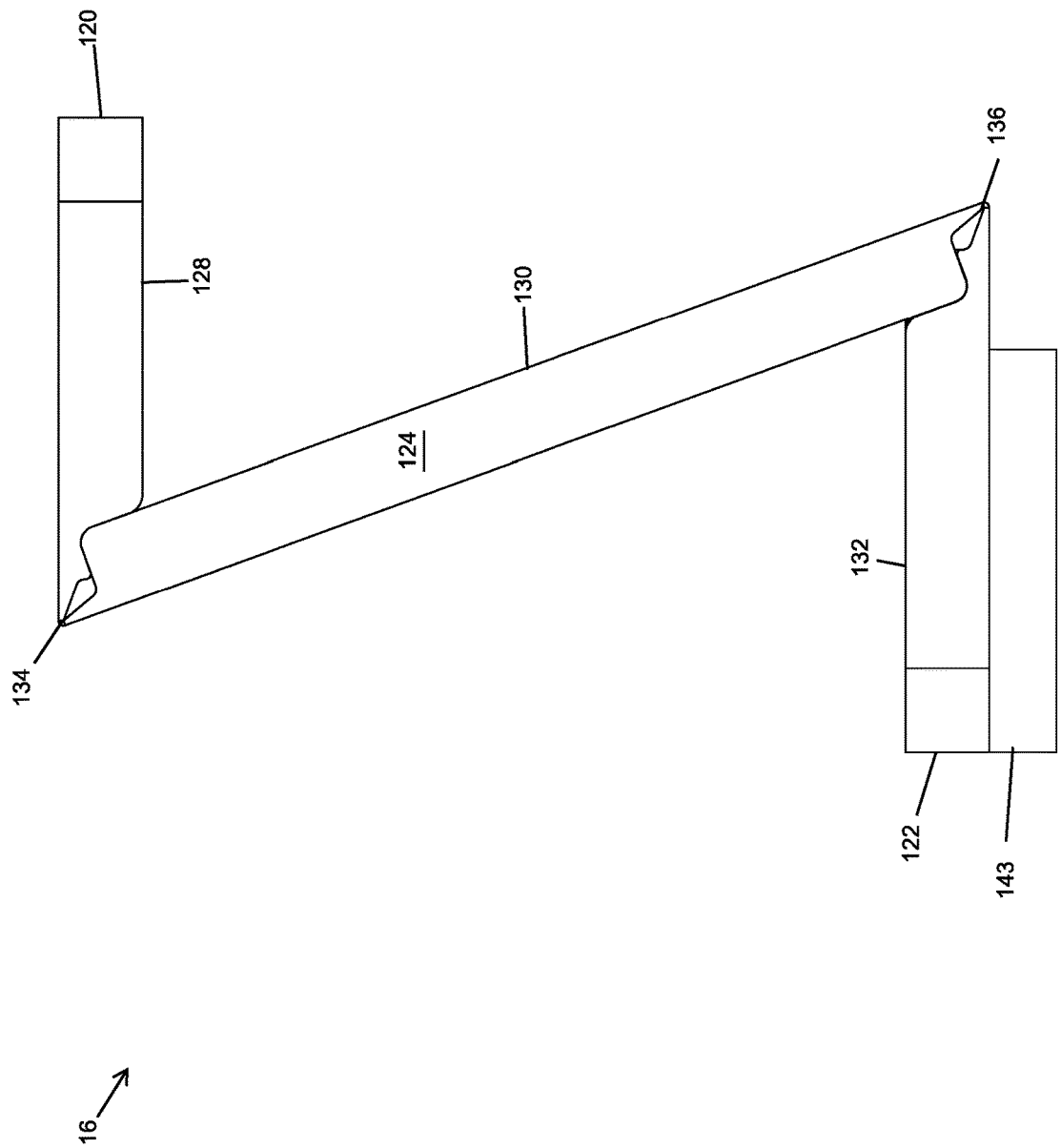
FIG. 55 is an elevation view of a hinge member, the view showing a side of the hinge member; the view showing hinge member formed of a top section, a middle section and a bottom section where the top section and middle section are connected by an upper hinge and the middle section and bottom section are connected by a lower hinge; the view showing a connecting member connected to the lower surface of the bottom section, the connecting section configured to fit within or connect to a slot of a track of a benchtop to facilitate connection to the benchtop; the view showing the hinge member in a fully raised and over-center position wherein the top section, middle section and bottom section take on a Z-shape, wherein the upper hinge allows the top section and middle section to engage one another and the lower hinge allows the middle section and bottom section to engage one another thereby holding the track in a raised and over center position.
Figure 56:
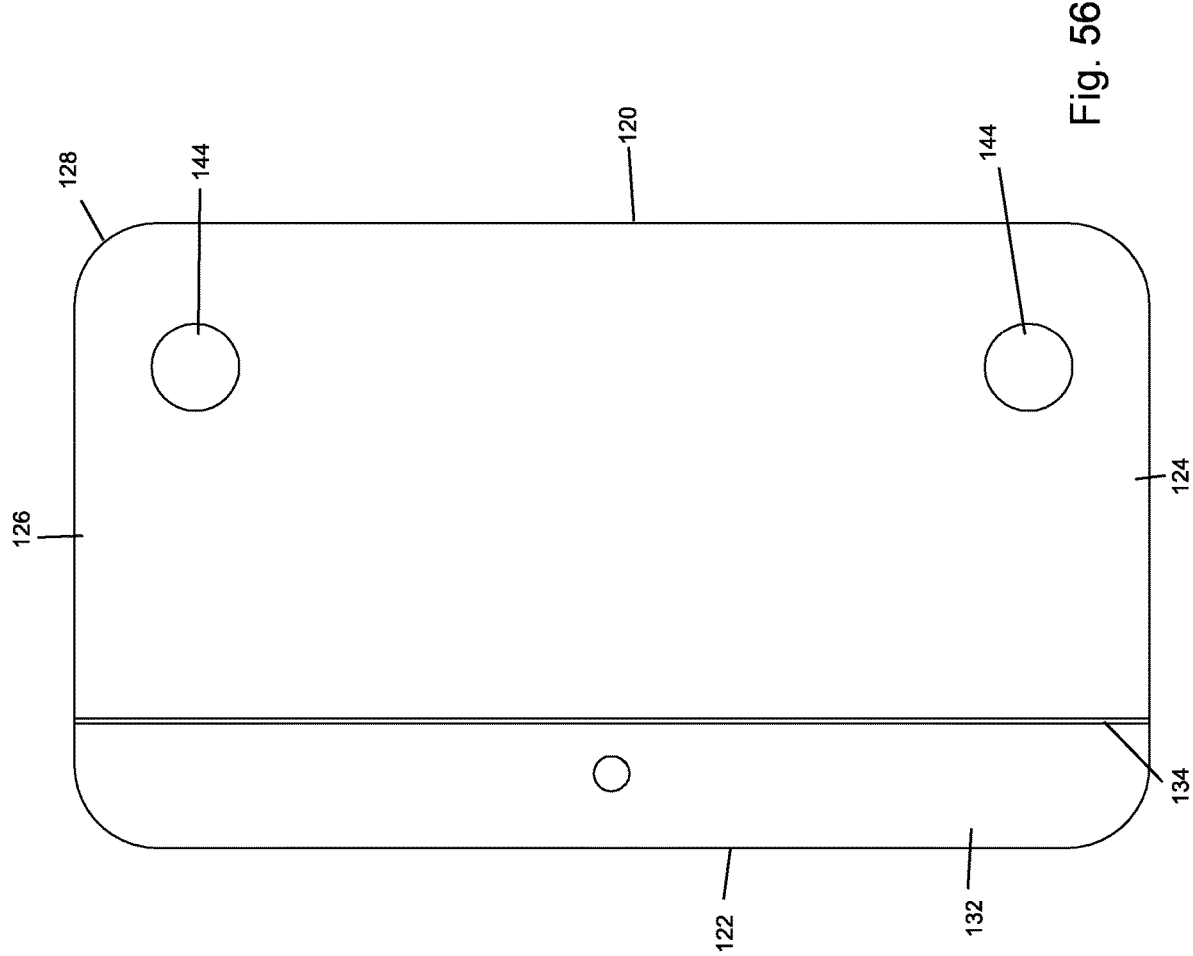
FIG. 56 is an elevation view of the hinge member of FIG. 55, the view showing the top side of the hinge member.
Figure 57:
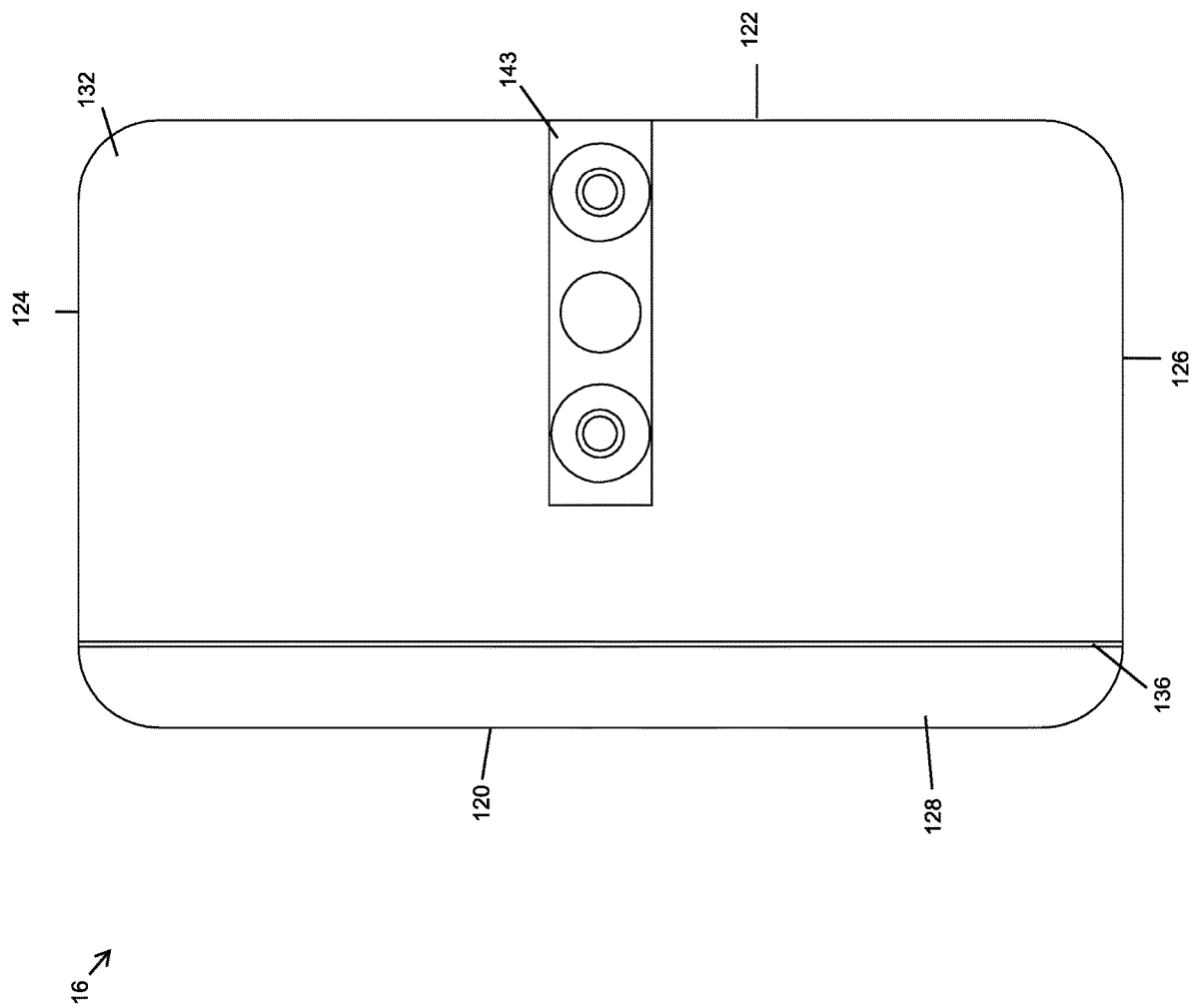
FIG. 57 is an elevation view of the hinge member of FIG. 55, the view showing the bottom side of the hinge member.
Figure 58:
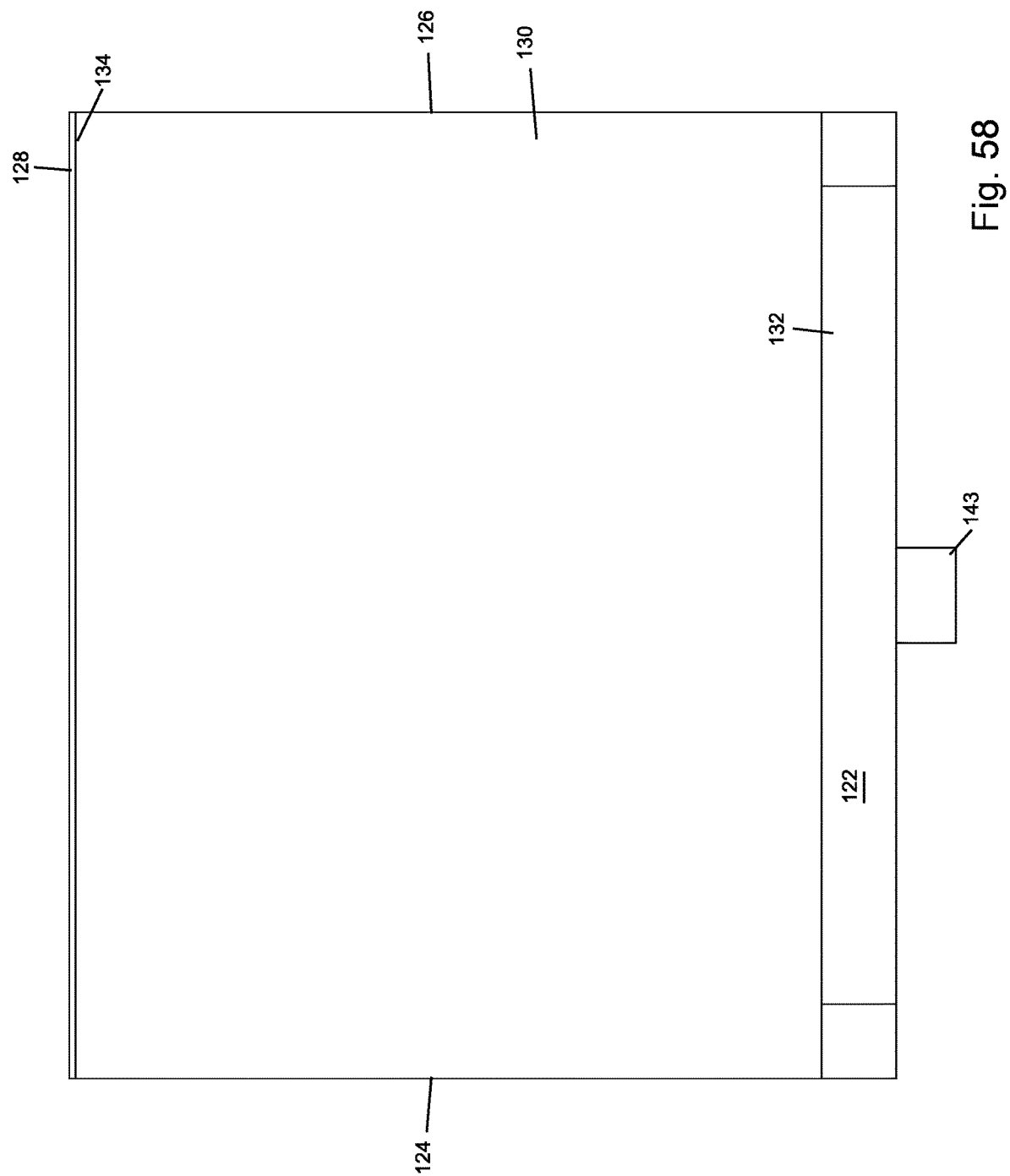
FIG. 58 is an elevation view of the hinge member of FIG. 55, the view showing an end of the hinge member.
Figure 59:
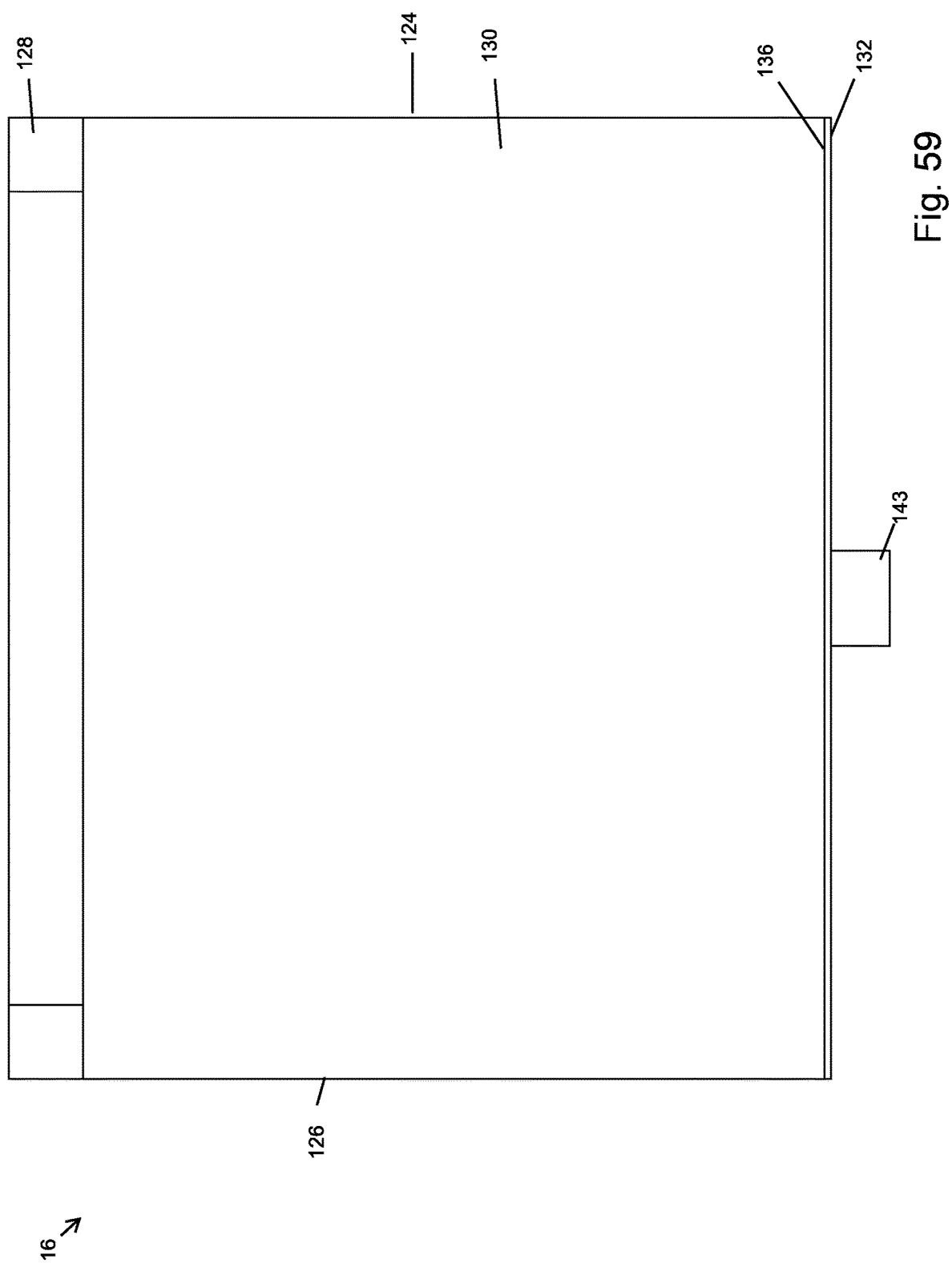
FIG. 59 is an elevation view of the hinge member of FIG. 55, the view showing an end of the hinge member.
Figure 60:
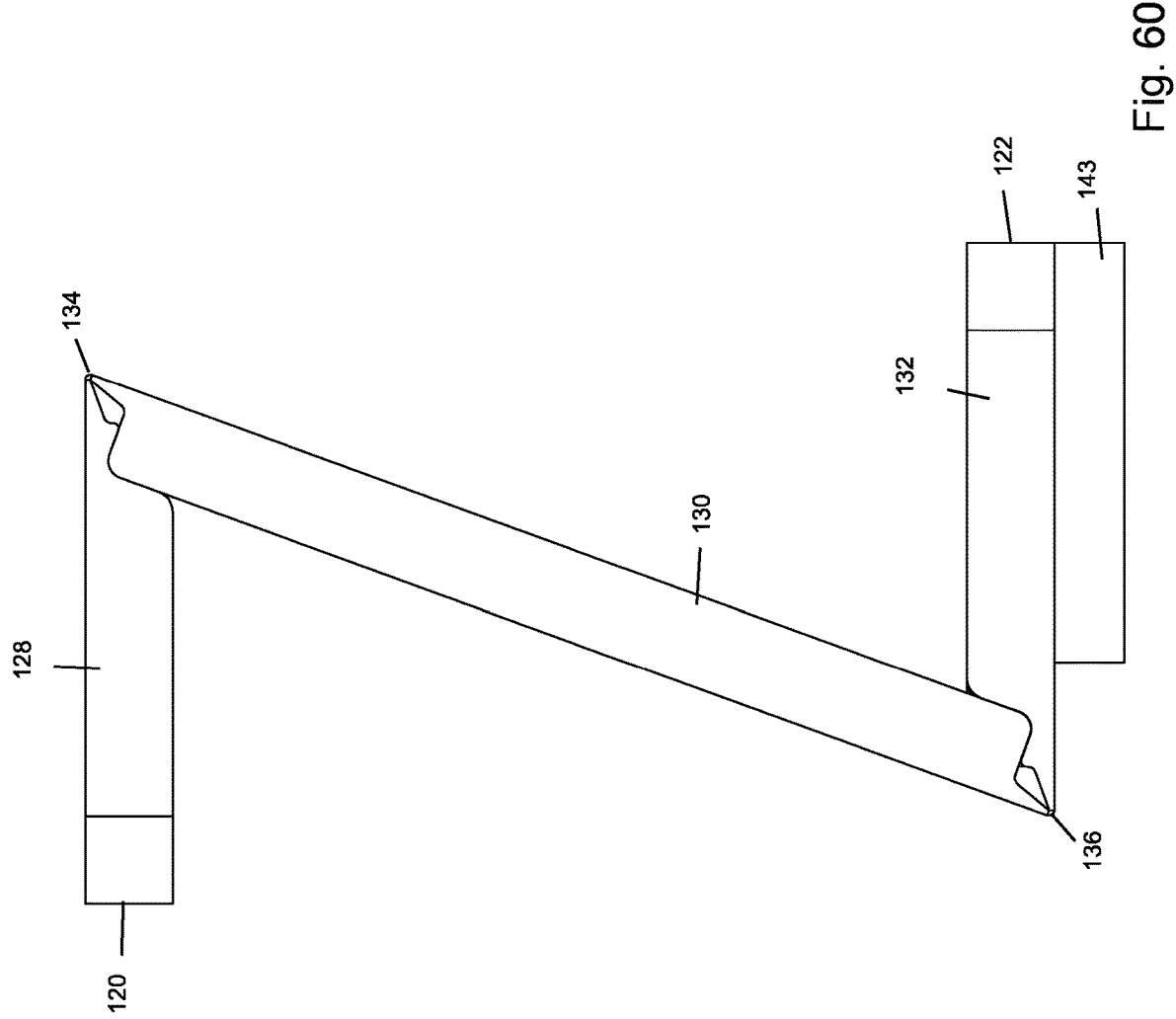
FIG. 60 is an elevation view of the hinge member of FIG. 55, the view showing a side of the hinge member.
Figure 61:
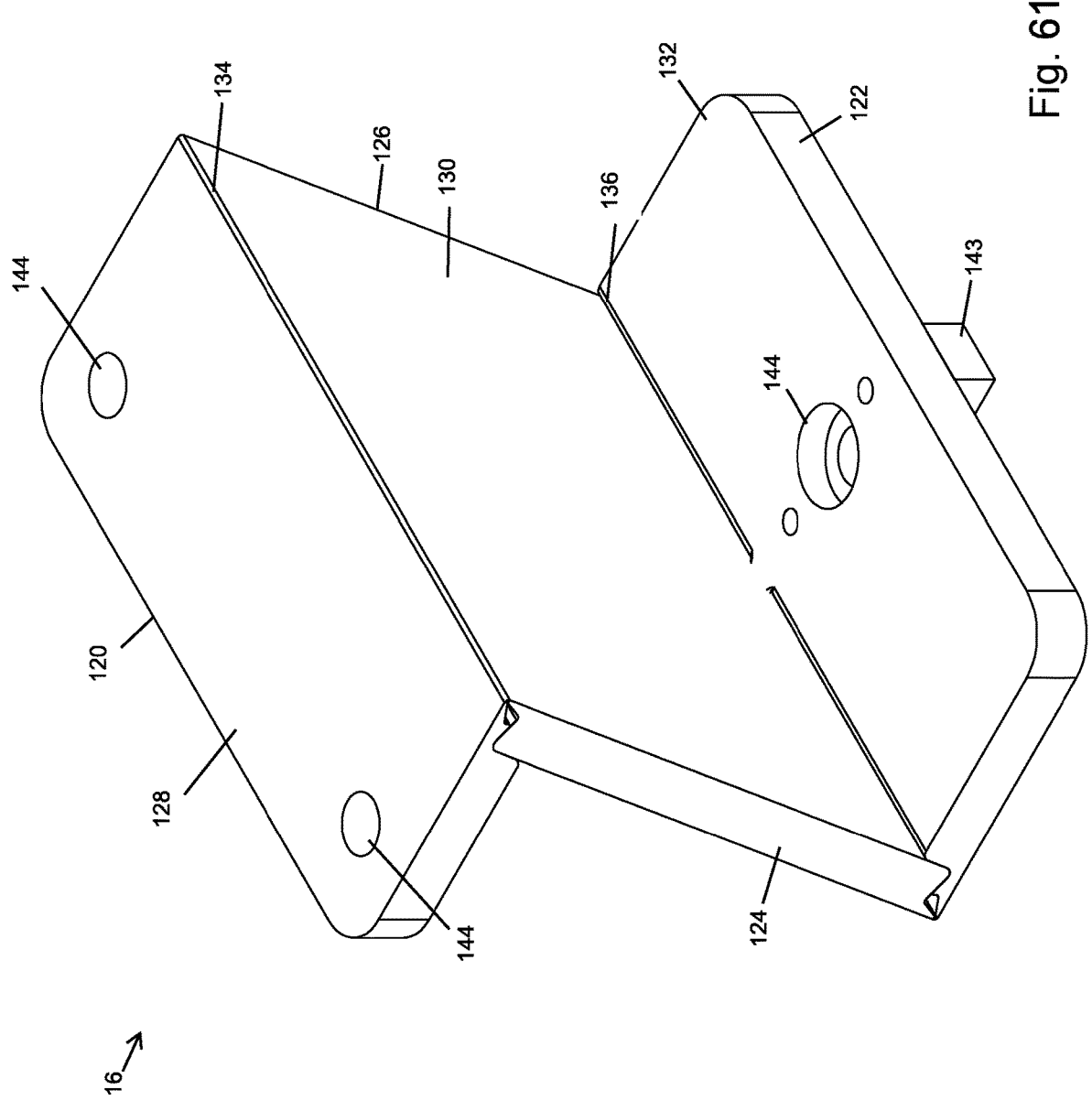
FIG. 61 is a perspective view of the hinge member of FIG. 55.
Figure 62:
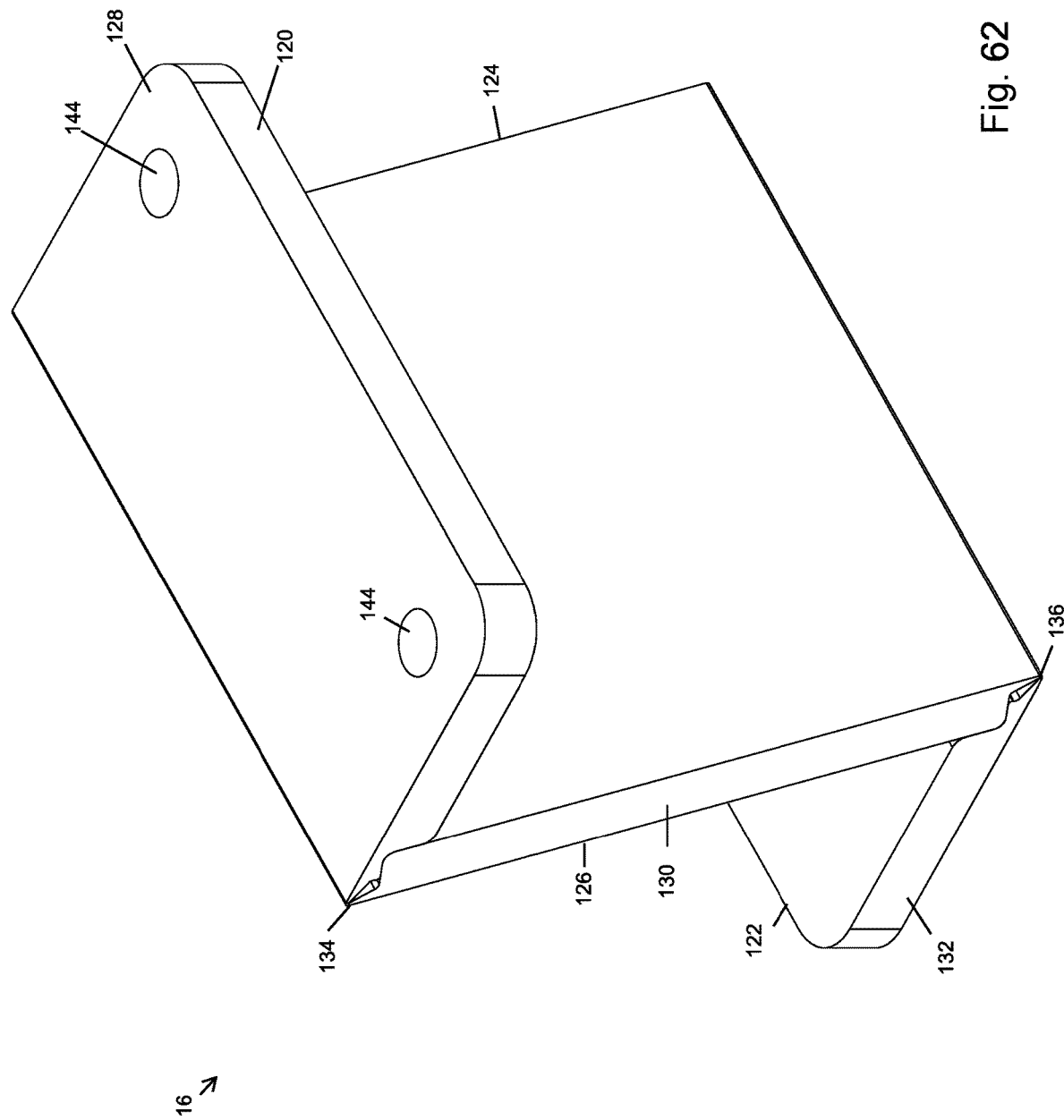
FIG. 62 is a perspective view of the hinge member of FIG. 55.
Figure 63:
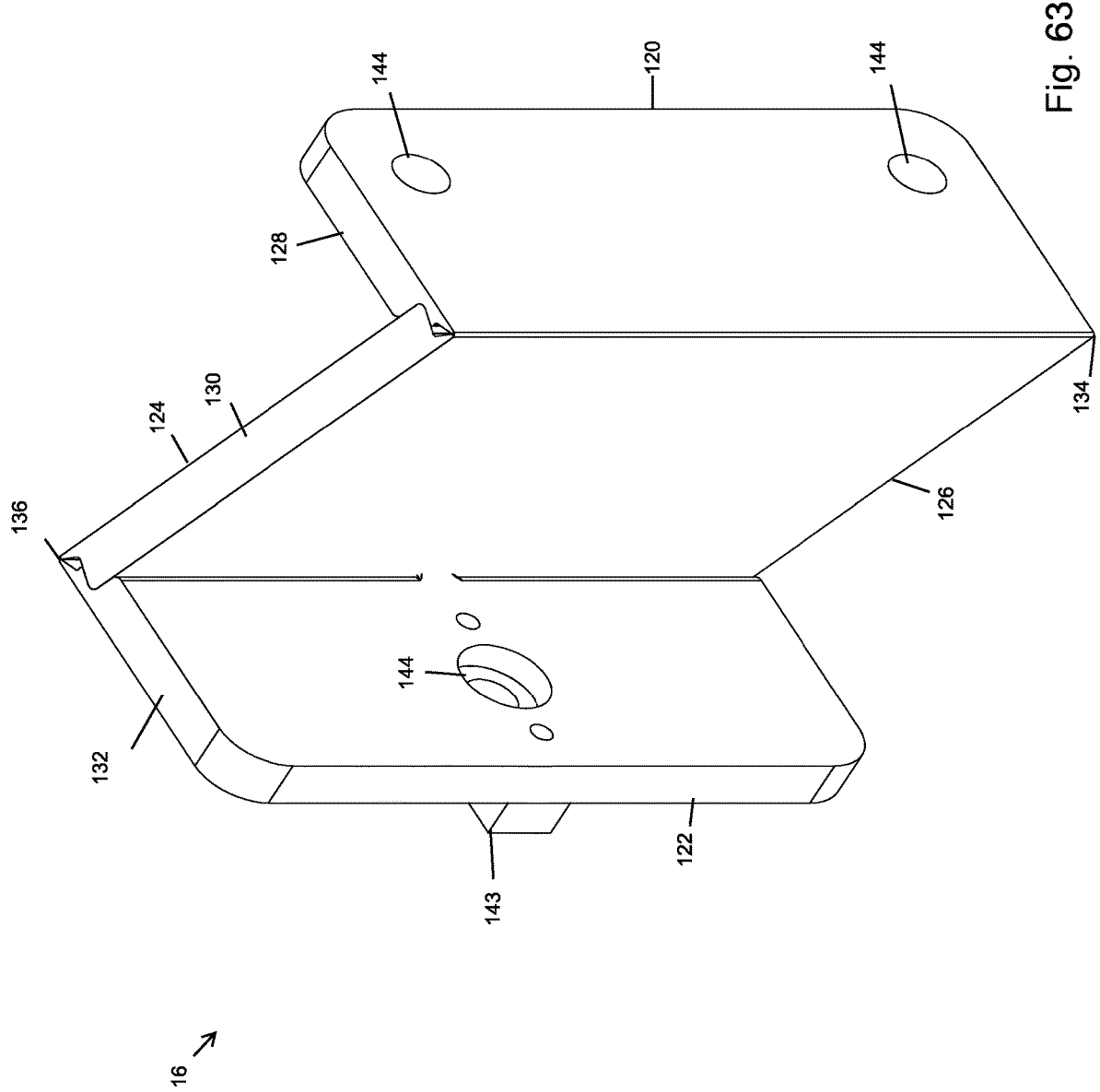
FIG. 63 is a perspective view of the hinge member of FIG. 55.
Figure 64:
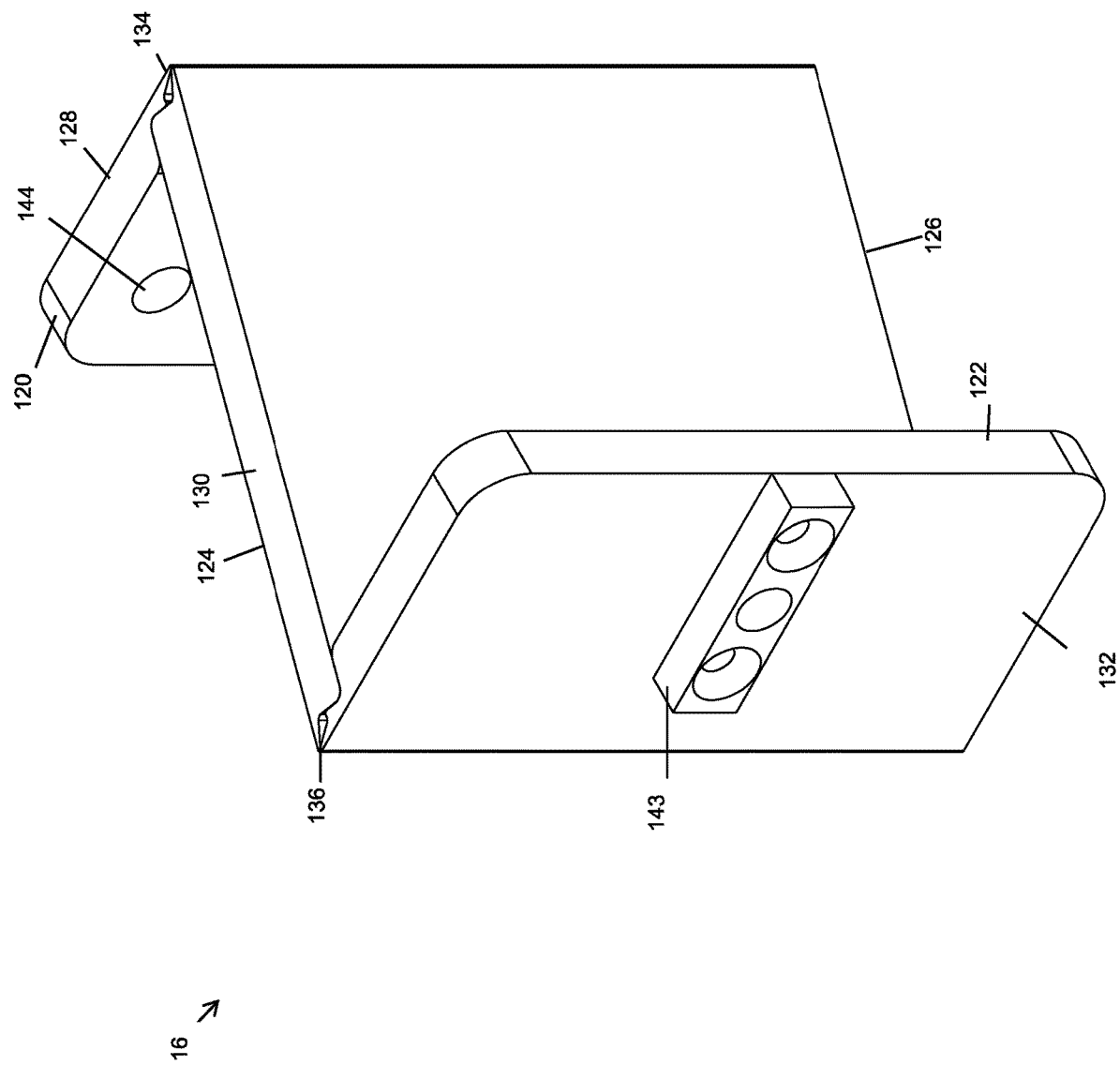
FIG. 64 is a perspective view of the hinge member of FIG. 55.
Figure 65:
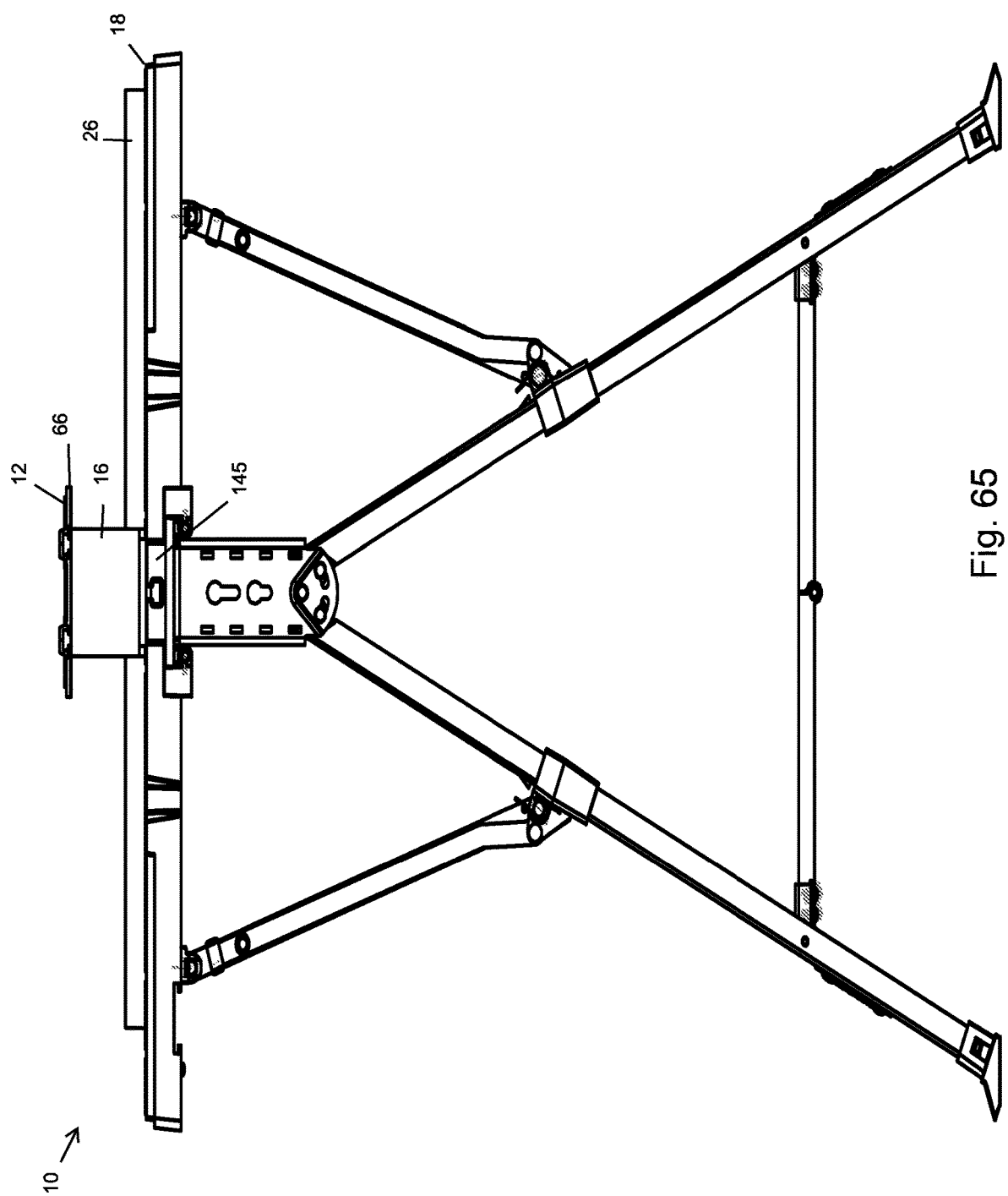
FIG. 65 is an elevation view of an end of the system, the view showing a track connected to a benchtop by a hinge member; the view showing the hinge member in a fully raised position.
Figure 66:
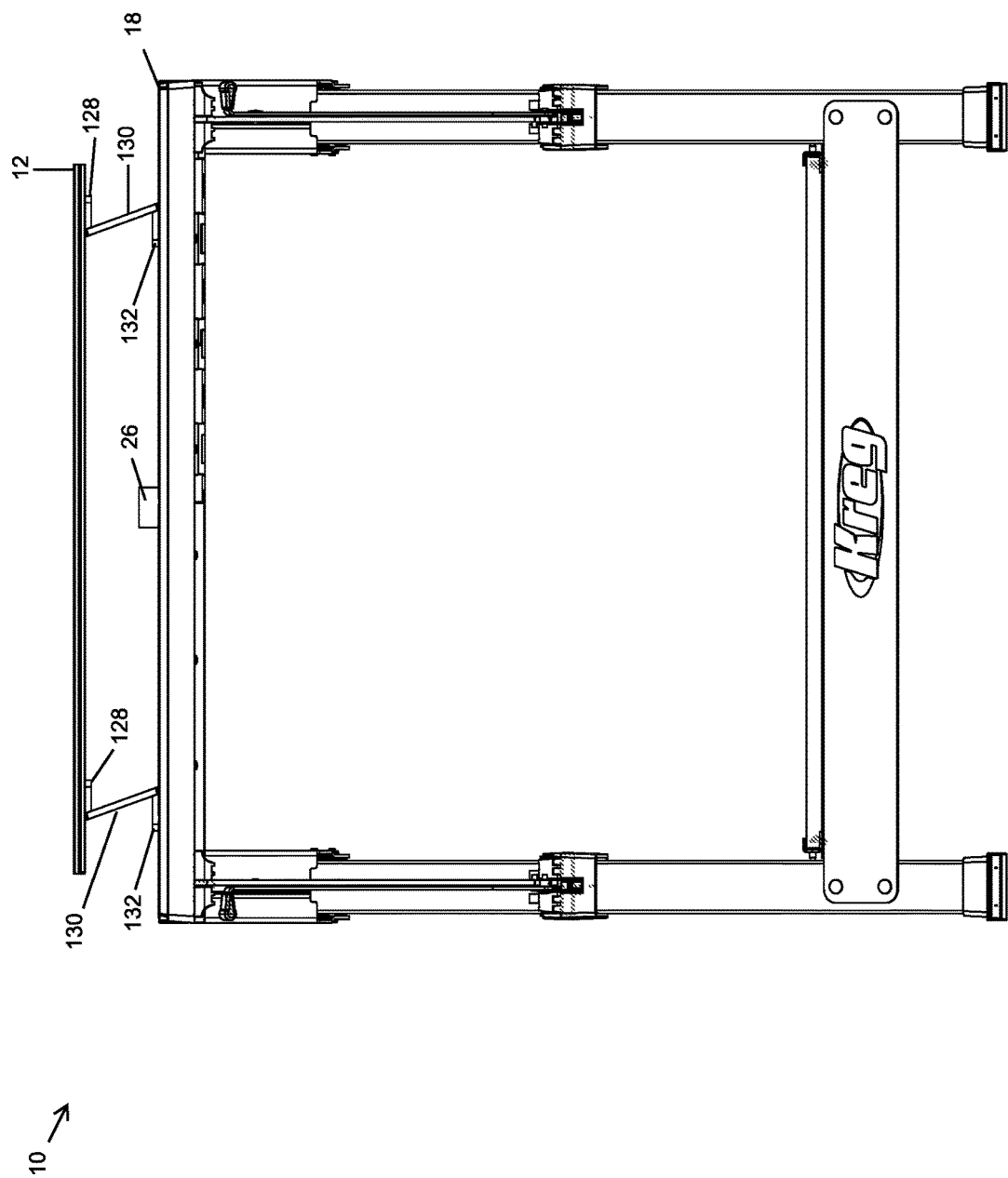
FIG. 66 is an elevation view of a side of the system, the view showing a track connected to a benchtop by a hinge member; the view showing the hinge member in a fully raised position.
Figure 67:
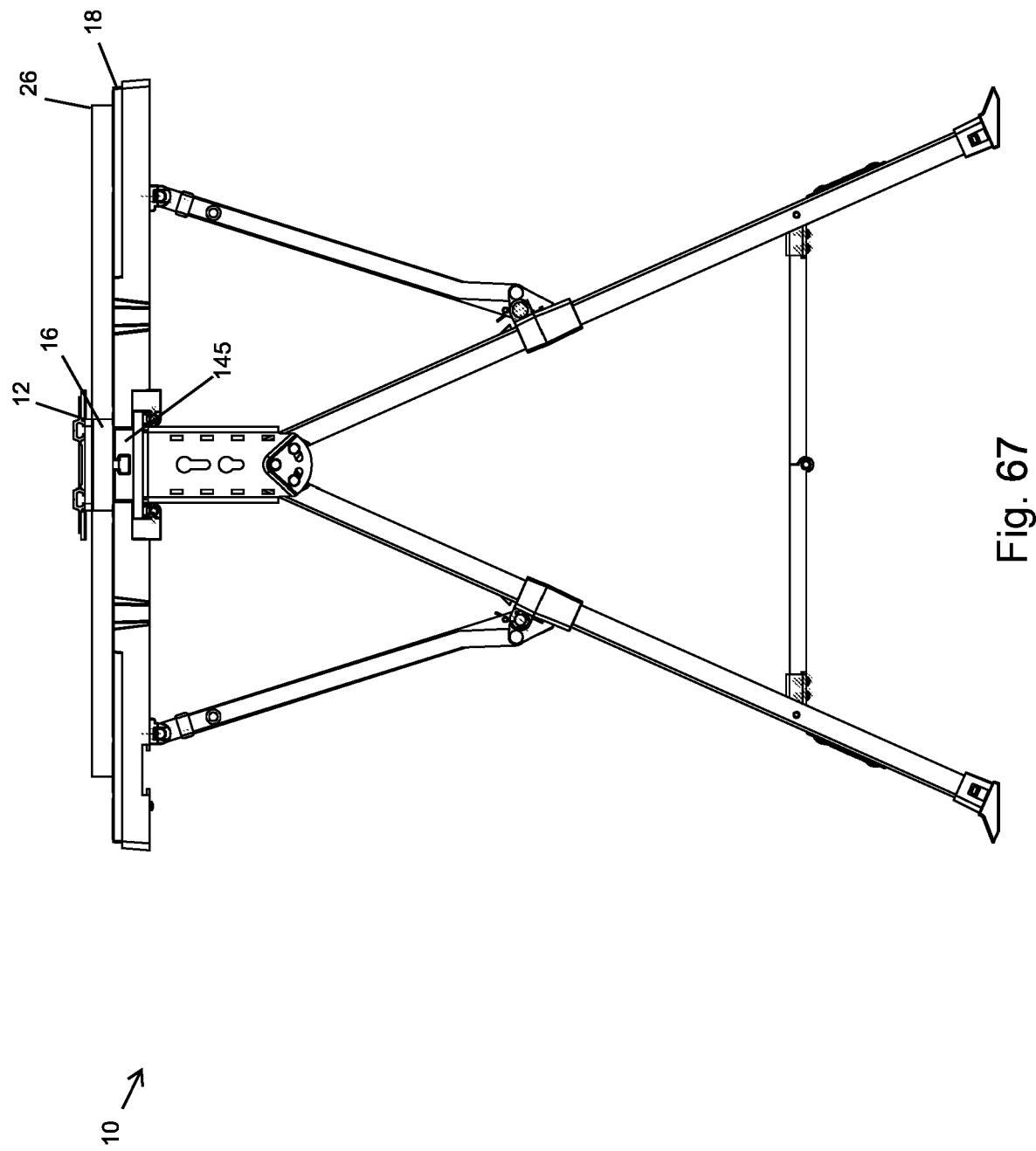
FIG. 67 is an elevation view of an end of the system, the view showing a track connected to a benchtop by a hinge member; the view showing the hinge member in a lowered position.
Figure 68:
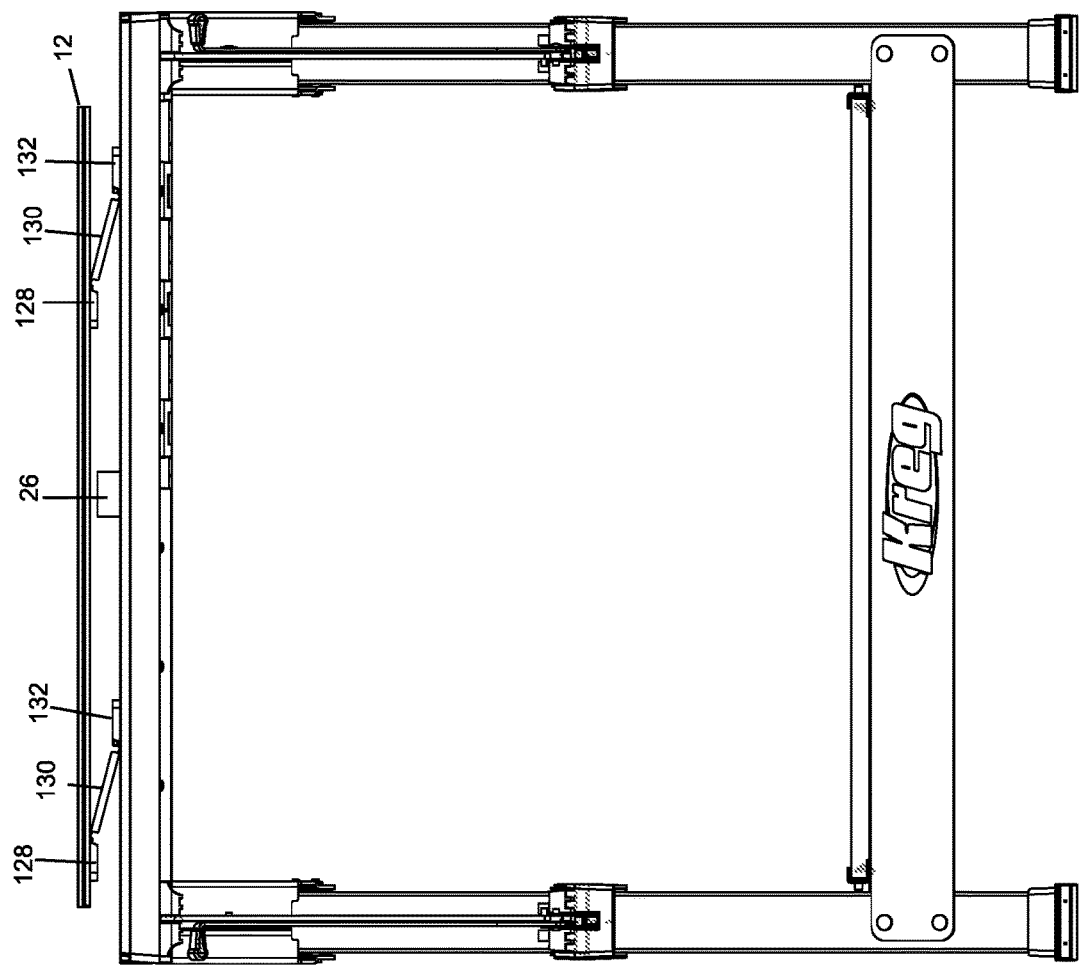
FIG. 68 is an elevation view of a side of the system, the view showing a track connected to a benchtop by hinge members positioned adjacent the ends of the track; the view showing the hinge member in a lowered position.
Figure 69:
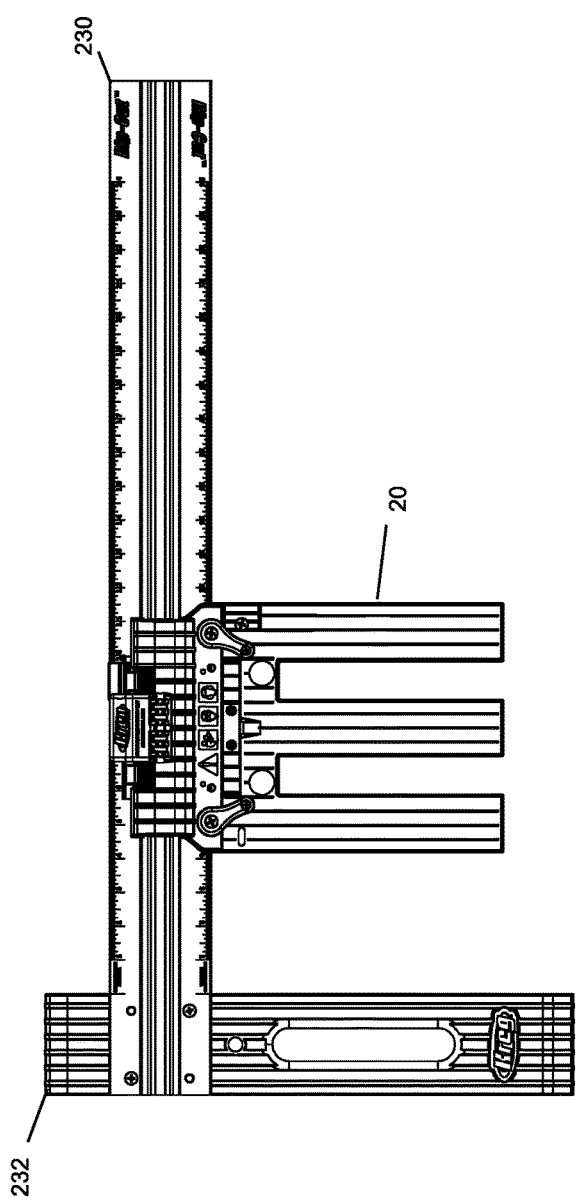
FIG. 69 is an elevation view showing the top side of a sled connected to a guide rail which includes a guide arm for use as a rip-cutting arrangement.
Figure 70:
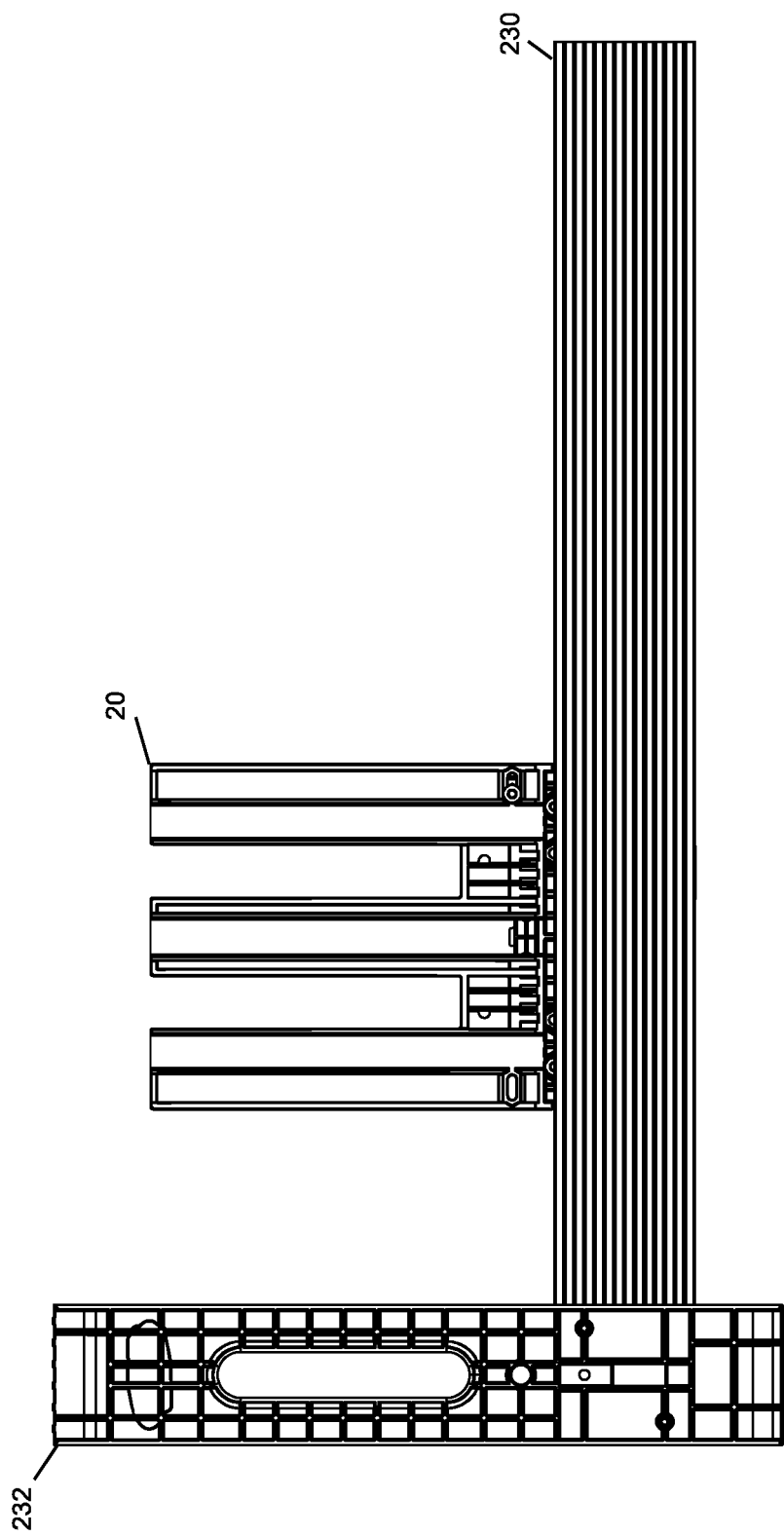
FIG. 70 is an elevation view showing the bottom side of a sled connected to a guide rail which includes a guide arm for use as a rip-cutting arrangement.
Figure 71:
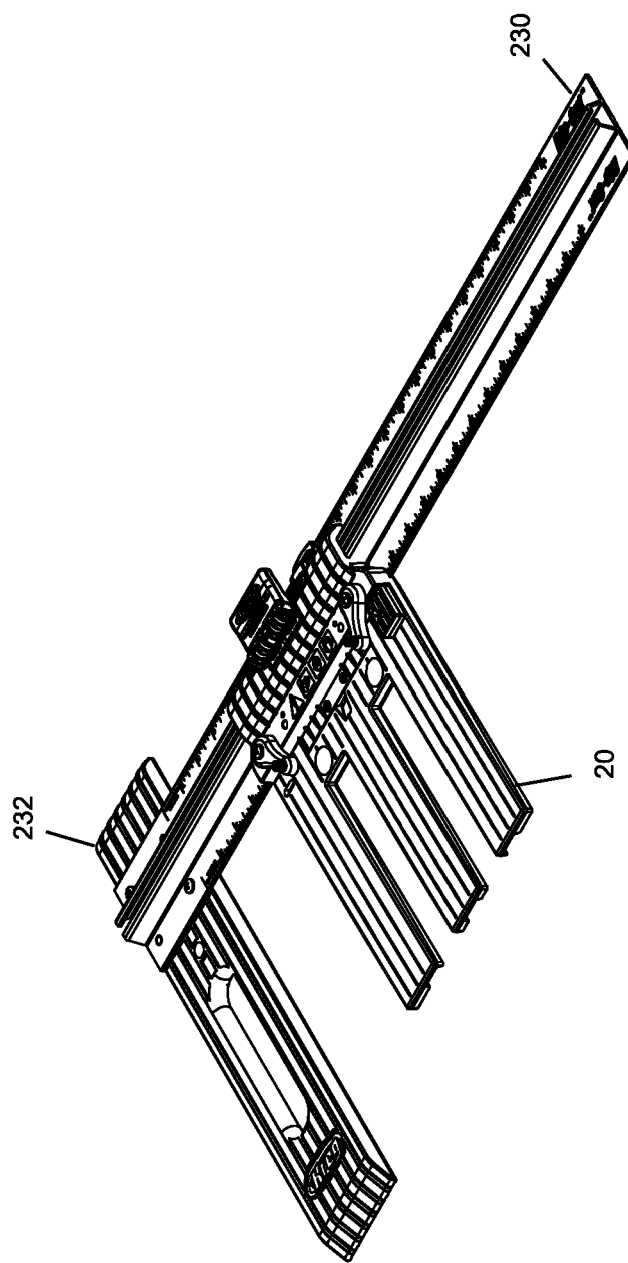
FIG. 71 is perspective view of a sled connected to a guide rail which includes a guide arm for use as a rip-cutting arrangement.
Figure 72:
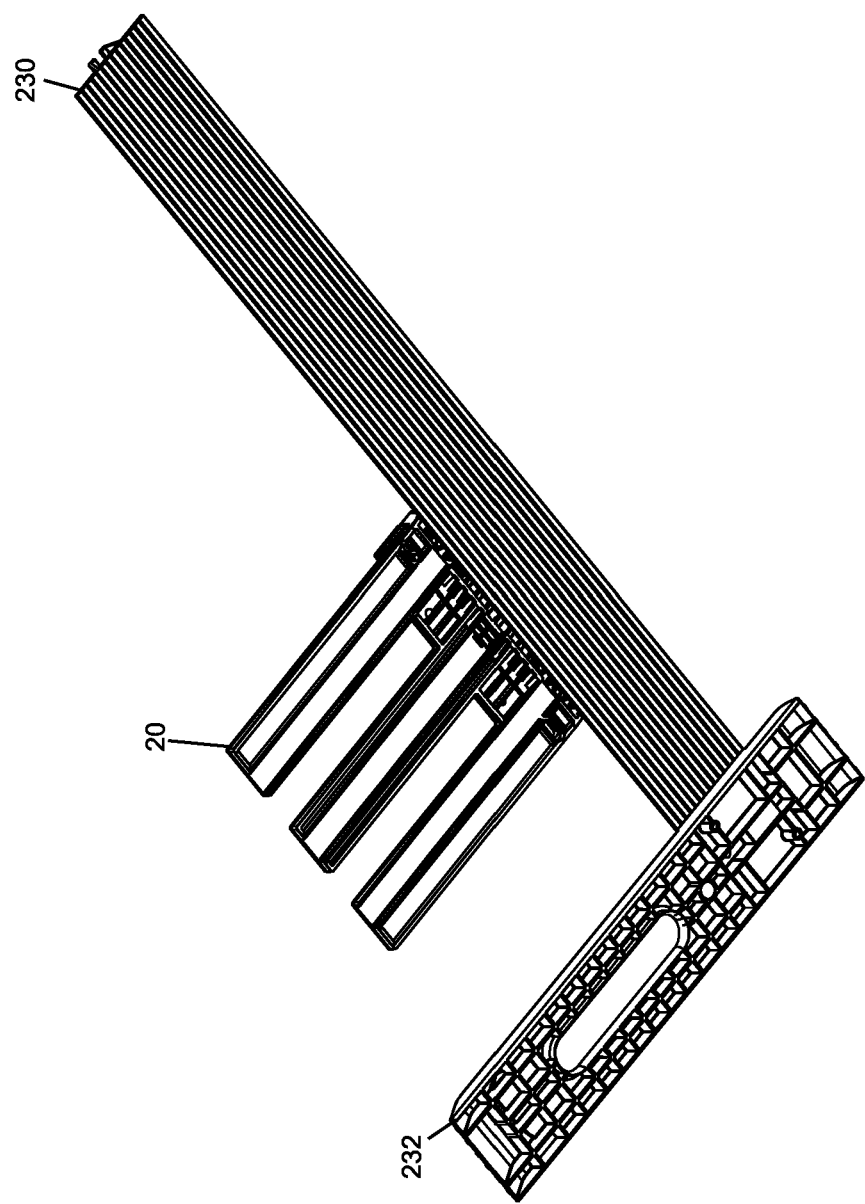
FIG. 72 is perspective view showing the bottom side of a sled connected to a guide rail which includes a guide arm for use as a rip-cutting arrangement.
Figure 73:
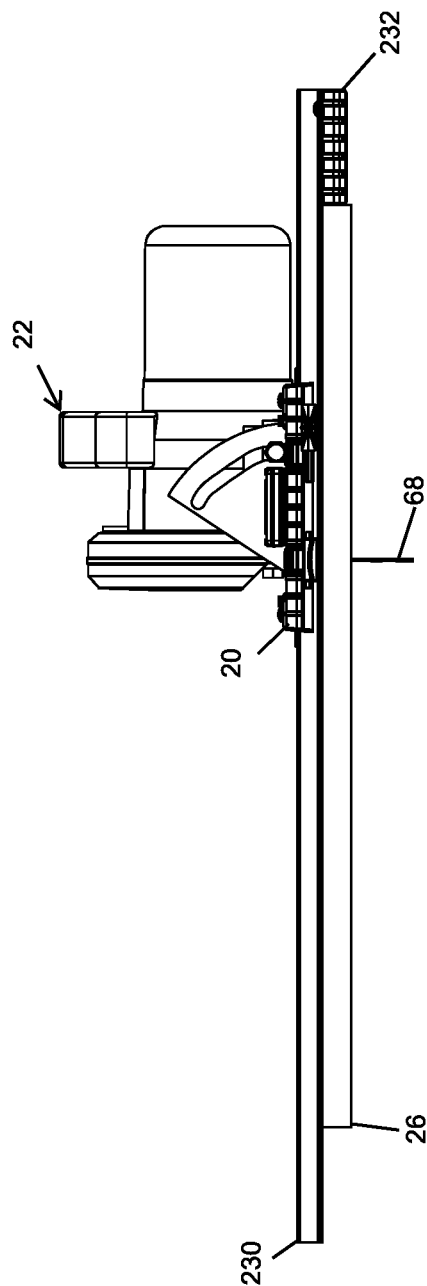
FIG. 73, is an elevation view showing the front side of a sled connected to a guide rail which includes a guide arm for use as a rip-cutting arrangement; the view showing a cutting device, which in this case is a circular saw, connected to the sled; the view also showing the system on a workpiece with the guide rail positioned on the top surface of the workpiece and the guide arm positioned along the side of the workpiece giving the guide rail, sled and cutting device alignment and guidance during operation.
Figure 74:
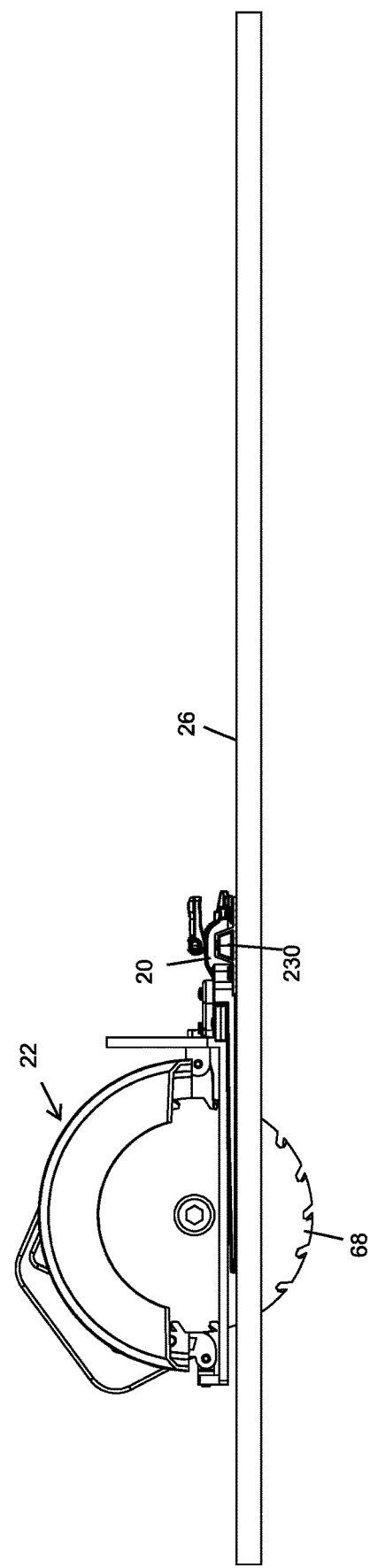
FIG. 74, is a side elevation view showing the system shown in FIG. 73.
Figure 75:
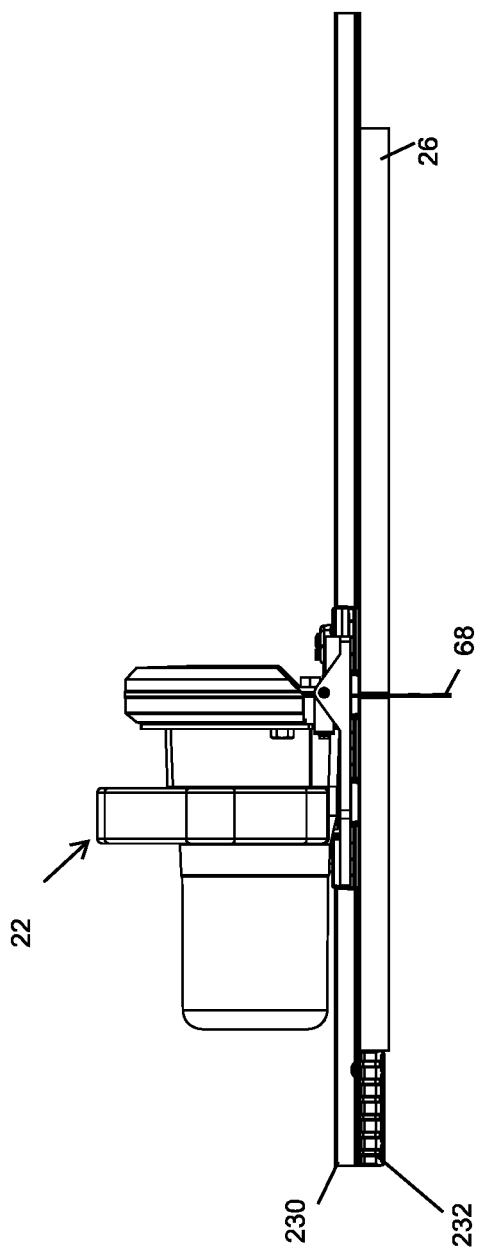
FIG. 75, is a front elevation view showing the system shown in FIG. 73.
Figure 76:
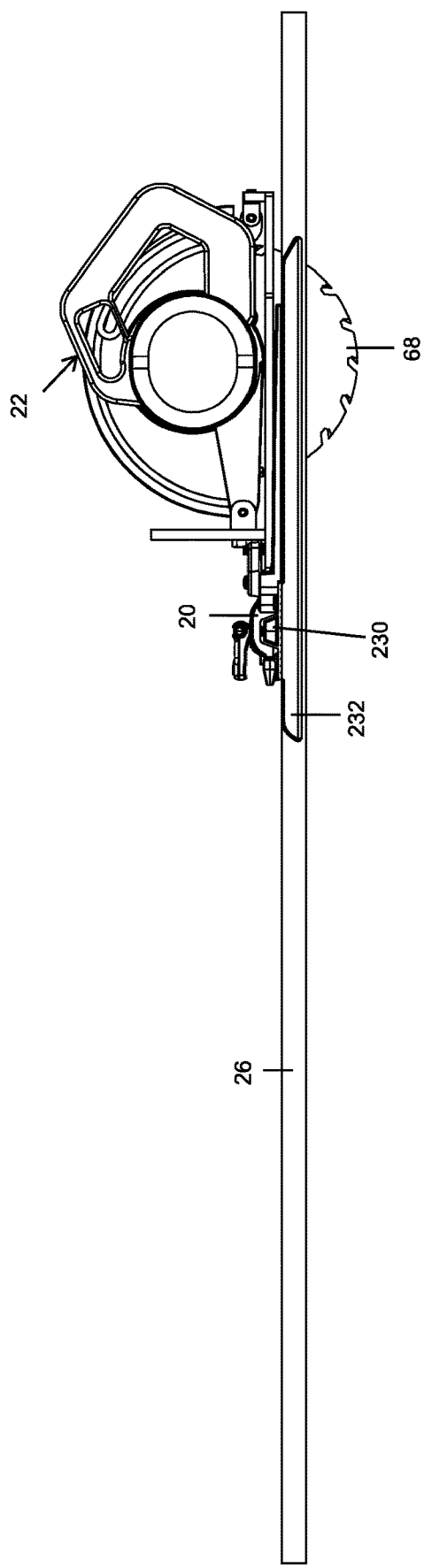
FIG. 76, is a side elevation view showing the system shown in FIG. 73; the view showing the opposite side as FIG. 74.
Figure 77:
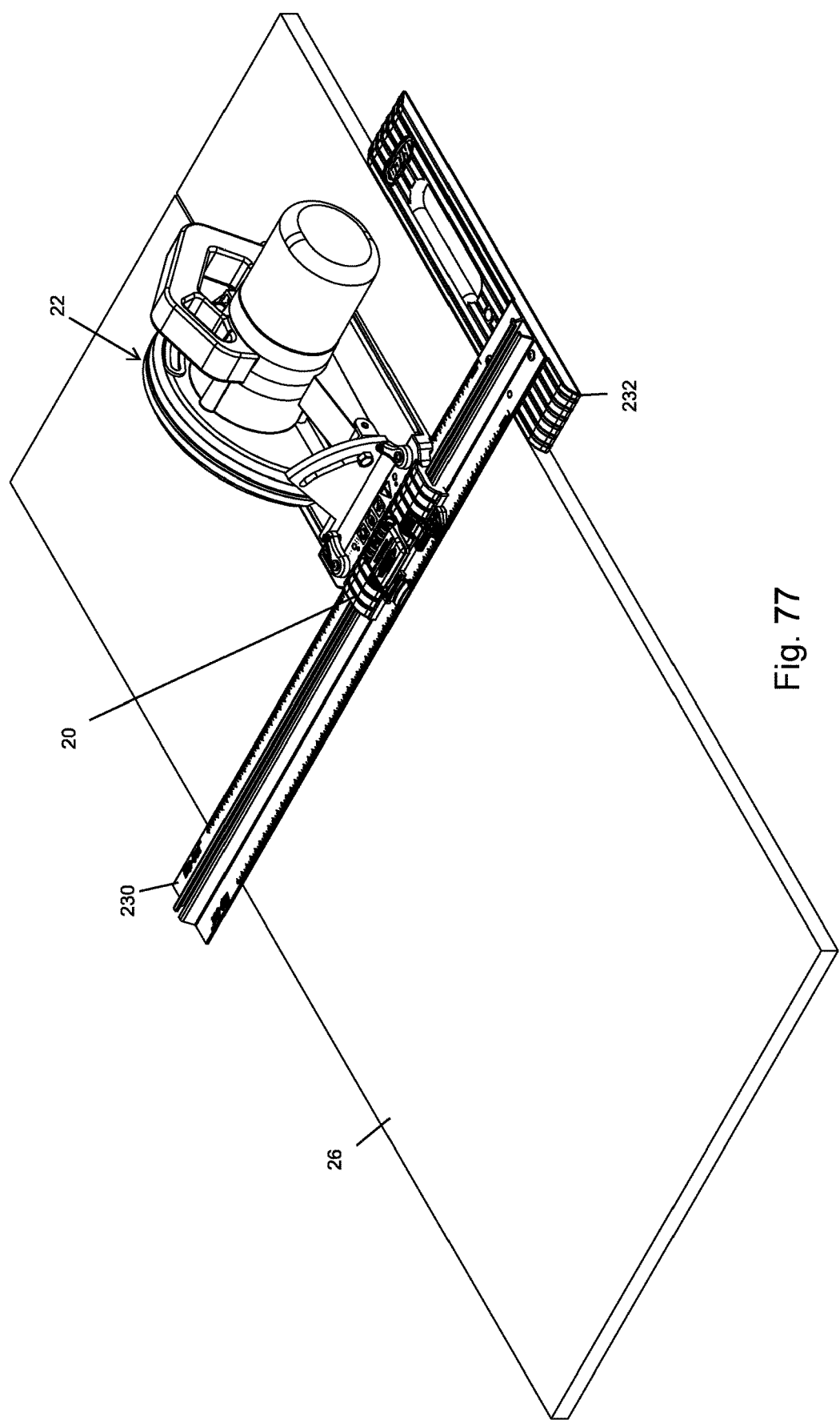
FIG. 77, is a top perspective view showing the system shown in FIG. 73.
Figure 78:
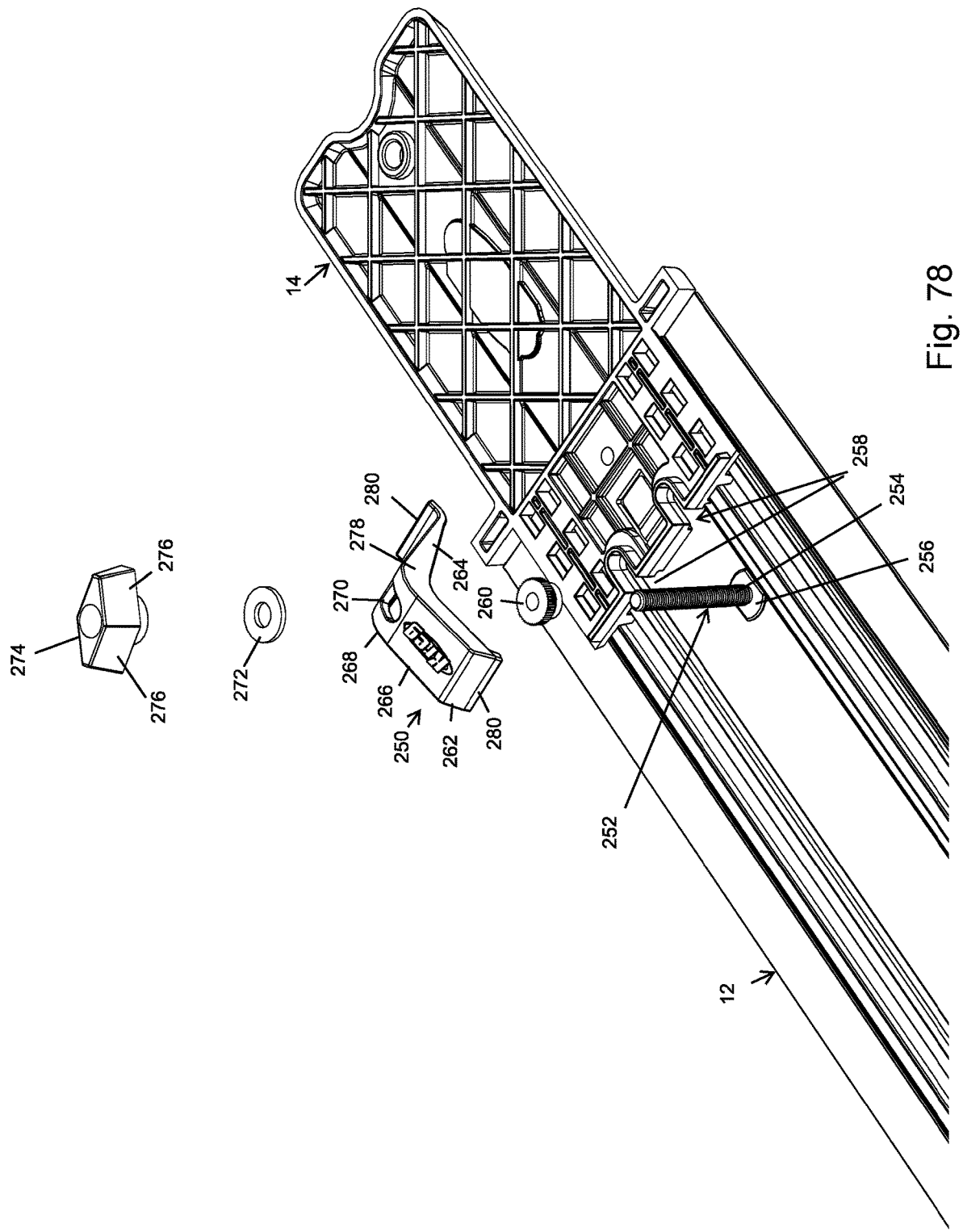
FIG. 78 is a perspective exploded view of the bottom side of a track and ramp that is about to receive a clamp having a clamp arm with a rearward section, a forward section and a corner section and a fastener; the view showing the head of the fastener about to slide into a slot in the forward end of the ramp.
Figure 79:
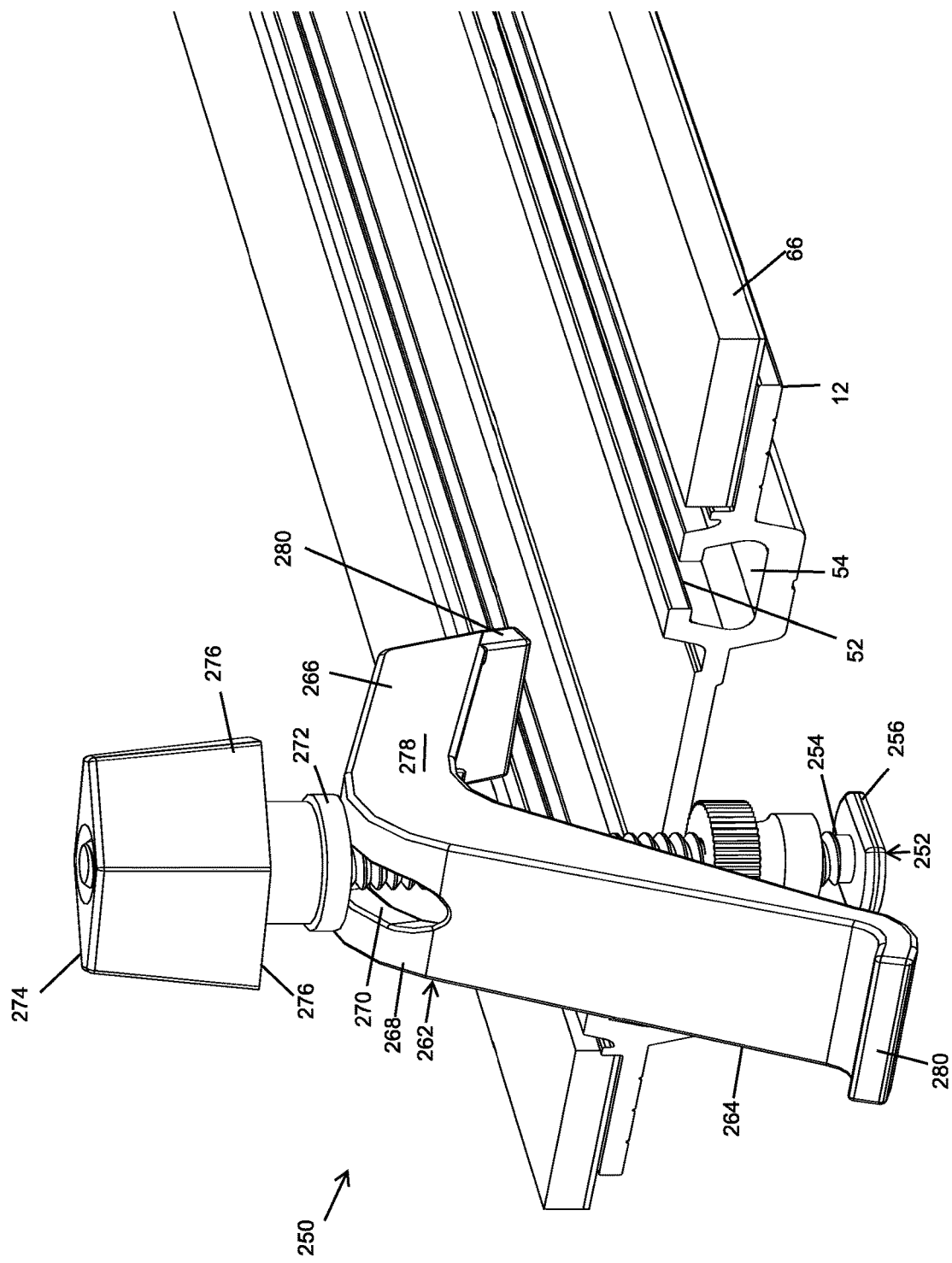
FIG. 79 is a perspective view of the bottom side of a track that is about to receive a clamp having a clamp arm with a rearward section, a forward section and a corner section and a fastener; the view showing the head of the fastener about to slide into a slot in the track.

To facilitate removal of the filler strip 195 when filler strip 195 is frictionally held within recess 196 an access slot 198 is positioned adjacent the center rearward edge of recess 196. Access slot 198 provides access for a pry mechanism, such as a screwdriver, knife or the like to be inserted within access slot 198 and under filler strip 195 which allows the filler strip 195 to be pried out of recess 196. In the arrangement shown, as one example, access slot 198 angles downward as it angles forward toward recess 196 and filler strip 195 and terminates just below the lower surface of filler strip 195 when it is in position within recess 196. In one arrangement, as is shown in FIG. 18, the lower end of access slot 198 connects to an opening below the filler strip 195 when it is in position within recess 196 so that the pry tool can engage the lower surface of the filler strip 195. Said another way, the as the access slot 198 extends downward as it extends forward it intersects with the lower surface 152 of sled 20. As such, an opening exists below filler strip 195 that connects to access slot 198, this opening exists between opposing posts that are received within openings 197.

In the arrangement shown, one of the upper and lower surfaces of filler strip 195 is generally flat and planar when viewed from the side, whereas the opposite surface includes a plurality of ribs 199. In the arrangement shown, four ribs 199 are positioned on either side of openings 197, however any number of ribs 199 are hereby contemplated for use such as none or one, two, three, four, five, six, seven, eight, nine, ten, eleven, twelve, thirteen, fourteen, fifteen, sixteen, seventeen, eighteen, nineteen, twenty or more. In the arrangement where no ribs 199 or only one rib 199 is used, the filler strip 195 takes on the generally shape of a wedge, and the wedge shape is more solid than formed by a plurality of ribs 199.

In the arrangement shown, ribs 199 extend in generally parallel spaced alignment with one another and in generally parallel spaced alignment with the forward to back length of sled when filler strip 195 is positioned within recess 196. In one arrangement, as is shown, ribs 199 extend upward from the upper surface of filler strip 195 and ribs 199 extend upward at an angle from the rearward edge of filler strip 195 to the forward side of filler strip 195. In the arrangement shown, the outward most rib 199 is positioned adjacent the outward most edge of filler strip 195 and the inward most rib 199 is positioned just before opening 197, and a pair of ribs 199 are positioned between this outward most rib 199 and this inward most rib 199 on each side of filler strip 195.

Filler strip 195 is configured to be reversible such that in one arrangement ribs 199 extend upward and in the opposite arrangement the ribs 199 extend downward.

That is, when sled 20 is used with a cutting device 22 having a baseplate 174 with a leading edge that angles upward, filler strip 195 is positioned within recess 196 such that the ribs 199 extend upward. In this arrangement, when cutting device 22 having a baseplate 174 with a leading edge that angles upward the upper edges of the angled ribs 199 engage the angled leading edge of base plate 174 and provide support to the leading edge of baseplate 174 as the fasteners 172 are tightened against the baseplate 174. In this way, the angled plane established by the plurality of ribs 199 supports the angled leading edge of baseplate 174 thereby preventing tilting of baseplate 174 when fasteners 172 are tightened. This enables the planar bottom surface of base plate 174 to be in flat and flush alignment with the planar upper surface 150 of sled 20.

That is, when sled 20 is used with a cutting device 22 having a baseplate 174 without a leading edge that angles upward, filler strip 195 is positioned within recess 196 such that the ribs 199 extend downward. To facilitate the ribs 199 pointing downward, recess 196 includes a plurality of grooves 210 that are sized and shaped to receive ribs 199 therein. In this arrangement, when filler strip 195 is placed within recess 196 the ribs 199 are received within grooves 210 and the upper surface of filler strip 195 is in approximate parallel spaced alignment with the plane established by the upper surface 150 of sled 20. In this arrangement, when cutting device 22 having a baseplate 174 with a leading edge that does not angle upward, the flat and planar surface of filler strip 195 and upper surface 150 of sled 20 allows the flat planar surface of base plate 174 to lie in flat and planar engagement upper surface 150 of sled 20 without interference by the ribs 199 of filler strip 195. In this way, the flat plane established by the upper surface of filler strip 195 provides support for the leading edge of baseplate 174 when fasteners 172 are tightened. This enables the planar bottom surface of base plate 174 to be in flat and flush alignment with the planar upper surface 150 of sled 20.

Cutting Device:

Guided circular saw system 10 includes a cutting device 22. Cutting device 22 is formed of any suitable size, shape and design and is configured to cut workpiece 26 as cutting device 22 slides along track 12. In the arrangement shown, as one example, cutting device 22 is formed of a hand held circular saw having a rotating blade 68 which is covered by a blade guard 86 and includes a generally flat, planar and rectangular or square baseplate 174. However any other form of a cutting device is hereby contemplated for use such as a router motor, a jig saw, a sanding device, or the like or any other cutting device.

Indicator Clip and/or Cursor:

Guided circular saw system 10 includes an indicator clip and/or cursor 24. Indicator clip and/or cursor 24 is formed of any suitable size, shape and design and is configured to help facilitate alignment of the cutting device 22, particularly during a rip-cut operation. In the arrangement shown, as one example, indicator clip and/or cursor 24 includes a main body 200 that includes an indicator 202. Indicator clip and/or cursor 24 also includes an extension 204 that extends laterally from main body 202 and includes a slot 206 therein as well as a serrated surface 208. Slot 206 is configured to receive guide rail 176 in the forward end 154 of sled 20 and the serrated surface 208 is configured to help position and maintain the position of indicator clip and/or cursor 24 on sled 20 as the bias member 177 presses against the serrated surface 208 thereby holding it in place.

Work Piece:

Guided circular saw system 10 includes a workpiece 26. Workpiece 26 is formed of any suitable size, shape and design and is formed of any material. In the arrangement shown, as one example, workpiece 26 is an elongated piece of wood, such as a 1×1, 1×2, 1×4, 1×5, 1×6, 2×2, 2×4, 2×6, 2×8 2×10, 2×12 or any other shaped or sized material. In another arrangement, workpiece 26 is a 4×8 sheet of plywood or other sized sheet of plywood. In another arrangement, workpiece 26 is a sheet of any other form of sheet material. However any other piece of material is hereby contemplated for use such as a sheet of wood. In addition, any other type of material other than wood is hereby contemplated for use.

In Operation:

The system 10 is assembled by attaching ramp 14 to an end 32 of track 12. This is accomplished by aligning the connecting members 96 of the connecting section 94 of ramp 14 with the hollow interior 54 and slot 52 of features 38 of track 12. Once aligned in this manner, ramp 14 is installed on the end 32 of track 12 until the step 102 engages the end 32 of track 12 at which point ramp 14 is fully installed on track 12 and the bias member 104 applies a force upon the track 12 thereby helping to hold ramp 14 onto track 12.

Hinge members 16 are installed in the lower surface 30 of track 12 by inserting the heads of fasteners 146 into the hollow interiors 54 of features 38 such that they are slidably retained within features 38 and the shafts of fasteners 146 extend through the slots 52 of features 38. Alternatively, instead of placing the head of fasteners 146 in the hollow interior 54 of track 12, a connecting member, such as a nut or other device is placed within the hollow interior 54 and the shaft of fasteners 146 extend through the slot 52. The fasteners 146 are moved to a desired position along track 12, which may be adjacent or near each end 32 of track 12 and the holes 144 in the top section 128 if hinge members 16 are aligned with the fasteners 146 and tightened in place thereby connecting the top section 128 of hinge member 16 in a generally flat and flush arrangement with the lower surface 30 of track 12.

Hinge members 16 are installed onto the benchtop 18 by aligning the holes 144 in the bottom section 132 of hinge members 16 with the desired holes 142 in benchtop 18. Once aligned, fasteners 146 are inserted through the holes 144 in bottom section 132 and holes 142 in benchtop 18 and tightened in place thereby connecting the bottom section 132 of hinge member 16 in a generally flat and flush arrangement with benchtop 18. Alternatively, when holes 142 in benchtop 18 are not used, the bottom section 132 is connected to benchtop 18 by any other manner method or means, such as screwing, bolting or the like. Care is taken when installing and tightening the hinge members 16 to either or both the track 12 and/or benchtop 18 that hinge members 16 are properly spaced along track 12 so as to ensure that the track 12 raises and lowers in a smooth, flat and non-binding manner.

With hinge members 16 connected to both track 12 and benchtop 18, track 12 quickly and easily moves between a lowered position and a raised position without any tools or complicated or time consuming operations. Instead, the track 12 is simply raised or lowered by hand. In a lowered position, hinge members 16 lie in a practically flat and planar position between the lower surface 30 of track 12 and the upper surface of benchtop 18. In a raised position, the plane of middle section 130 of hinge members 16 lies in an approximate perpendicular alignment to the plane of the top section 128 and bottom section 132. Track 12 can also be moved to an over-center condition wherein the track 12 is moved slightly beyond the fully-raised position, and the top section 128, middle section 130 and bottom section 132 take on a Z-shape that maintains the track 12 in a raised position. As the track 12 is raised and lowered the track 12 actually moves in a slightly arcuate manner due to the configuration of the hinge members 16 while the hinge members 16 prevent other movement of track 12.

Once in a raised position, one or more workpieces 26 are placed under the lower surface 30 of track 12 and the track 12 is lowered. As the track 12 is lowered, the lower surface 72 of the lower layer 80 of grip strips 66 engage the upper surface of the workpieces 26. Due to the compressible nature and high-friction nature of the lower layer 80 of grip strips 66 and the high coefficient of friction of the lower layer 80 of grip strips 66, the engagement between the lower layer 80 of grip strips 66 and workpiece 26 tends to firmly hold workpiece 26 in place. To overcome this engagement and high coefficient of friction between the lower layer 80 of grip strips 66 and workpiece 26, workpiece 26 can be easily moved by simply raising track 12 by articulation upon hinge members 16 and moving the workpiece 26 once the track 12 is raised.

One benefit of the grip strips 66 providing an increased level of friction is that the grip provided by grip strips 66 occurs at the exact point of where the workpiece 26 is cut. This means that pressure and friction is applied at the point where it is most important that the workpiece 26 not move during a cutting operation. In addition, because grip strips 66 are positioned at the outward sides 34 of track 12, this means that the grip strips 66 are placed as far away from one another as is possible. This positioning of grip strips 66 provides the widest possible base for gripping which can help prevent rotation of the workpiece 26 during a cutting operation. To provide additional gripping and/or additional support, a third, grip strip 66 can be placed under the center section 36 of track 12. This third and centrally positioned grip strip can be useful when cutting shorter workpieces 26 which may not span both opposing grip strips 66 placed under tabs 46. Any number of additional grip strips 66 may be placed under track 12 such as four, five, six, seven, eight, nine, ten or more, or alternatively the entire lower surface of track 12 may be covered by one or more grip strips 66.

The sled 20 is prepared to receive the cutting device 22 by removing or loosening the side stop 190 so as to allow the baseplate 174 to be placed at its optimum position on upper surface 150. In addition, the user selects which side of the filler strip 195 should face upward. When the baseplate 174 has a flat leading edge, the flat surface of the filler strip 195 should face upward. When the baseplate 174 has an angled leading edge, the ribs 199 of the filler strip 195 should face upward. The appropriate side of the filler strip 195 is selected by prying the filler strip 195 out of recess 196 and then reinserting the filler strip 195 within recess 196 until it is frictionally held in place.

Cutting device 22 is then installed on sled 20 by inserting the blade 68 and blade guard 86 within a slot 180 of sled 20 and positioning the baseplate 174 in flat and flush and square alignment with the upper surface 150 of main body section 162 of sled 20. Care is taken to ensure that the forward leading edge of baseplate 174 is placed in flat and flush engagement with the step 178 so as to ensure that the cutting device 22, and more specifically blade 68 is aligned with the length of sled 22, and eventually with the length of track 12. For cutting devices with the blade 68 on the left-hand side, the left slot 180 is selected, and for cutting devices 22 with the blade 68 on the right-hand side, the right slot 180 is selected. Next, arms 168 are rotated over the forward end of baseplate 174 and the fasteners 172 are tightened against the upper surface of baseplate 174 thereby locking baseplate 174 in place on sled 20. To accommodate baseplates 174 of varying widths and sizes and configurations a plurality of openings 171 are positioned in the sled 20 that are configured to receive fastener 170. For the most secure clamping of baseplate 174, the widest set of openings 171 should be selected which will provide the broadest and most secure mount. The arms 168 can be tightened at any angle and both fasteners 170 and/or 172 can be tightened. Next, the side block 190 is slid along the slot 192 until its inward edge is in flat and flush alignment with the outward edge of baseplate 174. Once in this position, side block 190 is tightened so as to ensure the easy replacement of baseplate 174 and blade 68 in the same position if cutting device 22 is removed from sled 20. When selecting the position of the blade 68 relative to the sled 20 and track 12, care is taken to ensure that the blade 68 is past the outward edge of the tab 46 but not so far that it does not appreciably intersect with the grip strip 66.

With the cutting device 22 installed on sled 20, the sled 20 is placed on ramp 14. The recesses 184 in the lower surface 152 of sled 20 are aligned with and placed over the features 108 of ramp 14. As ramp 14 includes features 180 (that align with features 38 in track 12) but does not include tabs 46, when sled 20 is placed on ramp 14 the blade 68 and blade guard 86 are allowed to hang down from the side of the ramp 14. In this way, ramp 14 provides a resting place or starting point for sled 20 and cutting device 22.

On a first pass the user cuts the grip strip 66 to match the position of the blade 68 in a zero-clearance or zero-offset position or arrangement. It is suggested that on a first pass, the track 12 is placed on a scrap workpiece 26 that extends the length of track 12. The cutting device 22 is placed on the ramp 14 and the blade 68 is adjusted such that the blade 68 will protrude an eighth of an inch through the workpiece 26 during the cut. With the blade 68 clear of the workpiece 26 the cutting device 22 is activated and the blade 68 begins to rotate.

As the user starts the cutting operation, the user slides the sled 20 and cutting device 22 forward on the ramp 14 the blade guard 86 engages the outward end of arm 114 of ramp 14. When the blade guard 86 engages the arms 114 of ramp 14 this causes the blade guard 86 to retract as the sled 20 is moved forward thereby exposing blade 68 before the blade 68 engages the workpiece 26. This provides the benefit of overcoming the bias, resistance and interference of the blade guard 86 before the blade 68 starts to cut the workpiece 26 which increases the accuracy of the cut and ease of making the cut.

The natural forces and weight of the sled 20, cutting device 22 and track 12 apply force downward on workpiece 26 during the cutting operation. These downward forces, coupled with the sticky-nature or high coefficient of friction of the lower layer 80 of grip strip 66 (which is the only or primary surface area that engages workpiece 26) helps to hold the workpiece 26 in place. The more weight applied the greater this frictional force is between workpiece 26 and grip strip 66 thereby helping to hold the workpiece 26 in place during cutting. In addition, the greatest amount of grip is positioned directly under the positon of the sled 22 where, coincidentally, the cutting operation is occurring, which is precisely where it is most critical that the workpiece 26 does not move.

This process is repeated for other cuts, with the difference being that once the grip strip 66 is cut and matched to the position of the blade 68, the grip strip 66 is not cut to size on later cuts. Once the blade 68 is matched to grip strip 66 the outward edge of cut grip strip 68 can serve as the cut line or the guide line for workpieces 26 on subsequent cutting operations in a zero-clearance or zero-offset manner.

When using track 12 without hinge members 16, the track 12 is placed on the top surface of workpiece 26 and the track 12 is slid forward on workpiece 26 until the forward surface of stop 117 engages the edge of workpiece 12. Engagement of stop 117 with the edge of workpiece 26 ensures that the track 12 will not and cannot slide forward on workpiece 26 during a cutting operation. To provide additional assurance that the tack 12 does not move on workpiece 26, a clamp 250 or clamps 250 may be used which clamps track 12 to workpiece 26.

Grip Strip Replacement:

In the arrangement described here, grip strip(s) 66 is intended to be partially consumed. That is, the blade 68 of cutting device 22 is positioned relative to sled 20, track 12 and grip strip 66 such that the grip strip 66 is partially cut so that the grip strip 66 perfectly matches the position of the blade 68. This makes cutting workpiece 26 very intuitive as all a user has to do is place the edge of the grip strip 66 on the workpiece 26 at the position where they want to cut. This takes the guess work out of cutting and is a great improvement over many cutting operations such as simply using a circular saw in a free-hand manner, or using a table saw.

Over time the intersection of the grip strip 66 and the blade 68 may get worn or lose. When this occurs, so long as there is enough material left in grip strip 66 the blade 68 can be repositioned and the grip strip 66 can be recut thereby providing a new and fresh and tight intersection between blade 68 and the outward edge of grip strip 66.

However, when the grip strip 66 cannot be recut, the grip strip 66 can be easily replaced by simply peeling or prying the grip strip 66 off of track 12 and then adhesively reapplying a new replacement grip strip 66. In one arrangement, replacement grip strips 66 can be purchased by the manufacture. These replacement grip strips 66 come with a layer of factory applied adhesive. To install the replacement grip strip 66 a protective layer is removed from the adhesive, the inward edge of the grip strip 66 is aligned with the outward stop 64 and the grip strip is adhered to the lower surface of tab 46. Once installed, the fitting/cutting process is repeated to match the blade 68 to the new grip strip 66.

Clamps:

Clamps 250 are formed of any suitable size, shape and design and are configured to clamp track 12 to workpiece 26. In one arrangement, as is shown, as one example, clamp 250 takes the form of a track clamp. Track clamps include a fastener 252 having a shaft 254 and a head 256. Head 256 is configured to fit within, slide along and be held by a slot 258 in the forward end 88 of ramp 14. Slot 258 is stepped, meaning that it has a wider upper portion that is configured to receive head 256 while having a narrower lower portion that is configured to allow shaft 254 to extend there through. When fastener 252 is in place within slot 258, fastener 252 does not interfere with the flat surface of stop 117. However, fastener 252 can also be used in other arrangements to connect to the hollow interior 54 and slot 52 of track directly, in a similar manner as is described herein and provides similar functionality.

In one arrangement, as is shown, head 256 has a corresponding size and shape to the shape of the upper portion of slot 258. In this way, the engagement of head 256 with slot 258 ensures that fastener 252 does not rotate when head 256 is in place with in slot 258. In one arrangement, as is shown, head 256 is generally planar in shape when viewed from the side, and has rounded forward and rearward ends with straight sides when viewed from above or below, which corresponds to the shape of slot 258.

In the arrangement shown, as one example, a nut 260 is placed over shaft 254. Nut 260 is formed of any suitable size, shape and design. Nut 260 is configured to be rotated against the lower surface of ramp 14 or track 12 thereby locking fastener 252 in place on track 12 or ramp 14.

In the arrangement shown, as one example, clamp 250 includes an arm 262. Arm 262 is formed of any suitable size, shape and design and is configured to provide a force upon workpiece 26 thereby holding workpiece to track 12 and/or ramp 14. In the arrangement shown, as one example, arm 262, when viewed from the side has a rearward extension 264 that connects to a forward extension 266 that connect to one another at a corner section 268, however any other shape is hereby contemplated for use. In one arrangement, the exterior surface of corner section 268 is generally rounded and smoothly transitions to the generally planar exterior surface of rearward extension 264 to the generally planar exterior surface of forward extension 266. This smooth or rounded transition allows for angular adjustment of the arm 262 during clamping.

In one arrangement, corner section 268 includes a slot shaped opening 270 therein. The opening 270 is generally centrally positioned on corner section 268 and the length of the slot shaped opening 270 aligns with the forward and rearward length of forward extension 266 and rearward extension 264. Opening 270 is configured to receive shaft 254 of fastener 252 therein.

In one arrangement, as is shown, as one example, once arm 262 is placed over fastener 252 by inserting shaft 254 through opening 270, a washer 272 is placed over shaft followed by a knob 272. Washer 272 increases the surface area of engagement between arm 262 and knob 274 and helps to facilitate smooth operation and angular adjustment. Knob 274 is any device that facilitates tightening of arm 262 against workpiece 26 and/or track 12 and/or ramp 14. In the arrangement shown, knob 274 has a generally centrally positioned threaded bore that receives threaded shaft 254, and also includes over-molded wings 276 that extend outward that allow a user to grasp and rotate knob 274 to tighten it against arm 262.

In one arrangement, sidewalls 278 extend in approximate perpendicular alignment with the plane formed by the forward section 266 and the plane formed by rearward section 264. Sidewalls 278 extend in approximate parallel spaced relation with one another on opposing sides of forward section 266 and rearward section 264 and in this way the combination of opposing sidewalls 278 and forward section 266 and rearward section 264 form a channel there between. The addition of sidewalls 278 to the outward edges of forward section 266 and rearward section 264 provide additional strength and rigidity to clamp 250 and reduce flexion of forward section 266 and rearward section 264 when knob 274 is tightened.

In one arrangement, as is shown, the outward end of the forward section 266 and rearward section 264 include a foot 280 thereon. Foot 280 is formed of any suitable size, shape and design and helps to facilitate smooth and secure engagement of the forward section 266 and rearward section 264 with the workpiece 26 and/or the ramp 14 or track 12. In one arrangement, as is shown, the foot 280 of on the outward end of rearward section 264, when viewed from the side is an arcuate curved extension that curves in the opposite direction of sidewalls 278. The curvature of foot 280 on the outward end of rearward section 264 helps the clamp 250 to rotate upon the ramp 14 or track 12 as the knob 274 is tightened. That is, the curved surface of foot 280 facilitates smooth angular rotation of the rearward section 264 as the clamp 250 is tightened. This is not unlike the curved surface of corner section 268 and how its curvature facilitates angular adjustment as the knob 274 is tightened.

In one arrangement, the foot 280 of on the outward end of forward section 266 has the same or similar configuration as the foot 280 on the end of rearward section 264, as is described above. In an alternative arrangement, as is shown, when viewed from the side the foot 280 on the end of forward section 266 is a generally straight protrusion that extends in the same direction as sidewalls 278. The foot 280 on the outward end of forward section 266 helps the clamp 250 to engage the workpiece as the knob 274 is tightened without obstruction. In an alternative arrangement, the foot 280 on the outward end of rearward section 264 shares the same configuration as that shown on the end of forward section 266. Any other size, shape or design of foot 280 for either forward section 266 and/or rearward section 264 is hereby contemplated for use.

Once assembled, one or more clamps 250 are installed on ramp 14 by inserting the head 252 of shaft 254 within slot 258 of ramp 14 (in the arrangement shown, there are two slots 258 in the forward end 88 of ramp 14 and therefore two clamps 250 can be used) or within hollow interior 54 of track 12. In this position, nut 260 is tightened against ramp 14 or track 12 thereby holding clamp 250 in place on track 12 or ramp 14. Next, ramp 14 is slid against the workpiece 26 until the stop 117 engages the edge of workpiece 26. In this position, the forward end of forward section 266 of arm 262 is placed under the edge of the workpiece 26. Next, knob 274 is rotated. As knob 274 is tightened, knob 274 pushes washer 272 into arm 262 and arm 262 is pushed into engagement with both ramp 14 or track 12 and workpiece 26. As knob 274 is tightened, care is taken to ensure that the forward section 266 and rearward section 264 of arm 262 align with the length of track 12, or are squared with the length of track 12. As the knob 274 is tightened, the angle of arm 262 adjusts or rotates on the smooth angled curve of corner section 268 as the forward end of forward section 266 engages and tightens against the lower surface of workpiece 26 while the rearward end of rearward section 264 engages and tightens against the lower surface of ramp 14 or track 12. Once knob 274 is tightened, track 12 and/or ramp 14 is held in place and the cutting operation is performed with certainty that the track 12 and/or ramp 14 will not move relative to the workpiece 26.

From the above discussion it will be appreciated that the guided circular saw system and related method of use, presented herein improves upon the state of the art.

Specifically, the guided circular saw system and method of use: is safe to use; is efficient to use; is relatively inexpensive; is capable of making long straight cuts; can be used to cut both large and small pieces easily and accurately; is accurate; is efficient; can be used with practically any circular saw; can be used with workpieces with a wide range of thicknesses; is easy to learn how to use; is relatively small in size and shape; provides the benefits of a circular saw and a table saw in a single device; holds workpieces in a firm and rigid manner; is easy to set up; is easy to take down; is formed of a minimum number of parts; is simple to use; is easier to use than prior art systems; is unique; provides new capabilities to existing tools; can be used with practically any benchtop; is high quality; has a robust design; has a long useful life; provides accurate and clean cuts; helps prevent chip tear-out; is durable; saves time; is fun to use, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed is:

1. A guide system for woodworking operations, comprising:
   a track;
   the track having an upper surface and a lower surface;
   the track extending a length between a first end and a second end;
   the track extending a width between a first side and a second side;
   the track having at least one feature in its upper surface that extends a length of the track from the first end and the second end;
   a ramp;
   the ramp having an upper surface and a lower surface;
   the ramp configured to connect to at least one of the first end and the second end of the track;
   the ramp having a forward end and a rearward end;
   the ramp having at least one arm positioned adjacent the forward end of the ramp;
   wherein the at least one arm extends outward;
   the ramp having connecting members at the forward end of the ramp that are configured to connect the ramp to the track;
   the ramp having at least one feature that aligns with the at least one feature of the track;
   a sled;
   the sled having an upper surface and a lower surface;
   the sled extending a length between a forward end and a rearward end;
   the sled extending a width between a first side and a second side;
   wherein the sled is configured to support a cutting machine;
   wherein the at least one feature in the track provides a guide for the sled;
   wherein the at least one feature in the ramp provides a guide for the sled;
   wherein the sled is configured to engage the at least one feature of the track and the at least one feature of the ramp;
   wherein the ramp serves as a starting point for the sled and cutting machine prior to initiation of a cutting operation on a workpiece;
   wherein the at least one arm of the ramp is configured to retract a blade guard of the cutting machine attached to the sled prior to the cutting machine cutting the workpiece.

2. The guide system of claim 1, wherein the connecting members at the forward end of the ramp connect to the at least one feature in the upper surface of the track.

3. The guide system of claim 1, wherein the rearward end of the ramp includes a recess configured to receive a cord of a cutting machine.

4. The guide system of claim 1, wherein the ramp includes a stop configured to contact at least one of the first end and the second end of the track.

5. The guide system of claim 1, wherein the ramp includes a stop at the forward end of the ramp configured to contact a workpiece.

6. The guide system of claim 1, wherein the ramp includes at least one slot at the forward end of the ramp configured to receive a head of a fastener associated with a clamp.

7. The guide system of claim 1, wherein the ramp includes an arm configured to engage a guard of a cutting machine.

8. The guide system of claim 1, wherein the at least one feature in the track includes a hollow interior and the ramp has a portion that corresponds in size and shape to the hollow interior of the at least one feature in the track so as to facilitate connection of the ramp to the track.

9. A guide system for woodworking operations, comprising:
   a track having an upper surface and a lower surface;
   the track extending a length between opposing ends;
   the track extending a width between a first side and a second side;
   the track having at least on feature in the upper surface of the track;
   a ramp;
   the ramp configured to connect to an end of the track;
   the ramp having a forward end and a rearward end;
   the ramp having at least one arm positioned adjacent the forward end of the ramp;
   wherein the at least one arm extends outward;
   the ramp having connecting members at the forward end of the ramp that are configured to connect the ramp to the track;
   the ramp having at least one feature in the upper surface of the ramp that aligns with the at least one feature of the track;
   a sled;
   the sled having an upper surface and a lower surface;
   the sled extending a length between a forward end and a rearward end;
   the sled extending a width between a first side and a second side;
   wherein the at least one feature in the upper surface of the ramp and the at least one feature in the upper surface of the track provides a guide for the sled;
   wherein the sled is configured to support a cutting machine;
   wherein the sled is configured to receive the at least one feature of the track and the at least one feature of the ramp;

wherein a first stop of the ramp contacts an end of the track;

wherein the ramp serves as a starting point for the sled and cutting machine prior to initiation of a cutting operation on a workpiece;

wherein the arm of the ramp is configured to retract a blade guard of the cutting machine attached to the sled prior to the cutting machine cutting the workpiece.

10. The guide system of claim 9, wherein the connecting members at the forward end of the ramp connect to the at least one feature in the upper surface of the track.

11. The guide system of claim 9, wherein the rearward end of the ramp includes a recess configured to receive a cord of a cutting machine.

12. The guide system of claim 9, wherein the ramp includes a second stop at the forward end of the ramp configured to contact a workpiece.

13. The guide system of claim 9, wherein the ramp includes at least one slot at the forward end of the ramp configured to receive a head of a fastener associated with a clamp.

14. The guide system of claim 9, wherein the ramp includes an arm configured to engage a guard of a cutting machine.

15. The guide system of claim 9, wherein the at least one feature in the track includes a hollow interior and the ramp has a portion that corresponds in size and shape to the hollow interior of the at least one feature in the track so as to facilitate connection of the ramp to the track.

16. A guide system for woodworking operations, comprising:
   a track;
   the track having an upper surface and a lower surface;
   the track extending a length between a first end and a second end;
   the track extending a width between a first side and a second side;
   the track having at least one feature in its upper surface that extends a length of the track from the first end and the second end;
   a ramp;
   the ramp configured to connect to one of the first end and the second end of the track;
   the ramp having a forward end and a rearward end;
   the ramp having connecting members at the forward end of the ramp that are configured to connect the ramp to the track;
   the ramp having a center section with a width smaller than the width of the track;
   the ramp having at least one arm positioned adjacent the forward end of the ramp;
   wherein the at least one arm extends outward;
   a sled;
   the sled having an upper surface and a lower surface;
   the sled extending a length between a forward end and a rearward end;
   the sled extending a width between a first side and a second side;
   wherein the at least on feature in the track provides a guide for the sled;
   wherein the sled is configured to support a cutting machine;
   wherein the sled configured to receive the at least one feature of the track;
   wherein the arm is configured to engage and rotate a guard of the cutting machine connected to the sled;
   wherein the ramp serves as a starting area for the sled and the cutting machine connected to the sled prior to initiation of a cutting operation on a workpiece.

17. The guide system of claim 16, wherein the connecting members at the forward end of the ramp connect to the at least one feature in the upper surface of the track.

18. The guide system of claim 16, wherein the rearward end of the ramp includes a recess configured to receive a cord of a cutting machine.

19. The guide system of claim 16, wherein the ramp includes a stop configured to contact at least one of the first end and the second end of the track.

20. The guide system of claim 16, wherein the ramp includes a stop at the forward end of the ramp configured to contact a work piece.

21. The guide system of claim 16, wherein the ramp includes at least one slot at the forward end of the ramp configured to receive a head of a fastener associated with a clamp.

22. The guide system of claim 16, wherein the ramp has at least one feature that aligns with the at least one feature of the track, wherein the at least one feature in the ramp provides a guide for the sled.

23. A guide system for woodworking operations, comprising:
   a track;
   the track having an upper surface and a lower surface;
   the track extending a length between a first end and a second end;
   the track extending a width between a first side and a second side;
   the track having at least one feature in its upper surface that extends a length of the track from the first end and the second end;
   wherein the at least one feature in the track provides a guide for a sled;
   a ramp
   the ramp having an upper surface and a lower surface;
   the ramp extending a length between a forward end and a rearward end;
   the ramp extending a width between a first side and a second side;
   the ramp having at least one arm positioned adjacent the forward end of the ramp;
   wherein the at least one arm extends outward;
   the ramp having at least one feature in its upper surface that extends a length of the ramp from the rearward end and the forward end;
   the forward end of the ramp connected to at least one of the first end and the second end of the track wherein when the ramp is connected to the track the at least one feature in the upper surface of the ramp aligns with the at least one feature of the track;
   a sled;
   the sled having an upper surface and a lower surface;
   the sled extending a length between a forward end and a rearward end;
   the sled extending a width between a first side and a second side;
   the sled having at least one feature in its lower surface that is configured to receive the at least one feature in the upper surface of the ramp and the at least one feature in the upper surface of the track when the sled is placed on the upper surface of the ramp and the upper surface of the track;

wherein the sled is configured to receive a cutting machine;

wherein the ramp serves as a starting point for the sled and an attached cutting machine prior to initiation of a cutting operation on a workpiece;

wherein the ramp is configured to engage a blade guard of the cutting machine attached to the sled prior to the cutting machine cutting the workpiece.

24. A guide system for woodworking operations, comprising:

a track;
- the track having an upper surface and a lower surface;
- the track extending a length between a first end and a second end;
- the track extending a width between a first side and a second side;
- the track having at least one feature in its upper surface that extends a length of the track from the first end and the second end;
- wherein the at least one feature in the track provides a guide for a sled;

a ramp
- the ramp having an upper surface and a lower surface;
- the ramp extending a length between a forward end and a rearward end;
- the ramp extending a width between a first side and a second side;
- the ramp having at least one feature in its upper surface that extends a length of the ramp from the rearward end and the forward end;
- the forward end of the ramp connected to at least one of the first end and the second end of the track
- wherein when the ramp is connected to the track the at least one feature in the upper surface of the ramp aligns with the at least one feature of the track;
- the ramp having at least one arm positioned adjacent the forwards end of the ramp;
- wherein the at least one arm extends outward;

a sled;
- the sled having an upper surface and a lower surface;
- the sled extending a length between a forward end and a rearward end;
- the sled extending a width between a first side and a second side;
- the sled having at least one feature in its lower surface that is configured to receive the at least one feature in the upper surface of the ramp and the at least one feature in the upper surface of the track when the sled is placed on the upper surface of the ramp and the upper surface of the track;
- wherein when the ramp is connected to the track the at least one feature in the upper surface of the ramp aligns with the at least one feature of the track;
- wherein the sled is configured to receive a cutting machine;

wherein the ramp serves as a starting point for the sled and an attached cutting machine prior to initiation of a cutting operation on a workpiece;

wherein the arm of the ramp is configured to retract a blade guard of the cutting machine attached to the sled prior to the cutting machine cutting the workpiece.

25. A guide system for woodworking operations, comprising:

a track;
- the track having an upper surface and a lower surface;
- the track extending a length between a first end and a second end;
- the track extending a width between a first side and a second side;
- the track having at least one feature in its upper surface that extends a length of the track from the first end and the second end;
- wherein the at least one feature in the track provides a guide for a sled;

a ramp
- the ramp having an upper surface and a lower surface;
- the ramp extending a length between a forward end and a rearward end;
- the ramp extending a width between a first side and a second side;
- the ramp having at least one feature in its upper surface that extends a length of the ramp from the rearward end and the forward end;
- the ramp having at least one arm positioned adjacent the forward end of the ramp;
- wherein the at least one arm extends outward;
- the forward end of the ramp connected to at least one of the first end and the second end of the track
- wherein when the ramp is connected to the track the at least one feature in the upper surface of the ramp aligns with the at least one feature of the track;
- the ramp having a stop positioned at the forward end of the ramp;
- wherein when the ramp is attached to the track, the stop is positioned below the lower surface of the track;

a sled;
- the sled having an upper surface and a lower surface;
- the sled extending a length between a forward end and a rearward end;
- the sled extending a width between a first side and a second side;
- the sled having at least one feature in its lower surface that is configured to receive the at least one feature in the upper surface of the ramp and the at least one feature in the upper surface of the track when the sled is placed on the upper surface of the ramp and the upper surface of the track;
- wherein when the ramp is connected to the track the at least one feature in the upper surface of the ramp aligns with the at least one feature of the track;
- wherein the sled is configured to receive a cutting machine;

wherein the ramp serves as a starting point for the sled and an attached cutting machine prior to initiation of a cutting operation on a workpiece;

wherein the stop of the ramp is configured to engage an edge of the workpiece thereby preventing the ramp from sliding forward during a cutting operation.

* * * * *

UNITED STATES PATENT AND TRADEMARK OFFICE
CERTIFICATE OF CORRECTION

PATENT NO. : 11,325,215 B1
APPLICATION NO. : 16/745602
DATED : May 10, 2022
INVENTOR(S) : Scott L. Clark It is certified that error appears in the above-identified patent and that said Letters Patent is hereby corrected as shown below:

In the Claims

Column 34, Line 34-Column 35, Line 8 Claim 9 should read as follows:
9. A guide system for woodworking operations, comprising: a track having an upper surface and a lower surface; the track extending a length between opposing ends; the track extending a width between a first side and a second side; the track having at least one feature in the upper surface of the track; a ramp; the ramp configured to connect to an end of the track; the ramp having a forward end and a rearward end; the ramp having at least one arm positioned adjacent the forward end of the ramp; wherein the at least one arm extends outward; the ramp having connecting members at the forward end of the ramp that are configured to connect the ramp to the track; the ramp having at least one feature in the upper surface of the ramp that aligns with the at least one feature of the track; a sled; the sled having an upper surface and a lower surface; the sled extending a length between a forward end and a rearward end; the sled extending a width between a first side and a second side; wherein the at least one feature in the upper surface of the ramp and the at least one feature in the upper surface of the track provides a guide for the sled; wherein the sled is configured to support a cutting machine; wherein the sled is configured to receive the at least one feature of the track and the at least one feature of the ramp; wherein a first stop of the ramp contacts an end of the track; wherein the ramp serves as a starting point for the sled and cutting machine prior to initiation of a cutting operation on a workpiece; wherein the arm of the ramp is configured to retract a blade guard of the cutting machine attached to the sled prior to the cutting machine cutting the workpiece.

Column 35, Line 31-Column 36, Line 5 Claim 16 should read as follows:
16. A guide system for woodworking operations, comprising: a track; the track having an upper surface and a lower surface; the track extending a length between a first end and a second end; the track extending a width between a first side and a second side; the track having at least one feature in its upper surface that extends a length of the track from the first end and the second end; a ramp; the ramp configured to connect to one of the first end and the second end of the track; the ramp having a forward end and a rearward end; the ramp having connecting members at the forward end of the ramp that are configured to connect the ramp to the track; the ramp having a center section with a width smaller than the width of the track; the ramp having at least one arm positioned adjacent the forward Signed and Sealed this
Fifth Day of July, 2022

*Katherine Kelly Vidal*
Director of the United States Patent and Trademark Office end of the ramp; wherein the at least one arm extends outward; a sled; the sled having an upper surface and a lower surface; the sled extending a length between a forward end and a rearward end; the sled extending a width between a first side and a second side; wherein the at least one feature in the track provides a guide for the sled; wherein the sled is configured to support a cutting machine; wherein the sled configured to receive the at least one feature of the track; wherein the arm is configured to engage and rotate a guard of the cutting machine connected to the sled; wherein the ramp serves as a starting area for the sled and the cutting machine connected to the sled prior to initiation of a cutting operation on a workpiece.